(12) United States Patent
Fieldman

(10) Patent No.: US 11,533,354 B1
(45) Date of Patent: Dec. 20, 2022

(54) STORAGE AND RETRIEVAL OF VIDEO CONFERENCE STATE BASED UPON PARTICIPANTS

(71) Applicant: Study Social, Inc., Gainesville, FL (US)

(72) Inventor: Ethan Fieldman, Gainesville, FL (US)

(73) Assignee: Study Social, Inc., Gainesville, FL (US)

( * ) Notice: Subject to any disclaimer, the term of this patent is extended or adjusted under 35 U.S.C. 154(b) by 0 days.

(21) Appl. No.: 17/727,499

(22) Filed: Apr. 22, 2022

Related U.S. Application Data

(63) Continuation of application No. 17/555,061, filed on Dec. 17, 2021.
(Continued)

(51) Int. Cl.
*H04L 65/1069* (2022.01)
*H04L 65/75* (2022.01)
(Continued)

(52) U.S. Cl.
CPC .......... *H04L 65/764* (2022.05); *G06F 3/1454* (2013.01); *H04L 65/403* (2013.01)

(58) Field of Classification Search
CPC ...... G06F 3/048; G06F 3/0481; G06F 3/0484; G06F 3/1454; G06F 16/735; G06F 16/9032; G06Q 50/00; G06Q 10/10; G06V 20/49; H04L 12/1818; H04L 65/1069; H04L 65/1101; H04L 65/401; H04L 65/403; H04L 65/764; H04L 12/1822; H04L 65/4038; H04N 1/42; H04N 7/15; H04N 21/4788; H04N 7/148; H04N 7/152; H04N 7/155; H04N 21/44028; H04W 4/023; G05B 13/0265; G06T 11/60; G16H 10/60; G16H 20/13
USPC ......... 348/14.01, 14.07, 207.1, 14.03, 14.09; 370/260; 705/4; 709/205, 204; 710/11; 715/753; 382/128
See application file for complete search history.

(56) References Cited

U.S. PATENT DOCUMENTS 7,417,959 B2  8/2008  Dorner et al.
7,908,321 B1  3/2011  Rust
(Continued)

*Primary Examiner* — Gerald Gauthier
(74) *Attorney, Agent, or Firm* — Beyer Law Group LLP

(57) ABSTRACT

Once participants participate in a video conference the state of information during that video conference is retained for those participants. At a future time, when those participants again meet in a video conference the state of information that was retained is retrieved and presented for them again in the subsequent video conference based upon their identifiers. Information such as the whiteboard, the chat window, shared files, camera settings, images, background, video recording, etc. are retrieved and automatically presented in the new video conference. Alternatively, a participant may be asked if the state of information from a previous video conference should be retrieved. When a participant joins a conference, the current participants grant permission or not for the current contents to be viewed by the new participant. When a participant leaves the conference, or when they all leave, a triggering condition saves the state. Participants may join in a cross-platform conference and all content from a session in another platform is retrieved. Virtual reality may also be used.

24 Claims, 58 Drawing Sheets

Related U.S. Application Data

(60) Provisional application No. 63/127,942, filed on Dec. 18, 2020.

(51) Int. Cl.
*H04L 65/403* (2022.01)
*G06F 3/14* (2006.01)

(56) References Cited

U.S. PATENT DOCUMENTS

| | | | |
|---|---|---|---|
| 8,464,164 B2 | 6/2013 | Hon | |
| 8,593,501 B1* | 11/2013 | Kjeldaas | H04L 12/1818 704/235 |
| 9,055,193 B2 | 6/2015 | Miyazawa et al. | |
| 9,380,194 B2 | 6/2016 | Thimmappa et al. | |
| 9,641,570 B2* | 5/2017 | Knodt | H04L 65/4038 |
| 9,690,538 B1* | 6/2017 | Doyle, III | H04W 4/023 |
| 9,699,409 B1* | 7/2017 | Reshef | G06F 3/0484 |
| 10,110,852 B2 | 10/2018 | Hiller et al. | |
| 10,321,096 B2 | 6/2019 | Morabia et al. | |
| 10,491,931 B2 | 11/2019 | Beaty | |
| 10,521,607 B2 | 12/2019 | Agrawal et al. | |
| 10,567,448 B2 | 2/2020 | Bader-Natal et al. | |
| 10,768,885 B1* | 9/2020 | Fieldman | H04L 65/403 |
| 11,010,810 B1* | 5/2021 | Pylant | G16H 10/60 |
| 11,089,134 B1* | 8/2021 | Gordon | G06F 3/0481 |
| 11,361,300 B1* | 6/2022 | Kurani | G06Q 20/223 |
| 11,363,082 B2* | 6/2022 | Garrett | G06V 20/41 |
| 2004/0114541 A1* | 6/2004 | Caspi | H04L 65/1101 709/204 |
| 2004/0119814 A1* | 6/2004 | Clisham | H04N 21/440281 348/E7.083 |
| 2004/0145650 A1* | 7/2004 | Jarboe | H04N 7/148 348/E7.083 |
| 2004/0236830 A1 | 11/2004 | Nelson | |
| 2005/0180341 A1 | 8/2005 | Nelson | |
| 2005/0285943 A1* | 12/2005 | Cutler | H04N 7/15 348/E9.051 |
| 2006/0066717 A1 | 3/2006 | Miceli | |
| 2008/0088698 A1* | 4/2008 | Patel | H04N 7/15 348/E7.083 |
| 2008/0130525 A1* | 6/2008 | Jansen | H04N 7/152 348/E7.071 |
| 2008/0133660 A1 | 6/2008 | Salesky | |
| 2009/0192845 A1 | 7/2009 | Gudipaty | |
| 2010/0095208 A1 | 4/2010 | White | |
| 2010/0115417 A1 | 5/2010 | Cox | |
| 2013/0218978 A1* | 8/2013 | Weinstein | H04L 65/401 709/205 |
| 2014/0006064 A1* | 1/2014 | Joao | H04L 65/403 705/14.54 |
| 2014/0040767 A1 | 2/2014 | Bolia | |
| 2014/0082227 A1* | 3/2014 | Beel | H04N 21/4438 710/11 |
| 2014/0104372 A1* | 4/2014 | Caiman | H04N 7/15 348/E7.084 |
| 2014/0139609 A1* | 5/2014 | Lu | G06T 11/60 348/14.03 |
| 2014/0330900 A1* | 11/2014 | Libin | G06Q 10/10 709/204 |
| 2015/0039998 A1 | 2/2015 | Lieb | |
| 2015/0103131 A1* | 4/2015 | Denoue | H04N 7/15 348/14.03 |
| 2015/0149929 A1* | 5/2015 | Shepherd | H04L 65/403 715/753 |
| 2015/0213650 A1 | 7/2015 | Barzuza | |
| 2015/0221086 A1* | 8/2015 | Bertram | G16H 20/13 382/128 |
| 2016/0112476 A1 | 4/2016 | Gudipaty | |
| 2017/0024781 A1 | 1/2017 | Lee | |
| 2017/0229102 A1 | 8/2017 | Shewman | |
| 2017/0359391 A1 | 12/2017 | Pai | |
| 2017/0366608 A1 | 12/2017 | Allison | |
| 2018/0160076 A1 | 6/2018 | Ozaki | |
| 2018/0191924 A1* | 7/2018 | Kodaira | H04N 1/42 |
| 2019/0037171 A1* | 1/2019 | Nagpal | H04L 12/1822 |
| 2020/0120149 A1 | 4/2020 | Park | |
| 2020/0220906 A1* | 7/2020 | Port | G06Q 50/00 |
| 2020/0302817 A1 | 9/2020 | Williams | |
| 2021/0092170 A1 | 3/2021 | Takahashi | |
| 2021/0342785 A1* | 11/2021 | Mann | G05B 13/0265 |
| 2022/0067092 A1* | 3/2022 | Isaacs | G06F 16/735 |
| 2022/0078376 A1* | 3/2022 | Barron | H04N 7/155 |
| 2022/0107714 A1 | 4/2022 | Dumur et al. | |
| 2022/0124128 A1* | 4/2022 | Port | G06V 20/49 |

* cited by examiner

Video Conference Landing Page

Session-Centric 800

| Session Name | Identifier | Host | Whiteboard | Chat Window | Camera, Microphone, Speaker | Shared Files | VB | Video Audio | Tools |
|---|---|---|---|---|---|---|---|---|---|
| Carol-Ted-Alice | 361 357 102 08-22-20 | Carol_Smith | WB_Link | Chat_Link | USB 046d:0823, internal microphone, Device #1 | | | | |
| Carol-Bob | 361 357 102 08-23-20 | Carol_Smith | WB_Link | Chat_Link | USB 046d:0823, internal microphone, Device #1 | | | | |
| Carol-Thelma-Louise 808 | 361 357 102 08-20-20 | Carol_Smith | WB_Link | Chat_Link | USB remote, internal microphone, RealTek Audio Speakers | File ABC Link | Carol VB_Link Thelma VB-Link | Video Link | Tools Link |
| Carol-Math | 361 357 106 08-22-20 | Carol_Smith | WB_Link | | USB remote, internal microphone, RealTek Audio Speakers | Geometry Quiz | | | Tools-Geometry |
| 812 | 814 | 816 | 818 | 820 | 822 | 824 | 826 | 828 | 829 |

FIG. 17A

Participant Table 844

| Participants | Session Identifiers | | |
|---|---|---|---|
| Carol Ted Alice | 361 357 102 08-22-20 | 361 357 102 08-21-20 | ... |
| Carol Bob | 361 357 102 08-22-20 | 361 357 104 08-18-20 | ... |
| Carol | 361 357 106 08-22-20 | 361 357 107 08-23-20 | ... |
| 842 | | | |

| Content Name | Groups with Permission | Pointer |
|---|---|---|
| Graph One | [Bob, Carol] , [Ethan, Mike, Jon], .... | Content Pointer |
| Spain Stats | [Bob, Carol] , [Ethan, Mike, Jon], .... | Content Pointer |
| CDC Recommends | [Bob, Carol] , [Frank, Bob, Carol] | Content Pointer |
| Workbook Sales | [Alice, Carol] | Content Pointer |
| Whiteboard 8-22-20 | [Carol, Ted, Alice] [Bob, Carol] | Content Pointer |
| Chat 8-22-20 | [Carol, Ted, Alice] [Bob, Carol] | Content Pointer |
| Tools-Chemistry | [Ted, Carol] [Carol] | Content Pointer |
| Session Video | [Bob, Carol] | Content Pointer |
| Session Audio | [Frank, Margaret, Henry] | Content Pointer |
| Open Windows | [Bob, Carol] , [Frank, Bob, Carol] | Content Pointer |
| Device Settings | [Alice, Carol] | Content Pointer |
| Device Settings | [Frank, Bob, Carol] | Content Pointer |
| ... | ... | ... |

Content-Centric Permission Database

FIG. 17C

| | Groups | Shared Files | Whiteboard | Chat | Open Windows | Tools | VB | Device Settings | Video | Audio |
|---|---|---|---|---|---|---|---|---|---|---|
| 881 | Carol, Ted, Alice | | WB 8-22-20 | Chat – 8-22-20 | | | | Settings | | |
| 882 | Bob, Carol | Graph One Spain Stats CDC Recommends | WB 8-18-20 WB 8-28-20 | | Link to Last Session | | Bob VB | Settings | 8-21-20 | |
| 883 | Ted, Carol | | WB 8-24-20 | | | Chemistry Tools | | Settings | | |
| 884 | Alice, Carol | Workbook Sales Workbook Inv. | | | Link to Last Session | | Carol VB Alice VB | Settings | | |
| 885 | Frank, Bob, Carol | Spain Stats CDC Recommends | | | Link to Last Session | | Bob VB | USB Camera Settings | | |
| 886 | Carol, Thelma Louise | | | | | | | Settings | | |
| 887 | Carol | Geometry Quiz Chemistry Quiz | WB 10-22-20 WB 8-24-20 | | | Chemistry Tools Geometry Tools | | Settings | | |
| | ... | ... | ... | ... | ... | ... | ... | ... | ... | ... |

Group-Centric Permission Database

FIG. 17D

Video Conference Session

Cross Platform Log In

STORAGE AND RETRIEVAL OF VIDEO CONFERENCE STATE BASED UPON PARTICIPANTS

CROSS-REFERENCE TO RELATED APPLICATIONS

This application is a continuation of U.S. application Ser. No. 17/555,061, filed Dec. 17, 2021, entitled "Storage and Retrieval of Video Conference State Based Upon Participants," which is hereby incorporated by reference. This application also claims priority of U.S. provisional application No. 63/127,942, filed Dec. 18, 2020, entitled Storage and Retrieval of Video Conference State Based Upon Participants.

This application is related to U.S. Pat. No. 10,540,906 entitled "Dynamic Filtering and Tagging Functionality Implemented in Collaborative, Social Online Education Networks," filed Apr. 11, 2016, U.S. Pat. No. 10,126,927 entitled "Collaborative, Social, Online Education and Whiteboard Techniques," filed Mar. 9, 2015, U.S. Pat. No. 10,515,561 entitled "Video Presentation, Digital Compositing, And Streaming Techniques Implemented Via A Computer Network," filed Sep. 27, 2018, U.S. Pat. No. 10,404,943 entitled "Bandwidth Reduction In Video Conference Group Sessions," filed Nov. 21, 2018, to U.S. Pat. No. 10,768,885 entitled "Video Conference With Shared Whiteboard And Recording," filed Apr. 23, 2019, all of which are hereby incorporated by reference.

FIELD OF THE INVENTION

The present invention relates generally to video conferencing technology. More specifically, the present invention relates to saving the state of a video conference for later reuse.

BACKGROUND OF THE INVENTION

With computers and similar devices now becoming nearly ubiquitous, and with the availability of Wi-Fi and cellular networks, people find it now easier than ever to work remotely from almost any location. Working remotely also drives the use of video conferences in which two or more people hold a virtual meeting and communicate using video and audio using their own computers. Video conferences are also popular for social meetings, informal groups, etc., outside of a work environment.

Currently, video conferencing technology allows users to view and draw upon a shared online whiteboard, to type messages to one another in a chat window, and to enable particular settings on their computer such as a camera, profile image, etc. Information on the whiteboard and in the chat window is useful during the video conference, but, when the video conference ends, that information is lost. By way of example, if two participants are using the shared whiteboard and a chat window to discuss details of a project that information is available during the video conference. Unfortunately, when the video conference ends, that information is lost. The two may start up their conversation the very next day and open a new video conference, but, what they had written on the shared whiteboard at the end of their last conference is no longer available and the messages in the chat window are also gone. Moreover, particular camera settings that had been used (e.g., one participant was using an external document camera to show the other a document near the end of the last call), profile images, files that had been shared, etc., may also be lost.

It is known to provide a profile for a user, such as a business profile or a personal profile that preserves some settings for a particular user (e.g., photograph, credit card information), but, such a profile is a limited, static set of information, and will be finite in scope. On the other hand, the set of information during a video conference between multiple participants such as the whiteboard, chat window, shared files, the device settings of the participant computers is nearly infinite in scope.

Accordingly, improved techniques and systems are desired that improve upon existing video conferencing technology that allow information from an earlier video conference to be saved and then retrieved at the appropriate time and when the appropriate participants are in a future video conference.

SUMMARY OF THE INVENTION

To achieve the foregoing, and in accordance with the purpose of the present invention, techniques are disclosed that persist the state of a video conference after it has occurred, allowing the state to be reused during a subsequent video conference between the same participants.

Advantageously, once two participants (or more) participate in a video conference the state of information at the end of that video conference is retained. At a future time, when those two participants again meet in a video conference the state of information that was retained is retrieved and presented for them again in the subsequent video conference. Information such as the contents of the whiteboard, the history of the chat window, shared screens or files, camera settings, images, are all retrieved and automatically presented again in the new video conference. Alternatively, a participant may be asked if the state of information from a previous video conference should be retrieved or if the conference should start fresh. When one of the participants leaves the conference other content may be shown to the remaining participants.

The state of information from a previous video conference may be retrieved based upon the identities of the participants in the original and new video conference, and may use a unique identifier or name (i.e., a "room") of the video conferences session.

In a first embodiment of the invention, the state is saved when a triggering condition is received at a server computer, the condition being, for example, a participant leaving the session. Participant identifiers are also saved in association with the state, such as the shared whiteboard.

In a second embodiment of the invention, a saved state is retrieved automatically when the current participants match a saved session having the same participants. For example, the shared whiteboard from the previous session is retrieved and displayed.

In a third embodiment of the invention, the state is saved when a triggering condition is received at a server computer. Later, in a subsequent session having the same participants, the saved state is retrieved automatically. For example, the shared whiteboard is retrieved and displayed.

In a fourth embodiment of the invention, the state is saved for content during a session and a group of participant identifiers are also saved in association with that content.

In a fifth embodiment of the invention, content from a previous session is retrieved automatically and displayed in a new session when the current participants match a group of the same participants from the previous session.

BRIEF DESCRIPTION OF THE DRAWINGS

The invention, together with further advantages thereof, may best be understood by reference to the following description taken in conjunction with the accompanying drawings in which:

FIGS. 17A-17B illustrate examples of permission databases that save data of all sessions of a particular video conference service based upon participants.

FIG. 17C illustrates a content-centric permission database.

FIG. 17D illustrates a group-centric permission database.

DETAILED DESCRIPTION OF THE INVENTION

Online Education System Overview

Figure 1:
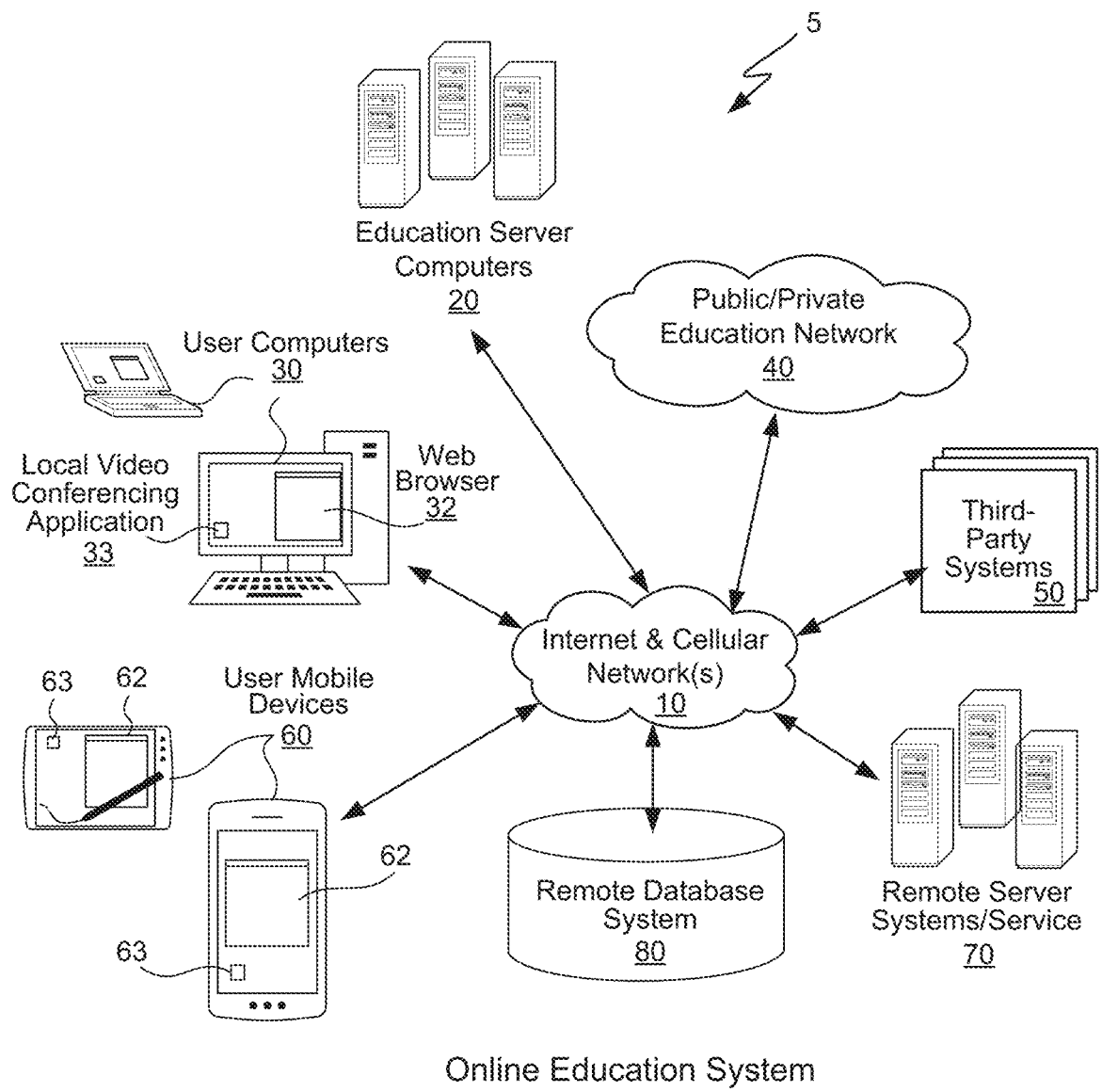
FIG. 1 is a block diagram of an Online Education System (OES), which may be implemented via a computerized data network.

FIG. 1 is a block diagram of an Online Education System (OES) 5, which may be implemented via a computerized data network. The Online Education System 5 includes any number of online education server computers (ESC) 20 that help to implement the inventive embodiments described below. Public or private education networks 40 include, for example, student information systems (SIS) and student data management networks.

Third-party systems 50 include computers and software for social networks (e.g., Facebook, Twitter, Google, etc.), online video conferencing and Web seminars (e.g., WebEx, Zoom, Microsoft Teams, Adobe Connect, Skype, etc.), Web-based video conferencing applications and tools, online virtual reality conferencing, applications and tools, and computational knowledge engines such as Wolfram Alpha, as well as the associated Web sites and databases of these third-party systems.

Remote server systems and services 70 include content provider servers and services such as media streaming, database storage and access, financial transactions, payment gateways, electronic commerce, event management, etc. Remote database systems 80 provide access to any remote database.

User computers 30 include any number of computers used by participants, students, teachers, tutors, etc., and include personal computers (PCs), desktop computers, laptop computers, set-top boxes, etc., and typically each will include a Web browser 32 to access the World Wide Web via network 10. As known in the art, a browser may download custom code (typically JavaScript) when interacting with a Web site in order to provide functionality especially for that Web site that executes within the user browser. Also included is a local video-conferencing application 33 that a user may download from a video conference service Web site to a computer in order to better participate in a video conference.

User mobile devices 60 are any number of mobile telephones, smartphones, tablet computers, personal digital assistants (PDAs), or similar devices used to communicate voice and data over a cellular, Wi-Fi or similar network, and each may also include a Web browser 62 and any number of software applications 63 (or "apps") used to perform functions on the device and over the network. A user may download an application 63 (or "app") to a mobile device (telephone, tablet computer, etc.) in order to participate in the video conference.

Typically, a user will participate in a video conference using either his or her browser (with custom code), the local application 33 which the user has downloaded, or an application 63. Internet and cellular networks 10 include the Internet and cellular networks over which the above devices and systems communicate.

Education Server Computer

Figure 2:
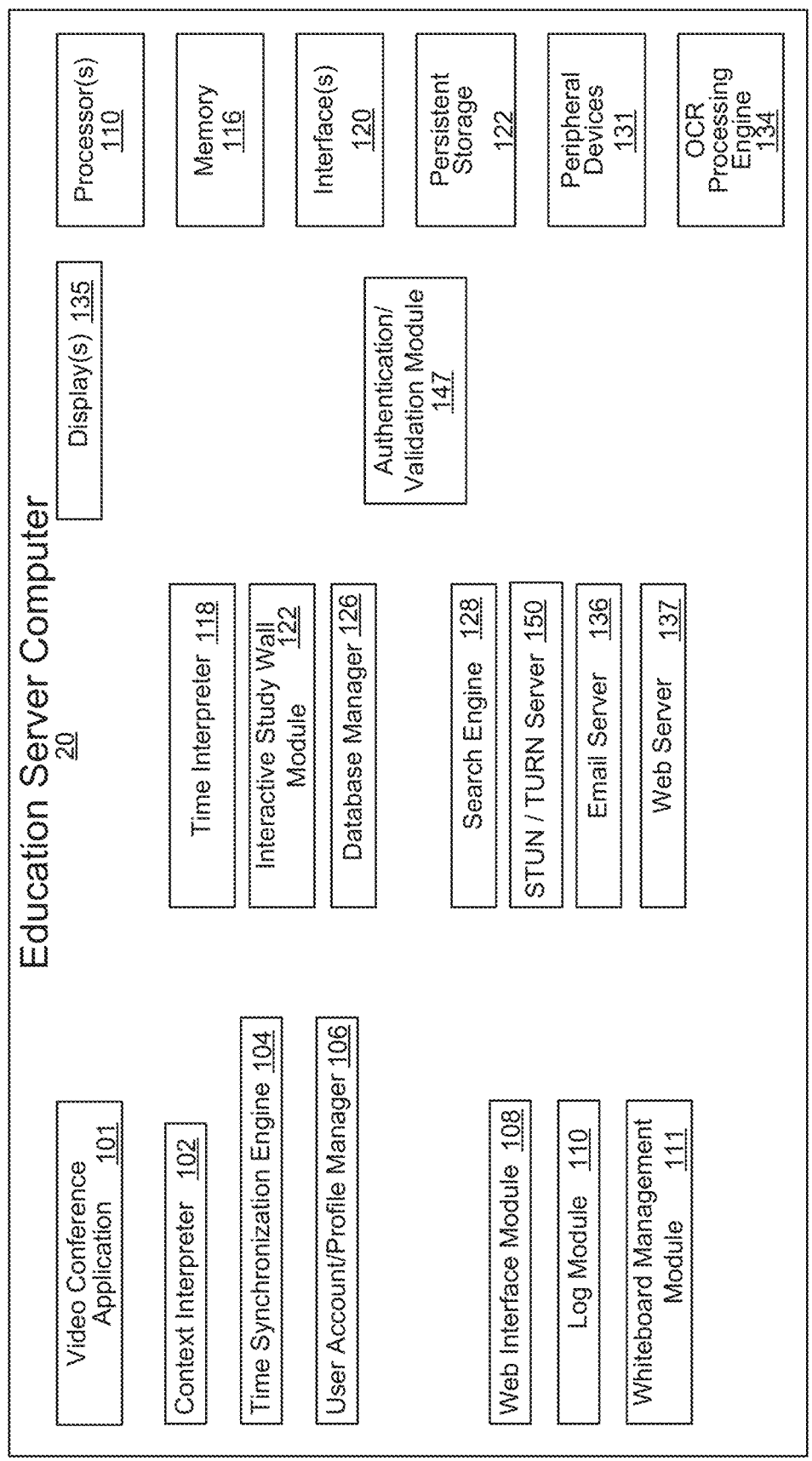
FIG. 2 is a block diagram of an education server computer that includes a number of software modules, servers and hardware as described below.

FIG. 2 is a block diagram of an online education server computer 20 that includes a number of software modules, servers and hardware as described below. As known in the art, the functionality of this computer 20 may be spread over multiple server computers.

Server computer 20 includes a video conference application 101 that implements video conferencing and virtual reality conferencing as mentioned above and as described in the below diagrams. The present invention may be used with any of a variety of online video conference services such as those available from: Zoom Video Communications Inc. ("Zoom"), Google, Inc. ("Google Hangouts," "Google Meet"), Microsoft, Inc. ("Skype," "Teams"), Cisco Systems Inc. ("WebEx Meetings"), Adobe ("Adobe Connect"), Facebook, Inc. ("Facebook Messenger"), etc., as well as online or off-line virtual-reality conference services such as those available from Engage VR, Spatial, etc.

In one particular embodiment, the present invention is used with the GoBoard video conference service available from Study Edge, LLC, which is combined with an online, shared, electronic whiteboard. The patents referenced above describe this video conference and electronic whiteboard application in greater detail.

To facilitate video conferencing, included is a STUN or TURN server 150 (or both) for facilitating communication between user computers 30 and user mobile devices 60. Server 150 is used to signal to participant computers as to who is in a video conference, their IP addresses, etc. Session Traversal Utilities for NAT (STUN) is a set of methods and a protocol for traversal of NAT gateways in real-time voice, video, messaging and other applications. STUN allows hosts to communicate and is used by other protocols such as Interactive Connectivity Establishment (ICE), the Session Initiation Protocol (SIP), or WebRTC. The protocol uses a third-party network server (STUN server) located on the public side of the NAT, usually the public Internet.

Traversal Using Relays around NAT (TURN) is a protocol that also assists in traversal NATs or firewalls for voice, video and messaging applications. Traversal Using Relay NAT (TURN) is a protocol that allows a client to obtain IP addresses and ports from relay that relays data through a server that resides on the public Internet. Although TURN almost always provides connectivity to a client, it is resource intensive for the provider of the TURN server. It is desirable to other mechanisms (such as STUN or direct connectivity) before using a TURN server. Interactive Connectivity Establishment (ICE) methodology may be used to find the optimal connectivity means.

Typically, two WebRTC clients communicate with each other using ICE. ICE allows WebRTC to find the best path to connect peer computers. It may be able to do that with a direct connection between the clients, but also works for clients where a direct connection is not possible (i.e., behind NATs). In the case of asymmetric NAT, ICE uses STUN server 150. In most cases, a STUN server is only used during the connection setup and once that session has been established, media will flow directly between clients. If a STUN server cannot establish the connection, ICE uses TURN. A TURN server is often used in the case of a symmetric NAT. Unlike STUN, a TURN server remains in the media path after the connection has been established. Thus, it is not typically used unless data is ever to be stored or recorded.

Of course, other techniques may be used to implement the basic video conferencing services. By way of example, other than using peer-to-peer, video conferencing services may be implemented using a central server for routing audio, video and data between participant computers, such as is used by Zoom, Inc.

Server computer 20 also includes a context interpreter 102 which analyzes contextual criteria relating to a detected event or condition and automatically determines a contextually-appropriate response. Examples of contextual criteria include: location-based criteria of a client or agent device; time-based criteria; identity of user; user profile information; transaction history information; recent user activities; and location-based business-related criteria. A time synchronization engine 104 manages universal time synchronization via NTP or GPS. Time interpreter 118 may modify or change identifier activation and expiration times based on various criteria such as time, location, transaction status, etc. User account or user profile manager 106 stores user information in a suitable database of server computer 20. Web Interface module 108 manages communications and transactions with a Web portal of the ESC computer 20. Log module 110 generates and manages transactions, history logs, system errors, connections from APIs, etc. Whiteboard management module 111 implements various types of electronic whiteboard functions used by module 122. Interactive study wall module 122 implements functions related to an online, shared, electronic study wall used by students, tutors and teachers.

Database manager 126 handles various tasks relating to database updating, database management, database access, etc. A search engine 128 searches for transactions, logs, items, accounts, etc., in the various databases. Electronic mail server 136 provides various functions relating to e-mail activities and communications. Web server 137 provides various functions relating to Web server activities and communications.

Authentication/validation module 147 performs various types of authentication/validation tasks such as authenticating devices and users, verifying passwords, SSL certificates, biometric identification information, or other security-related information, verifying activation or expiration times, etc. Module 147 may authenticate the identity of the current user or client computer. For example, the current user may be required to perform a sign in process at their computer or mobile device in order to access functionality of the ESC computer 20. OCR processing engine 134 performs optical character recognition of images such as those captured by a mobile device camera or camera of a computer.

Server computer 20 itself includes at least one processor 110, memory 116 (such as volatile memory or RAM), interfaces 118 which include wired interfaces or wireless interfaces, persistent storage 122 (such as hard disks, non-volatile memory, unalterable memory, flash drives, optical storage, etc.), peripheral devices 131 and one or more displays 135.

Begin Video Conference

The below describes how a video conference session is begun between multiple participants using the GoBoard service. Of course, the participants may be using any other suitable video conferencing software or service (such as those mentioned above) in order to hold the session. Access to GoBoard is via the link "www.goboard.com" and in one embodiment requires no explicit downloading of software manually by a user to a desktop or laptop computer (although the application 101 may download JavaScript code to the participant's browser for use in implementing various of the steps described below). In another embodiment, a user downloads local application software from application 101 to his or her computing device. Thus, a GoBoard video conference is able to run on two different platforms: a browser version available via the Internet from any computer browser (requiring no software to be downloaded by the user), and a version running on a local application (the "GoBoard App") which the user typically downloads to a tablet computer or mobile device, both versions which access the video conference application 101. A user may also download the local application to his or her desktop or laptop computer.

GoBoard works well with an iPad tablet computer, an Apple digital pen and the GoBoard App. A Google Chrome browser is best (if on a desktop computer) along with at least 5 Mbps internet download speed. The following figures show embodiments of the present invention being used with the GoBoard online service, although use of the invention with GoBoard in particular is not required.

In the browser version, a participant (e.g., a tutor, a student, worker, individual, or other user) accesses the video conference application 101 using his or her computer. Using GoBoard as an example, a participant using a desktop computer connects to the Web site "https://goboard.com" using a browser; this opens a link from the participant computer or mobile device to application 101 on server computer 20. Application 101 downloads JavaScript code to implement (within the user's browser) the functionality of a WebRTC connection for audio and video conferencing, and optionally to operate a shared whiteboard canvas. Within this canvas, users can share text, shapes, images, and other media objects in real time.

If using another video conference service, the participant opens that service as appropriate which may then implement embodiments of the present invention herein described. In one embodiment, each participant computing device implements WebRTC which is a real-time peer-to-peer communication platform for sharing video streams and audio streams between participant computers. Other similar peer-to-peer communication platforms may also be used as well as a central server communication platform to share video, audio and data.

Figure 3A:
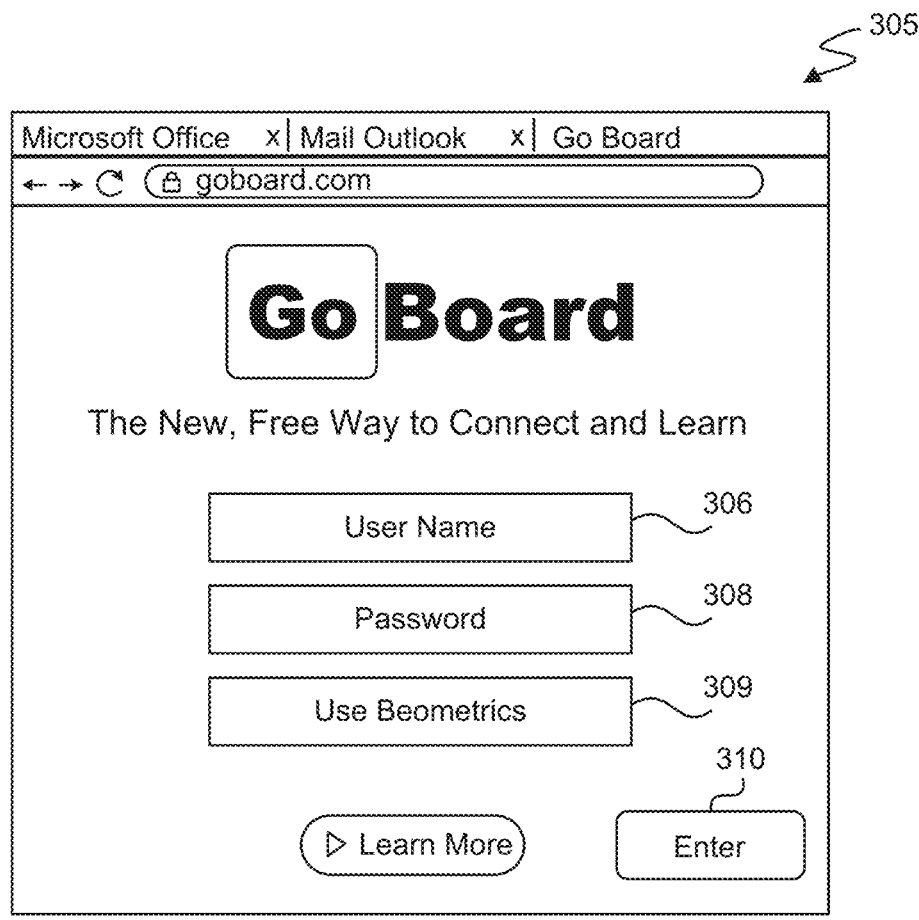
FIG. 3A illustrates the GoBoard sign-in page that appears once a participant accesses application 101.

FIG. 3A illustrates the GoBoard sign-in page 305 that appears once a participant accesses application 101. A participant may identify himself or herself by either entering a user name 306 and a password 308 or by using biometric information 309. If choosing to use a user name and password, the participant enters that information, presses Enter 310, and the application 101 will assume that the information entered is sufficient to uniquely and accurately identify the participant. Application 101 may then assign that participant a unique identifier for use during implementation of this invention. Alternatively, the user may press Use Biometrics 309 and will then be prompted to enter any of a variety of biometric information such as a retinal scan, a finger or thumb print, a sample of speech for voice recognition, etc. The mechanisms by which biometric information may be entered by a user into a computer and how that biometric information is processed to uniquely identify a user are known to those of skill in the art. Once the participant identity is verified application 101 then assigns that participant a unique identifier.

Figure 3B:
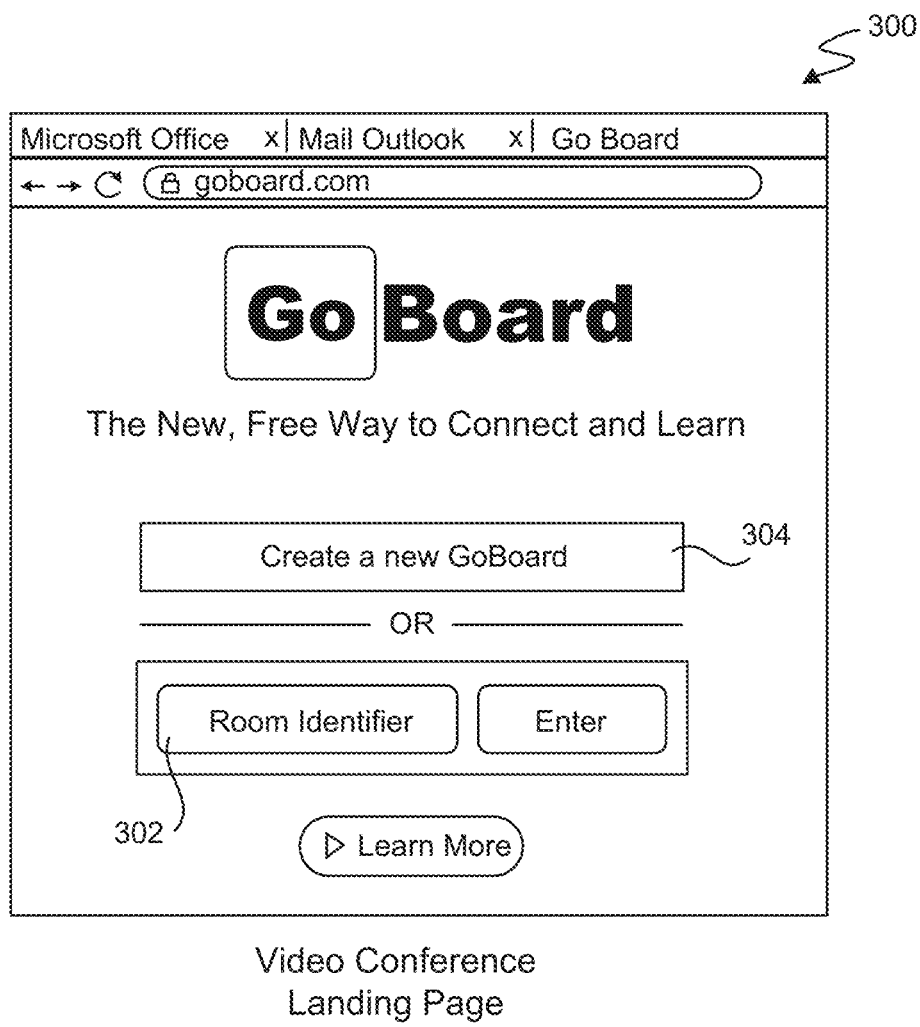
FIG. 3B illustrates the GoBoard landing page that appears once the participant has accessed the application.

FIG. 3B illustrates the GoBoard landing page 300 that appears once the participant has verified their identity above. A participant may enter an existing GoBoard room identifier at 302 in order to view an existing session (i.e., a session that has already been started by another participant) or may click upon button 304 in order to start a new session in which the participant will be the first one to join. Any institution may also choose to create room identifiers ahead of time for each person, e.g., "university.goboard.com/abc123," where "abc123" is a student identification number to allow each student to hold a conference with a tutor (or others) and to save work within a single session. Or, an institution may create room identifiers for particular projects and allow individuals to join those sessions identified by those identifiers. Application 101 may also provide a URL link to a participant by which other participants may join.

Application 101 may keep track of whether a participant is a host of a session (i.e., a tutor, instructor, teacher, chairman in charge of the meeting, etc.) in a user account (or user profile) database managed by profile manager 106. The user account database may keep track of information such as the user name, e-mail address of the user, institution, a user PIN, birth date, telephone number, biographic information, geolocation information, IP address of current computing device being used, user security questions, user-specific settings, etc.

In general, a variety of techniques may be used to identify who is the host of the session or who has which role. In a first technique, all participants join a session as equals and each has a button or selection available on his or her computer screen that says "Host." When someone wishes to take charge of the session and answer questions from others, he or she presses that button and this sends a signal to application 101 indicating that that person will now be the host and the others will be in the queue. The others are ordered in the queue in the order in which they originally joined the session, although other default means may also be used. In the virtual reality embodiment described below, the participant presses the "Host" button on the virtual tablet computer in front of them.

In a second technique, application 101 can access a third-party Student Information System (SIS) of a school district in order to determine, based upon how each participant logged in, who is a teacher and who is a student. In other words, when each participant logs in (into a computer, tablet, VR headset, etc.) the SIS will know who is the teacher (or professor) and who are the students.

In a third technique each participant has a "Host" button on their computer screen (or virtual reality tablet) but pressing this button pops up a window which requires a password. Only one teacher or professor within a session will be given this password off-line, a priori, so that that person may then assume the role of host.

Figure 4:
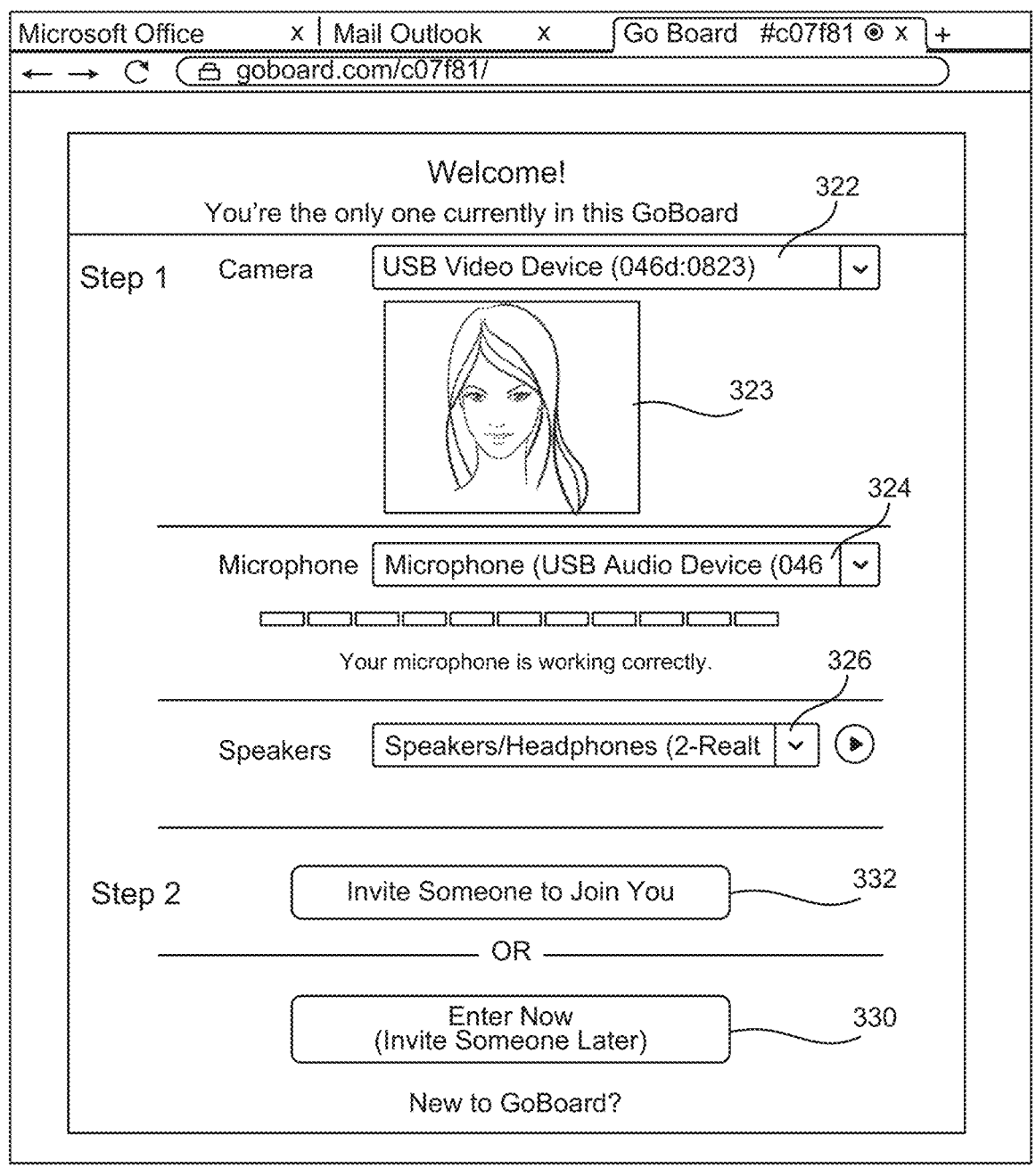
FIG. 4 shows a welcome screen on the participant's computing device that shows two steps.

FIG. 4 shows a welcome screen 320 on the participant's computing device that shows two steps. Display 322 indicates which particular camera is enabled on the participant computer; window 323 displays a live video image of the participant taken using the camera on his or her computer; 324 indicates which particular microphone is enabled on the participant computer; and 326 indicates which particular speakers are enabled on the participant computer.

The first step is to enable input and output. A participant may click upon 322 in order to enable any camera installed on his or her computing device. The camera enabled by the user on his or her computer may not necessarily be a front-facing camera that is typically filming the user in front of the computer, but may also be a rear-facing camera (such as found on a mobile telephone), or other camera connected to the device that the user enables. It is the video from this enabled camera that will be sent as a video stream to the devices of the other participants. The participant may also click upon 324 in order to enable any microphone on his or her computer, and click upon 326 in order to enable any speakers on his or her computer.

Once a participant has enabled his camera, microphone and speakers, this information will be stored on the participant computer, be sent to the computers of all other participants, and may also be sent to application 101 on server computer 20. This information is stored by the browser (Google Chrome or Firefox, for example) in local storage, typically a local cache on the user's computer that the browser can read. Information such as the status of each user's camera, microphone and speakers, as well as their role, is stored here. Additional information like name, e-mail address, IP address, and network connection information may also be stored in this location.

The second step is to invite another or join a session. The participant may click upon 330 in order to enter a session (indicated from the room identifier entered at 302 or a new session previously indicated at 304), or may click on 332 in order to invite another participant to join this session. Thus, the participant may choose option 330 in order to immediately enter a session identified earlier in FIG. 3 (by entering a room identifier or creating a new session). Once this option is chosen, conference application 101 creates the online video conference session (and optionally the shared electronic whiteboard), provides the session with a URL (such as "https://goboard.com/abc123") and displays the session on the participant screen as will be explained below in FIG. 5. Video conferencing capability using a suitable peer-to-peer communication platform is thus enabled on the participant computer. As mentioned earlier, a central server communication platform may also be used.

Figure 5:
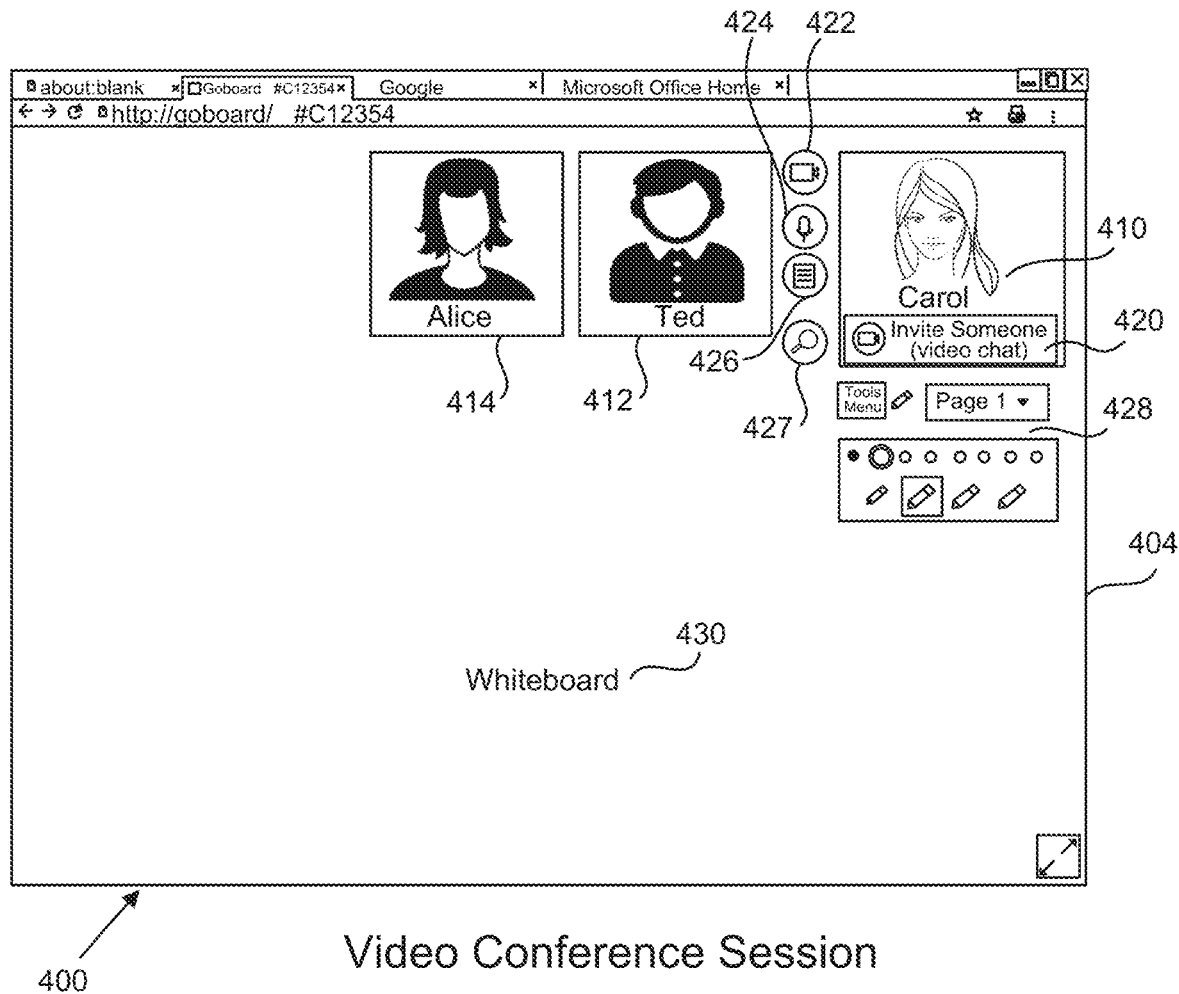
FIG. 5 illustrates a view of a session of a video conference with an online, shared, (currently) blank display region in the browser of the presenter computer during a session.

If option 332 is chosen, then application 101 displays on the participant computer a screen to invite another user. Included is a link to the current session, e.g., "goboard.com/c07f81" (either the room identifier entered or the identifier of the new room), which may be copied, sent in an e-mail message, sent via a third-party service (e.g., Facebook Message), etc. Once the second user receives the link, he or she clicks upon the link to join the first participant, as is shown in FIG. 5.

If the original participant is using a tablet or mobile device and wishes to download the application (or "app") in order to use the videoconferencing service he or she downloads the application using known techniques. The participant then clicks upon and executes the GoBoard App. If the participant is using the GoBoard App on a tablet computer or mobile device he or she may still use WebRTC. In other words, WebRTC is not always browser based; it can be operated from within a mobile telephone and from within any type of application—browser, mobile application, desktop application or otherwise.

Typically, before a participant joins a session, information concerning the participant and his or her computer is sent from the computer to the STUN server 150 in server computer 20. This information, termed "participant metadata," includes the role of the participant (e.g., host, participant, student, tutor, etc.), and stream information such as network parameters, etc., that will allow other computers to establish video and audio streams with the participant's computer. The STUN server receives comprehensive network information for each connection between the peer devices including network address, port, network routing information and timestamp of last successful connection. It stores this data in a local database or file-based cache storage. Some may also be stored in memory (e.g., RAM).

A typical STUN server 150 stores such participant metadata in a memory cache for later distribution to other participants. The role of server 150 is general participant tracking and identification of participants. Server 150 does not send or receive video or audio streams to or from participants; it simply informs all participants which other participants are in the current session. Thus, server 150 uses very little bandwidth. In another embodiment a server on central computer 20 does receive video or audio streams from participants and distributes these streams to the other participants.

Illustration of Video Conference Sessions

FIG. 5 illustrates a session 400 of a video conference with an online, shared, (currently) blank whiteboard region 430 in the browser 404 of the presenter computer during a session. The Web site and unique room identifier appear in the address bar of the browser. Shown is a video image 410 of the presenter, taken via the camera of his or her computer, an option 420 to invite another participant to the session, and options 428 to move to different pages within the session, or to draw on or otherwise manipulate a whiteboard within the session using a pencil tool. Video image 410 of the presenter may also be a still image, as may any of the other video images.

Button 422 allows the presenter to enable or disable his or her device camera, button 424 enables or disables the microphone, and button 426 enables or disables sharing. The following (among other) information may be shared: a portion of the presenter's computer display screen; a particular window on that screen (e.g., an application executing); a file or document of an application; the entire display screen (the "desktop"); the whiteboard of the GoBoard; video from another camera attached to the participant's computer; etc. all being generally referred to as "shared content." A participant may enable his or her camera and microphone by clicking upon buttons 422 or 424 at any time. Button 427 opens a chat window (described below) by which all participants my send messages back and forth.

These buttons 422-427 (once a user is logged in) appear on the left-hand side of the video box on the computer corresponding to the image captured by the camera of that computer. E.g, browser 404 shows the computer of person 410 who is sitting in front of the computer with browser 404. These buttons can be toggled or selected by the user of the instant computer at any time during the session.

Also shown on the presenter computer are video images 412, 414 of other participants in the video conference in a gallery view. Each of the other computers being used by participants 412 and 414 will also have a similar screen as in browser 404, although the gallery view may be in a different order, and buttons 422-427 will appear to the left of the computer owner's image, etc. Further, as mentioned above, each participant may be accessing the video conference using a browser, a local application on a computer, or an application ("app") that has been downloaded to a mobile device; thus, the screen of each participant computer may appear differently than that of user 410 who is using a browser on a desktop computer.

Figure 6:
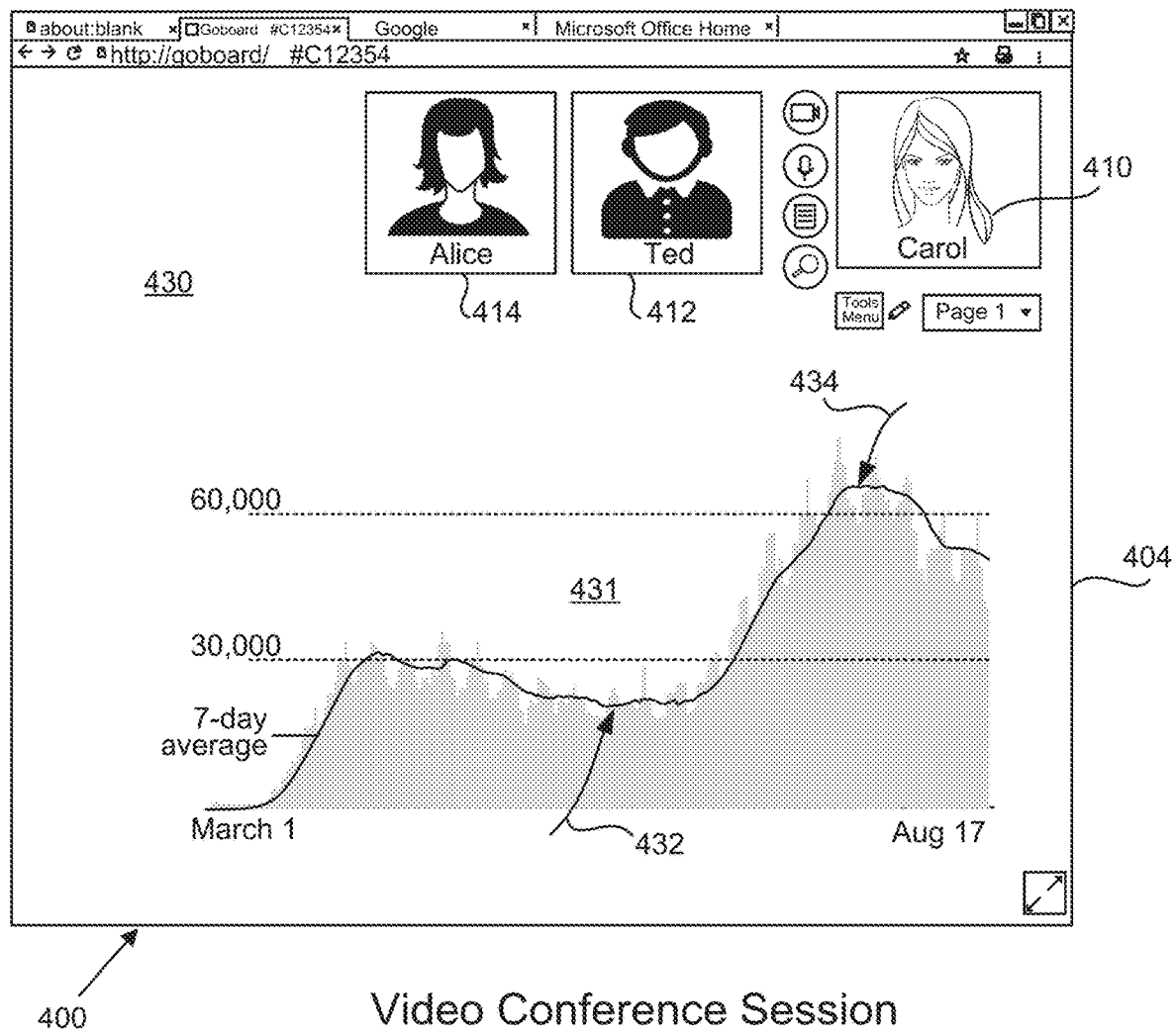
FIG. 6 illustrates the video conference session in which a participant has added whiteboard content to the shared, online white board.

FIG. 6 illustrates the video conference session 400 in which participant 410 has added whiteboard content to the shared, online whiteboard. As shown, the participant has added graph 431 which now appears on the shared, online whiteboard 430 and will appear on the display screen of each of the other participant's computers. In addition, participant 412 has added arrow 432 and participant 414 has added arrow 434 to the whiteboard. This information may be added to the whiteboard in a variety of manners described in U.S. patents '561, '943 and '885 referenced above, such as by selecting a tool and drawing on the screen with a mouse or touchpad, by using a stylus or finger on the touch screen of a tablet computer or mobile telephone, by uploading a photograph from the participant computer or downloading from a source on the World Wide Web, by using a camera of the participant computer, etc. Of course, the content may be other information such as text, a photograph, equations, hand-drawn images, calculator, etc. In this example, the graph has been drawn on the screen by Carol using the graphing, text, and line tools available at 428 generally. Ted and Alice have added arrows by also using the tools available on their screens.

Figure 7:
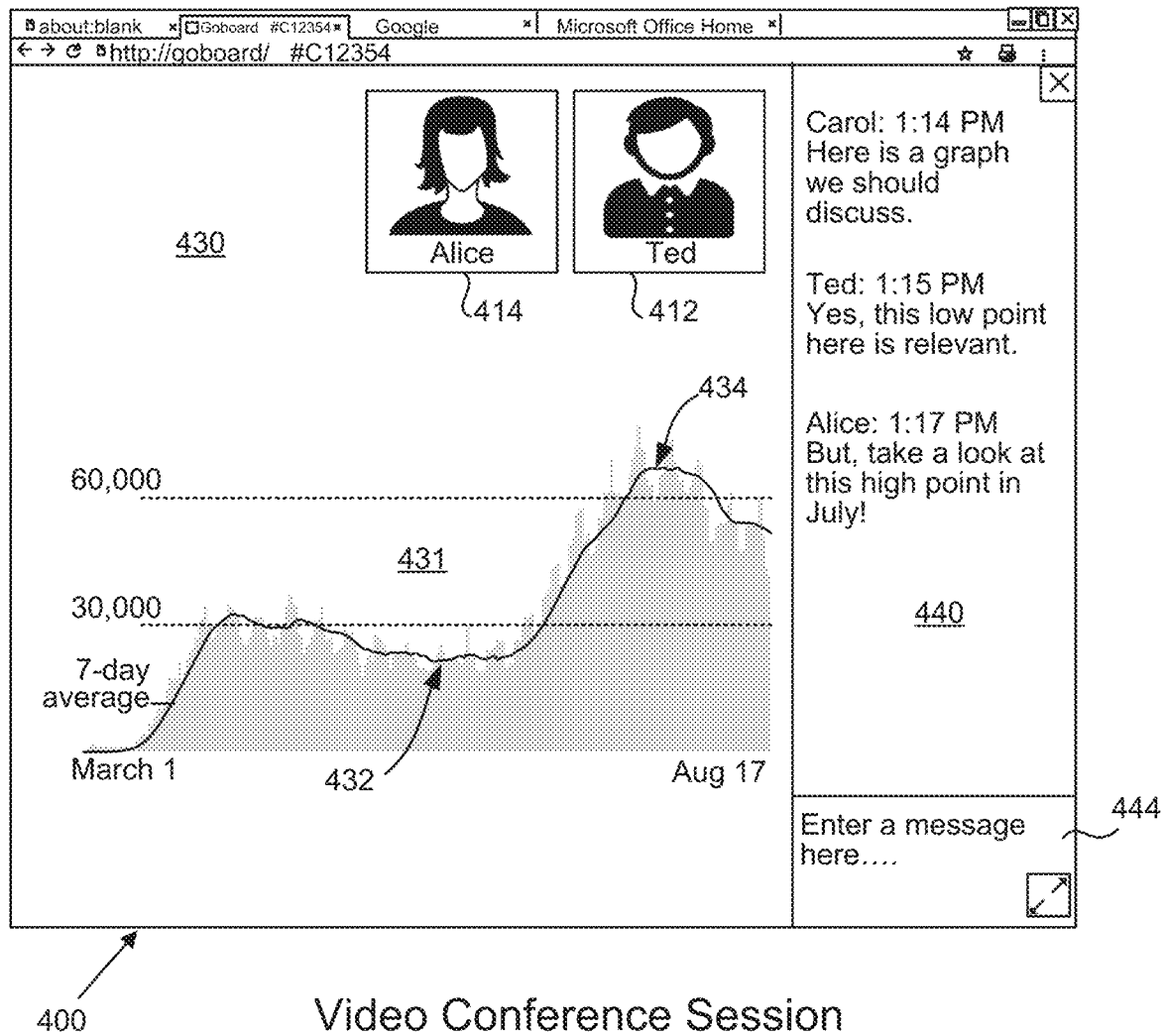
FIG. 7 illustrates the video conference session in which the chat window has been opened.

FIG. 7 illustrates the video conference session 400 in which the chat window has been opened. In this example Carol has selected the chat button 427 which opens chat window 440. As shown, graph 431 remains on the whiteboard and the chat window opens on the right side covering Carol's image. Other arrangements are possible, such as placing the chat window along the bottom of the screen, having the chat window take up the entire display screen, etc. Shown are three short messages typed in order by the participants regarding the graph. At this point in time the session includes the three participants, the graph on the whiteboard and the messages in the chat window. The chat window 440 appears on the display screen of each of the other participant's computers although not necessarily in the same location depending upon how the participant is accessing the video conference.

Figure 8:
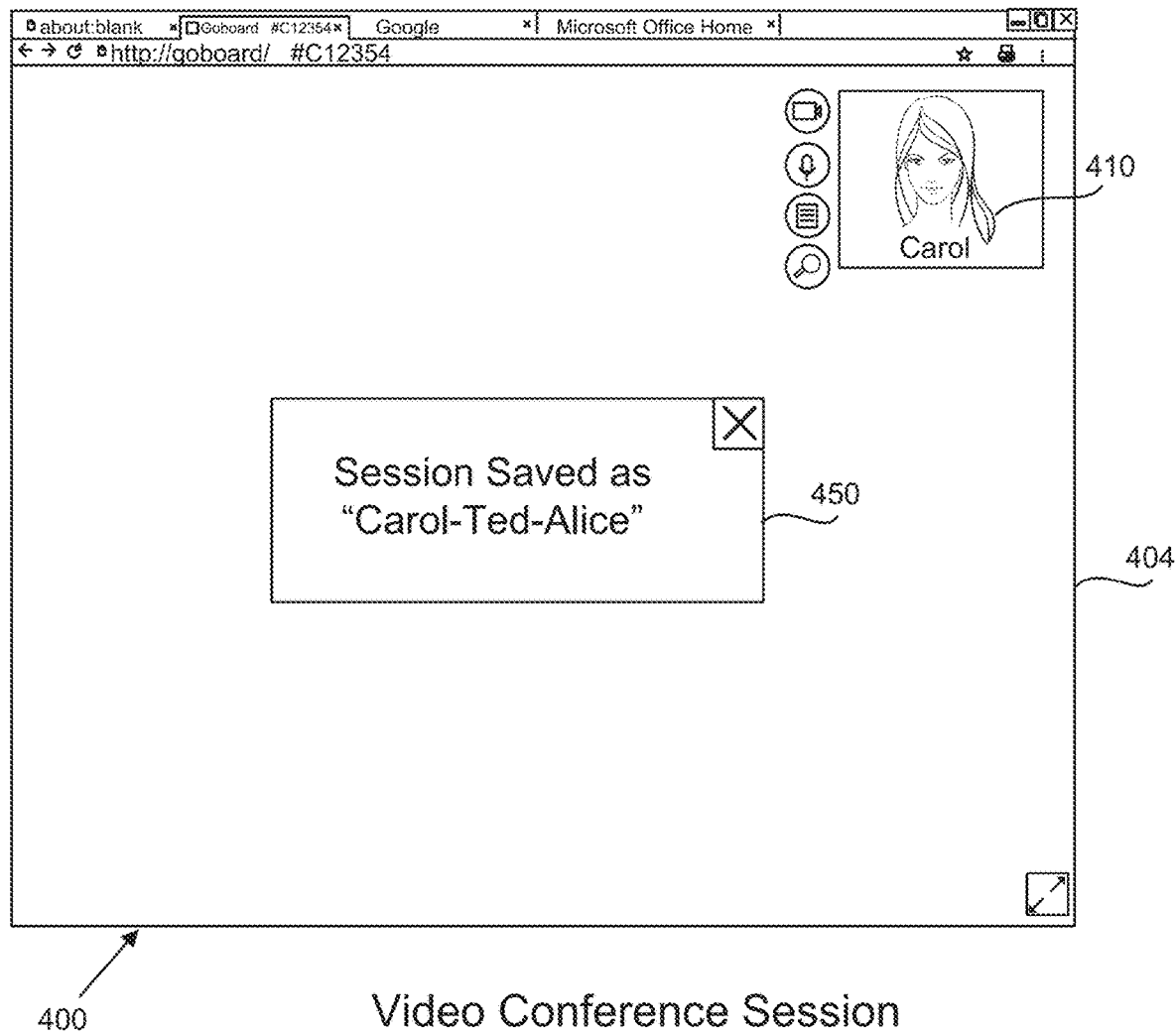
FIG. 8 illustrates the video conference session in which the session has ended.

FIG. 8 illustrates the video conference session 400 in which the session has ended. In this example, both Ted and Alice have left the session but Carol remains. The information on the shared whiteboard and the chat window has been cleared from the session (to enable Carol to hold another conference without that information option 480), and the video conference application 101 (via the browser or local application) informs Carol in a window 450 that the session has been saved under a particular name. As described below, another option is to retain both the whiteboard and the chat window even after the other participants have left the session. Instead of automatically naming the session, application 101 may open a window that prompts Carol to name the session. Once that input is received, application 101 places that name in column 812 for easy later retrieval by a participant. Session names may also be provided by the host when prompted by the application in any of FIGS. 23-25.

Figure 9:
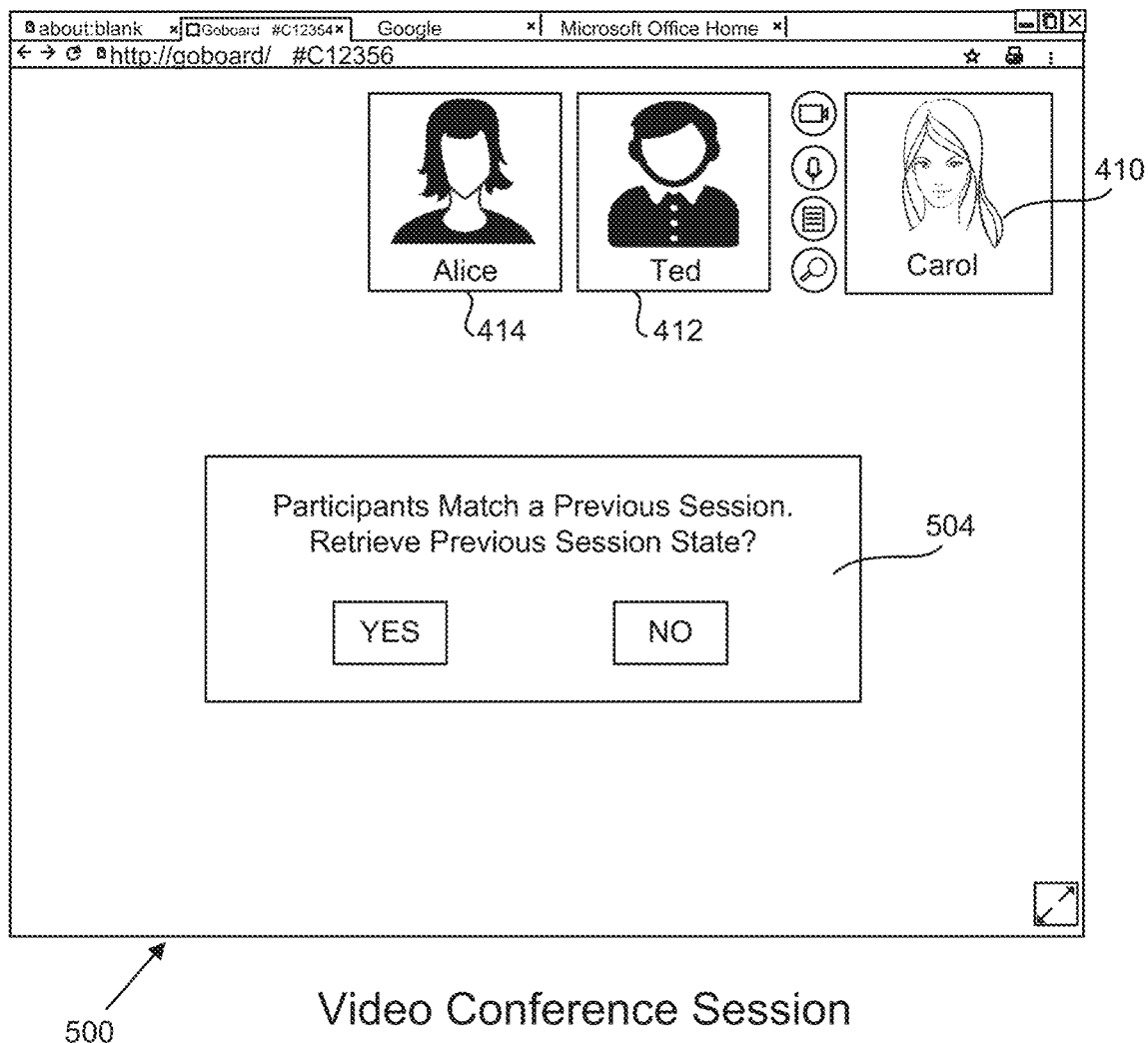
FIG. 9 illustrates a new video conference session occurring at a later time that includes the same participants.

FIG. 9 illustrates a new video conference session 500 occurring at a later time that includes the same participants. Shown are the same participants Carol, Ted and Alice at the outset of a new session with no whiteboard content and no chat window contents. Application 101 has automatically detected that the participants are the same as in a previous session and displays window 504 on the computer of the host Carol, asking if the previous session state should be retrieved. In this example, Carol will choose "Yes."

Figure 10:
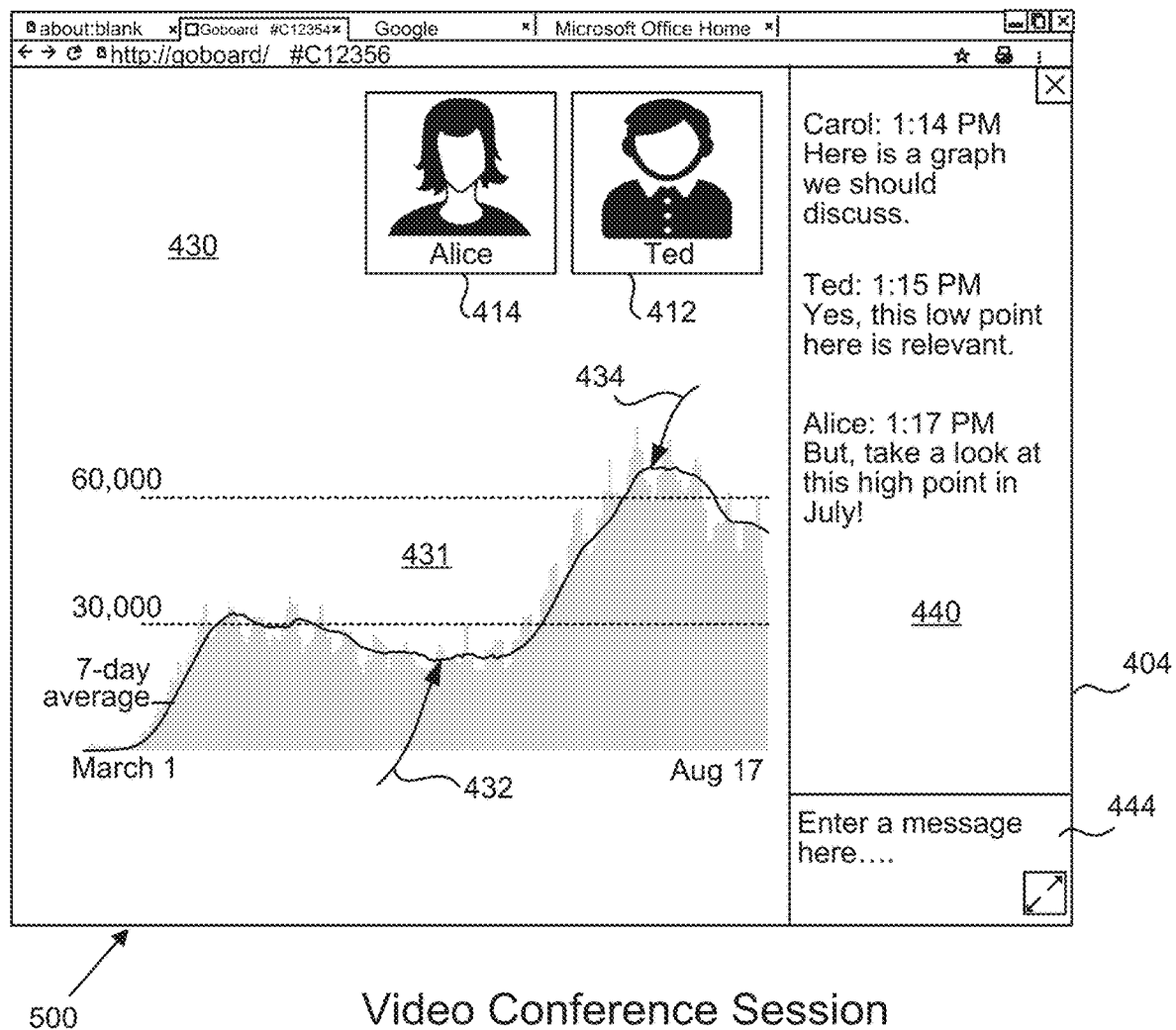
FIG. 10 illustrates the new video conference session in which the previous session has been retrieved.

FIG. 10 illustrates the new video conference session 500 in which the previous session has been retrieved. Shown in this new session is the same graph 431 (with its annotations) that appeared on the whiteboard of the previous session and the same chat window 440 including the same messages as before.

Figure 11:
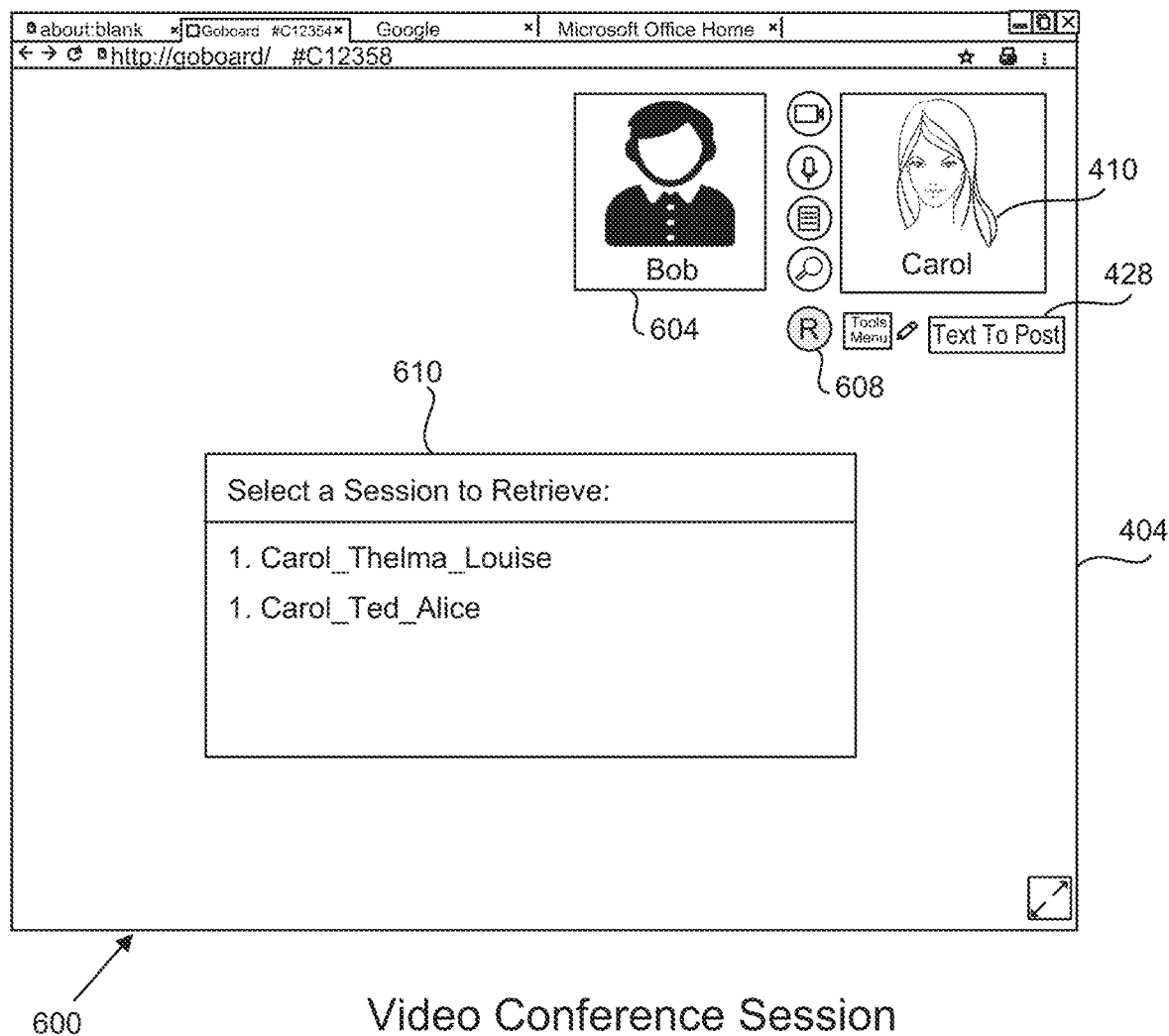
FIG. 11 illustrates another video conference session in which the host receives previous content.

FIG. 11 illustrates another video conference session 600 in which the host receives content and records a session. In this example, Carol has initiated a new session and invites Bob to participate. Initially, the session has no whiteboard content and no chat window content. Carol selects button 608 ("R", Record) and application 101 responds by recording video, audio and the screen of the session: carol also selects text-to-post option at 428 in order to receive whiteboard content via text message.

Figure 12:
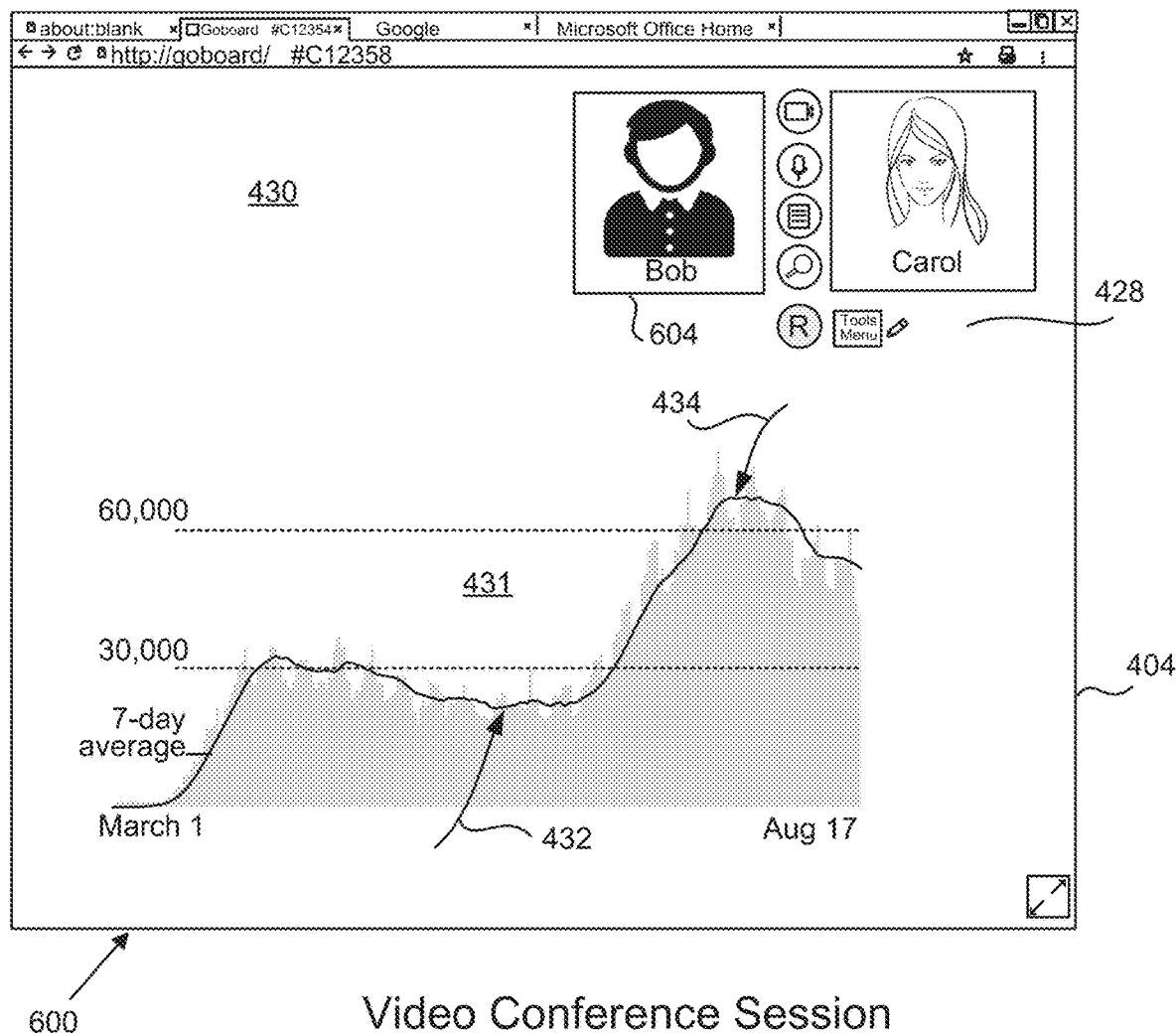
FIG. 12 illustrates the video conference session in which previous content has been retrieved.

FIG. 12 illustrates the video conference session 600 in which a graph 431 has been received via a text message, for example. In this example, the graph 431 has been received and placed into session 600 with Carol and Bob and the session is being recorded.

Video Conference Session Preferences

Figure 13:
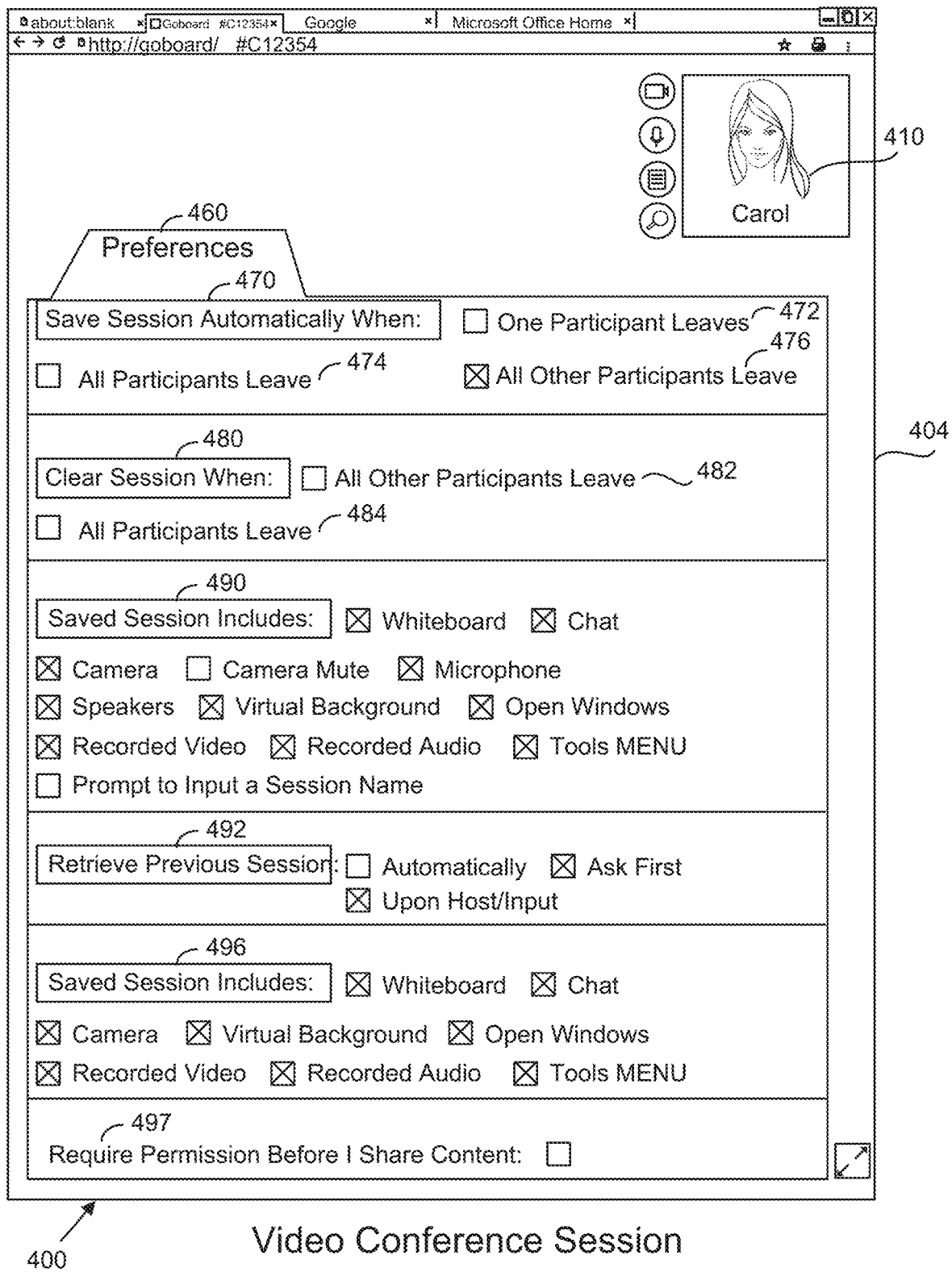
FIG. 13 illustrates the preferences that are available for a session.

FIG. 13 illustrates a video conference session and preferences that are available to the host. Carol may select "Tools Menu" options 428 in order to select and open a Preferences tab 460 in order to change various preferences associated with saving and retrieving sessions. Of course, depending upon whether a participant is using a browser, local application or "app" on a mobile device, such a preferences tab may be accessed and appear in different ways. These preferences will be saved in persistent storage under a user name in association with application 101 and made available when the user signs in to the session. The preferences may be saved in different manners, for example, these preferences may be associated with each user, with only the host, with the current session, or with a particular group of participants. In other words, the preferences may apply whenever the host is present, only for the current session, or only when a particular group of participants is present, depending upon the implementation.

Option 470 allows the host to choose when the last state of the session, i.e., the whiteboard, chat window, tools, open windows, etc., are saved during session. Selecting option 472 means that as soon as one participant leaves the session state information will be saved and will not be saved again during that session. Selecting option 474 means that when all other participants have left, except for the host, that the session state information will be saved. Even if the host were to make changes after that point in time, that information would not be saved. Selecting option 476 means that once all participants have left, including the host, that the session state information will be saved. This last option (equivalent to the host selecting the "End Meeting" command or similar) is the default option and makes it simple for participants to participate in session, end the session, and be sure that their session state information will be saved.

Option 480 allows the host to choose when the content of the current session is cleared, meaning that the whiteboard, chat window, tools, any open windows, etc. are removed from the current session, allowing other participants to join and not see what had transpired before. Selecting option 482 means that as soon as all of the participants leave, except for the host, that the whiteboard and other content (chats, shared files, virtual background, etc.) will be cleared from the current session allowing the host to invite others to the session who will not be able to see what had transpired before (not including clearing host device settings such as camera, microphone, speakers, etc). Selecting option 484 means that only when all participants leave, including the host, that the session information will be cleared. Option 484 allows the host to remain in the session, if desired, and invite other participants who may then view the whiteboard, chat window, etc., to see what had transpired before. Selecting option 482 may clear everything including files, virtual background, settings, etc., or selecting that option clears everything except for settings.

Option 490 allows the host to choose which information is saved in a saved session. Options include the shared whiteboard, the chat window and its contents, is the tools menu used with the whiteboard, any open windows that are displaying shared files, any recorded video or audio that had been recorded during session (or that is still being recorded), along with the settings for each participant that include the camera, microphone, speaker, virtual background, and video and audio mute settings. Further, the settings for all of the participants may be saved at the same time and the host may also be prompted to name a session.

Option 492 allows the host to select whether a previous session will be retrieved automatically when the participants in the current session match those of the previous session; if not selected, then the host may elect to retrieve a previous session manually by clicking a button on his or her screen. Depending upon an implementation, the host may decide to retrieve a particular session unilaterally or all participants must first agree.

Option 496 allows the host to decide which content will be displayed on the computer screen of each participant when a particular session is retrieved. By default, all of the content shown is checked, meaning that all of this content (if available from a previous session) will be displayed for each participant when a session is retrieved. In practice, it is likely that a particular group is only using some of this content, meaning that it is unlikely that a confusing display of white boards, chats, open windows, tools and recorded video will be displayed when a previous session is retrieved. Nevertheless, the host may elect to only display certain of this content when the session is first retrieved. Depending upon the implementation, the host may decide which content is or is not automatically displayed.

Save Video Conference Session

Figure 14:
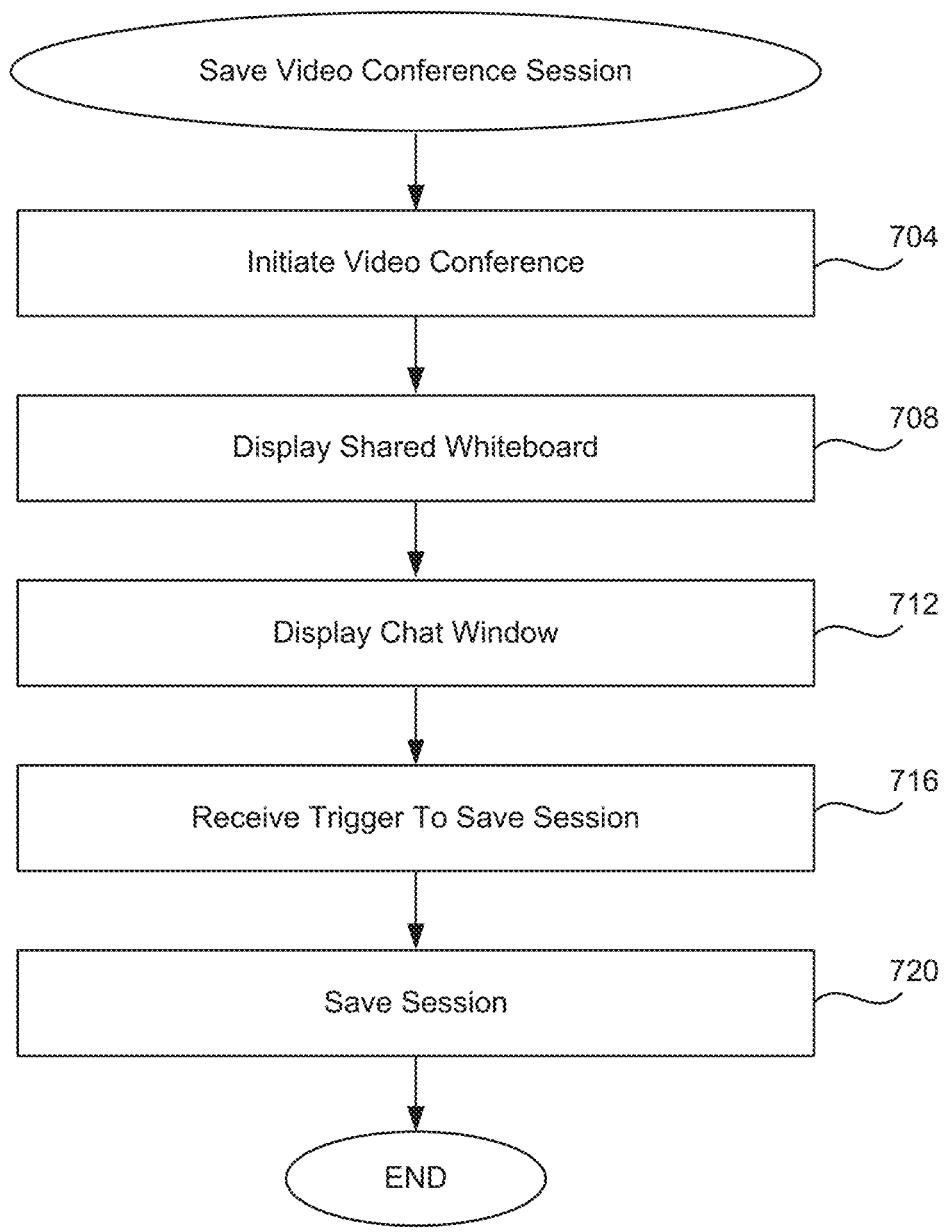
FIG. 14 is a flow diagram describing one embodiment by which the contents of a video conference session are saved.

FIG. 14 is a flow diagram describing one embodiment by which the contents of a video conference session are saved. In this example, the flow references FIGS. 5-8. In a first step 704, a video conference is initiated and any number of participants join the video conference each using a computer, tablet computer, mobile device, etc., each participant accessing the video conference via browser software, a local application downloaded to a desktop computer or laptop computer, or via an application downloaded to a mobile device.

In step 708 one or more participants add content to a shared, online whiteboard of the video conference and this whiteboard is displayed on each of the participant's computers, such as is shown in FIG. 6. Once added, this whiteboard content will be stored by video conference application 101 on a remote server computer in persistent storage, such as in storage 122, and future changes are also stored there. Additionally, in order to facilitate rendering the whiteboard content on each computer, the whiteboard content will also be stored in memory of the browser, local application or application ("app") of the local computing device, as the case may be.

In step 712 a participant opens a chat window and one or more participants add text to this chat window which is displayed to all participants, such as is shown in FIG. 7. Once added, this chat window content will be stored by video conference application 101 on the remote server computer in persistent storage, such as in storage 122, and future changes are also stored there. Additionally, in order to facilitate rendering the chat window content on each computer, the chat window content will also be stored in memory of the browser, local application or application of the local computing device as the case may be.

In step 716 a triggering condition is received by application 101 (via a browser, local application or "app," as the case may be) indicating that the contents of the current session should be saved in persistent storage and associated uniquely with the session participants. Typically, this triggering condition is based upon one or more participants leaving the session. Application 101, in the course of providing the video conference, is aware of the connections to each participant computer. When a participant leaves the session, the live socket connection to that computer is dropped and application 101 becomes aware that the connection has been dropped. In one embodiment, when a participant leaves, or otherwise exits the session, application 101 detects that the live socket for that computer has been dropped and the session should be saved. In an alternate embodiment, the session is only saved when all the participants other than the host leave the session. In yet another embodiment, the session is only saved when all participants have left the session, i.e., the host has ended the session and all live sockets have been dropped, or are about to be dropped.

Once the trigger has been received, in the next step 720, application 101 proceeds to save the current session, e.g., session 400 as shown in FIG. 7, in a database for saving which is described below in FIGS. 17A and 17B. Accordingly, step 720 will save session 400 as described below in session database 800 and in participant table 830 into persistent storage on computer server 20. If application 101 has already stored the whiteboard and chat window in persistent storage it is not necessary to save them again. Preferably, though, upon the trigger, this state information (whiteboard, chat) is moved to a dedicated storage location that is immutable, that is, a location other than the working storage location where the application 101 stores state during a session. This allows a host to save a session after all other participants have left, yet continue adding to a whiteboard to show a new participant who joins the session.

Retrieve Previous Video Conference Session

Figure 15:
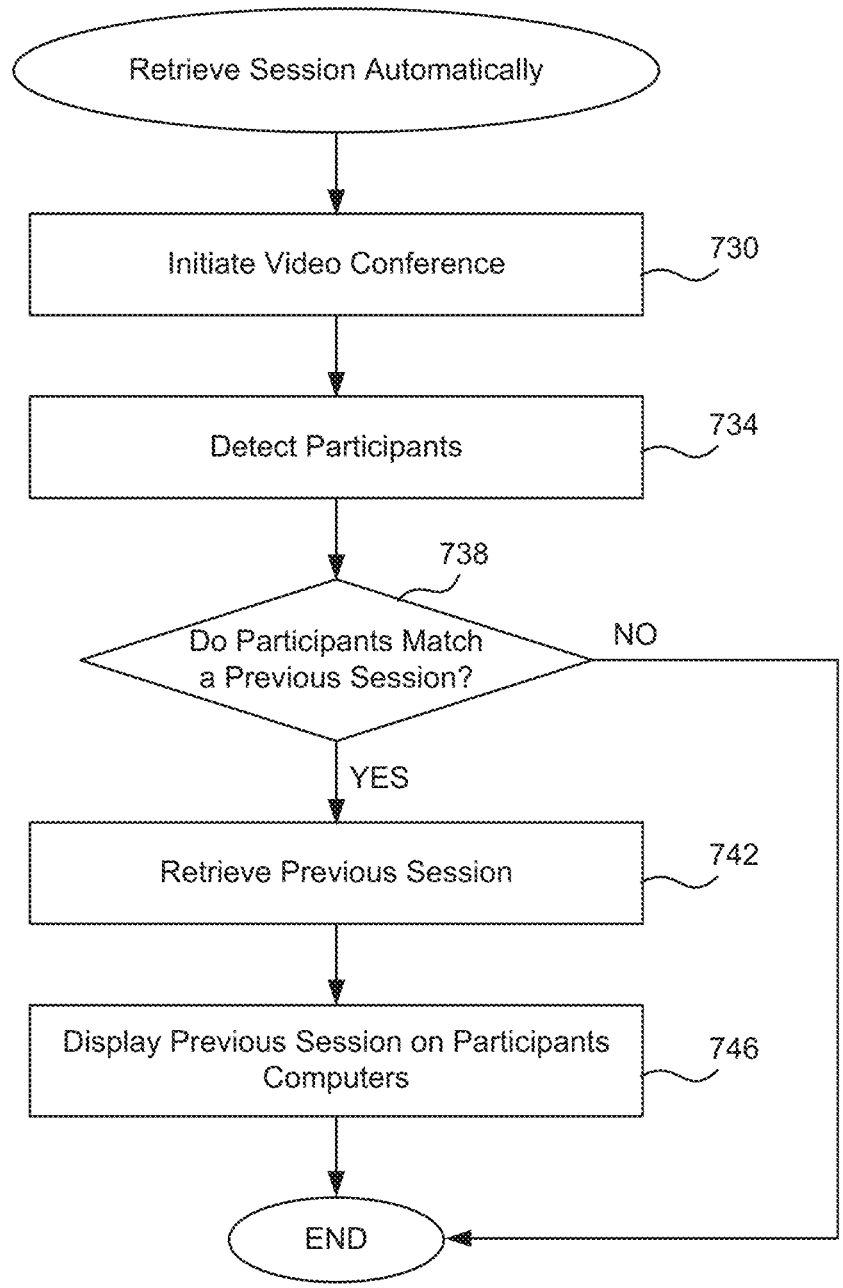
FIG. 15 is a flow diagram describing one embodiment in which a previous session is retrieved automatically.

FIG. 15 is a flow diagram describing one embodiment in which a previous session is retrieved automatically. Advantageously, when the same participants from a previous session take part in a subsequent session, the state of the previous session (such as whiteboard, chat window, shared files, open windows, etc.) is retrieved automatically and they can take up right where they left off.

In a first step 730 a video conference is initiated between any number of participants such as those participants shown in any of the figures herein and may occur as has been previously described in step 704. In this example, these participants have participated in a previous session, that session ended, was saved, and now the same participants desire to take part in a new video conference session which occurs at a later time than the previous session. Advantageously, the content and device settings that distinct group of participants had shared, viewed, initiated or created in the previous session will now be retrieved automatically for their use.

In a next step 734 application 101 detects the participants that have joined the new session. Detection may occur on a rolling basis as participants join the session, detection may be initiated after a set time period after the beginning of the session (e.g., two minutes after the session begins, and all participants are thus put on notice to be present), detection may occur by the host or one of the participants pressing the "Retrieve Session" button 1031 when all necessary participants are present. In one preferred embodiment, application 101 waits to perform step 734 until the host (or a participant) presses the Retrieve Session button 1031 in FIG. 26A once the appropriate participants have joined. If detection occurs on a rolling basis then the match of participants may change as new participants join.

Typically, application 101 on the computer server will detect that a participant computer has requested to open a socket connection for a particular session and will then retrieve the participant name that has been entered on that computer for that session. As described herein, that name may be a user account, user name, user initials, unique e-mail address, etc. These participant names or identifiers of this current session will then be grouped together and defined as the current group of participants.

Next, in step 738 application 101 attempts to determine if the current participants match the same set of participants from a previous session. Any of the three techniques described in FIGS. 17A-17D may be used. If using the first technique, reference is made first to participant table 830 to determine a match of participants using column 842. In this example, since Carol, Ted and Alice were part of session 400 their names appear in the first row, and thus when they join again in session 500 there will be a match with the first row. In this example, that group did hold video conferences on August 21 and August 22. In one embodiment, the application simply chooses the latest session as the match since it is most likely that the participants will want to see the whiteboard and chat window from the latest session. In another embodiment if the host has enabled the Ask First setting, the application may display the dates of these two sessions and ask the host to choose one of those sessions for retrieval. In this fashion a previous session for this particular group of participants is identified.

If using the second technique, the current group of participants (identified by their names, e-mail addresses or other unique identifier) is used as a key to search through column 854 of database 850 of FIG. 17C. By way of example, if the two participants are Bob and Carol, the application will detect matches in rows 858-860, 862-863, 865, and 867, thus indicating that there is shared content in column 852 that this group should be able to access. If using the third technique, the current group of participant identifiers is used as a key to search through column 871 of database 870 of FIG. 17D. By way of example, if the two participants are Alice and Carol, the application will detect a match in row 884, indicating that there is content that may be accessed in columns 872, 875, 877 and 878. If there is no match (using any of this these techniques or others) then nothing is displayed on the participant screens and the session is allowed to continue as normal. If there is a match, then a window 504 is displayed (or window 1032, 1042 or 1052, depending upon the settings 492 chosen) and the host chooses "Yes" in this example in order to retrieve the previous session 400.

Next, in step 742 application 101 uses the results from matching in step 738 in order to retrieve the appropriate content using any of the three techniques or a similar technique. If using the first technique, then the matched session identifier from column 844 is used to find the same identifier in column 814 of session database 804. In this example the first row is matched. Once that row is matched, the application proceeds to identify all of the previous session information using the whiteboard link in column 818, the chat link in column 820, the device settings in column 822, any shared files from column 824, virtual backgrounds from column 826, recorded video or audio from column 828, and any tool palettes from column 829.

If using the second technique, then those rows identified in database 850 from step 738 are used to determine which pointers to follow from column 856 in order to find the content that should be retrieved. For example, if the participant group was Alice and Carol, then pointers from rows 861 and 868 will be followed to find, respectively, the file Workbook Sales and the device settings for each of the participants. If using the third technique, then each content link in the row identified in step 738 is followed to find and it retrieve the appropriate content. For example, if the participant group was Carol, Ted and Alice, then the links in columns 873 and 874 are followed to retrieve the whiteboard and chat window from their previous session. The device settings for each participant may be retrieved from column 878 or a link may be followed to retrieve those settings.

Retrieval of a particular item of content may be performed in different manners depending upon the type of content and where it is stored. For content that takes up a large amount of space (such as whiteboards, chats, shared files, virtual backgrounds, video and audio recordings, etc.), it is preferable that a link or a pointer to this content be stored in a field of the database (such as database 800, 850 or 870). For content that takes up minimal space (including computer device settings such as camera, microphone, speaker, etc.) it is possible to store that content directly in the field of the database for simpler and faster access.

Typically, it is contemplated that the large items of content will be stored on or in association with server computer 20 (such as a persistent storage 122 or in an associated remote database system 80). A pointer link to content stored in such location allows access to that content and such content may be accessed by using that link.

Also, as is been described herein, some content such as shared files may be stored with a third-party storage service such as Dropbox. In order to access and retrieve such shared files, the protocols and procedures required by that third-party storage service are performed.

Once all of the content belonging to a particular group of participants has been retrieved by application 101, then in step 746 the application displays this previous content on the participant computers and changes the device settings on each participant computer as per the retrieved settings. By way of example, any shared files are shown within the file box 912 on each of the participant computers. A participant may then share one of those files by selecting sharing icon 426 and then the desired file. A file in the shared file box may be stored locally in open by the participants, or, the file may be stored remotely and the participant will be able to share it on the screen.

Any retrieved whiteboard or tool palette is then displayed on the screen of each participant computer and any participant may then proceed to modify that whiteboard. Similarly, any retrieved chat window is displayed on each computer and is now available for the chat to continue. Any content that had been shared in an open window is again displayed in an open window on each participant computer. Any virtual background retrieved for a participant is now placed as the background of that participant and is visible to any of the other participants in the gallery view, for example. The formerly used device settings for each participant computer are also retrieved and are now implemented upon each participant computer. For example, referring to FIG. 4, application 101 now automatically implements the retrieved settings on each participant computer (such as camera, microphone, speakers, whether any muting is in effect, etc., without needing each participant to provide input as had been done in FIG. 4. Of course, once the device settings are implemented, any participant may change the settings manually on his or her computer. Any video or audio that had been recorded in the previous session is now displayed as an icon on the screen of each computer and may be selected by the participant for playing.

Examples of how this content appears on the participant screens as is shown in FIGS. 6, 7, 10, 18B, 19A-B, 20A-C, 21, 22, 26B, 27B, 28B, 29B, 30A, 30D, 30G, 30H, 31B, etc.

The application may also reference preference 496 as shown in FIG. 13 in order to determine which information is to be displayed. In one particular embodiment, all of the retrieved content for a particular group of participants is always displayed or implemented on the participant computers. In another embodiment, the host may uncheck certain of the boxes within region 496 and this has content will not be displayed on the participant computers but will still be available.

Accordingly, each participant computer in the new session now displays (or provides access to) the previous content from a previous session of these participants.

Retrieve a Previous Session Manually

Figure 16:
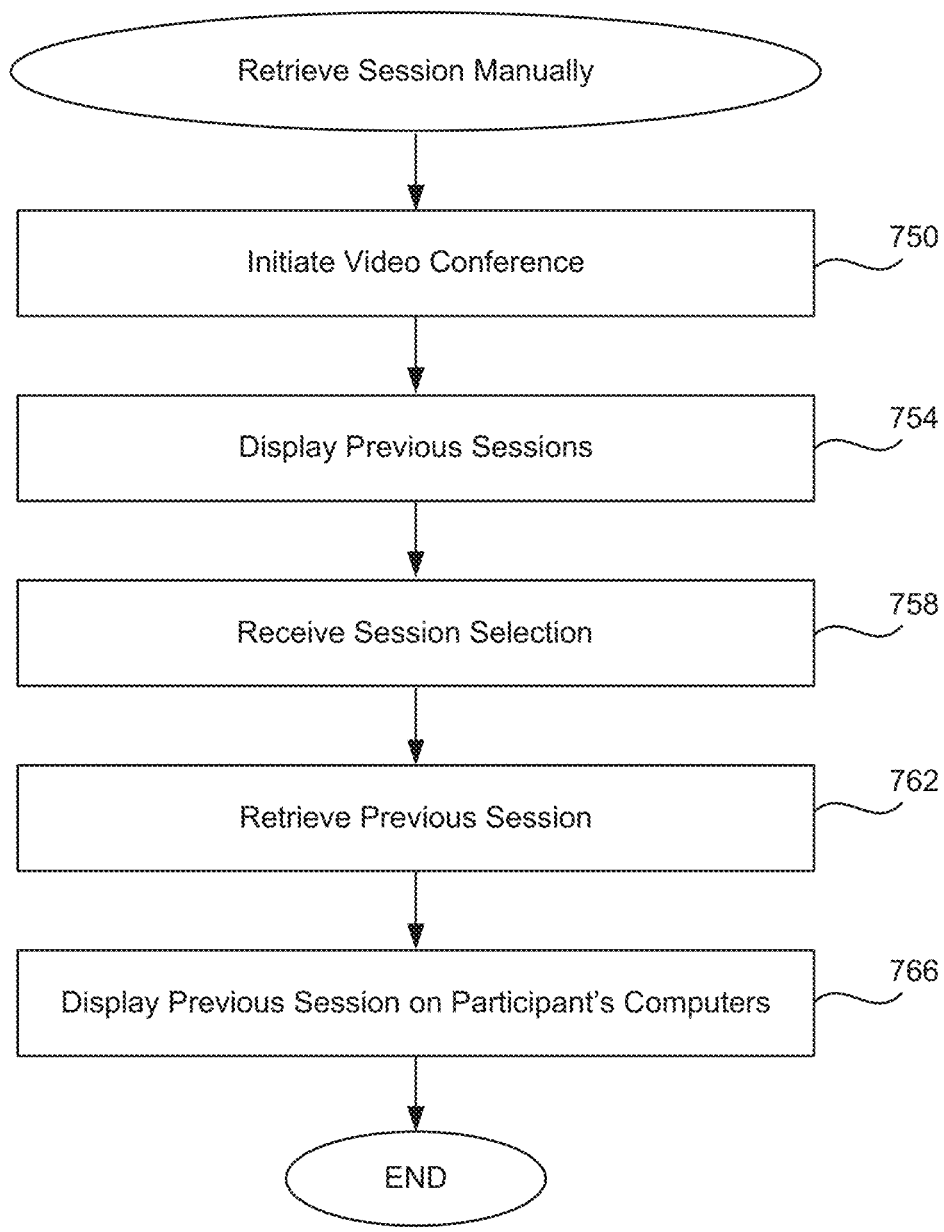
FIG. 16 is a flow diagram describing one embodiment by which a participant retrieves a previous session manually.
Figure 26A:
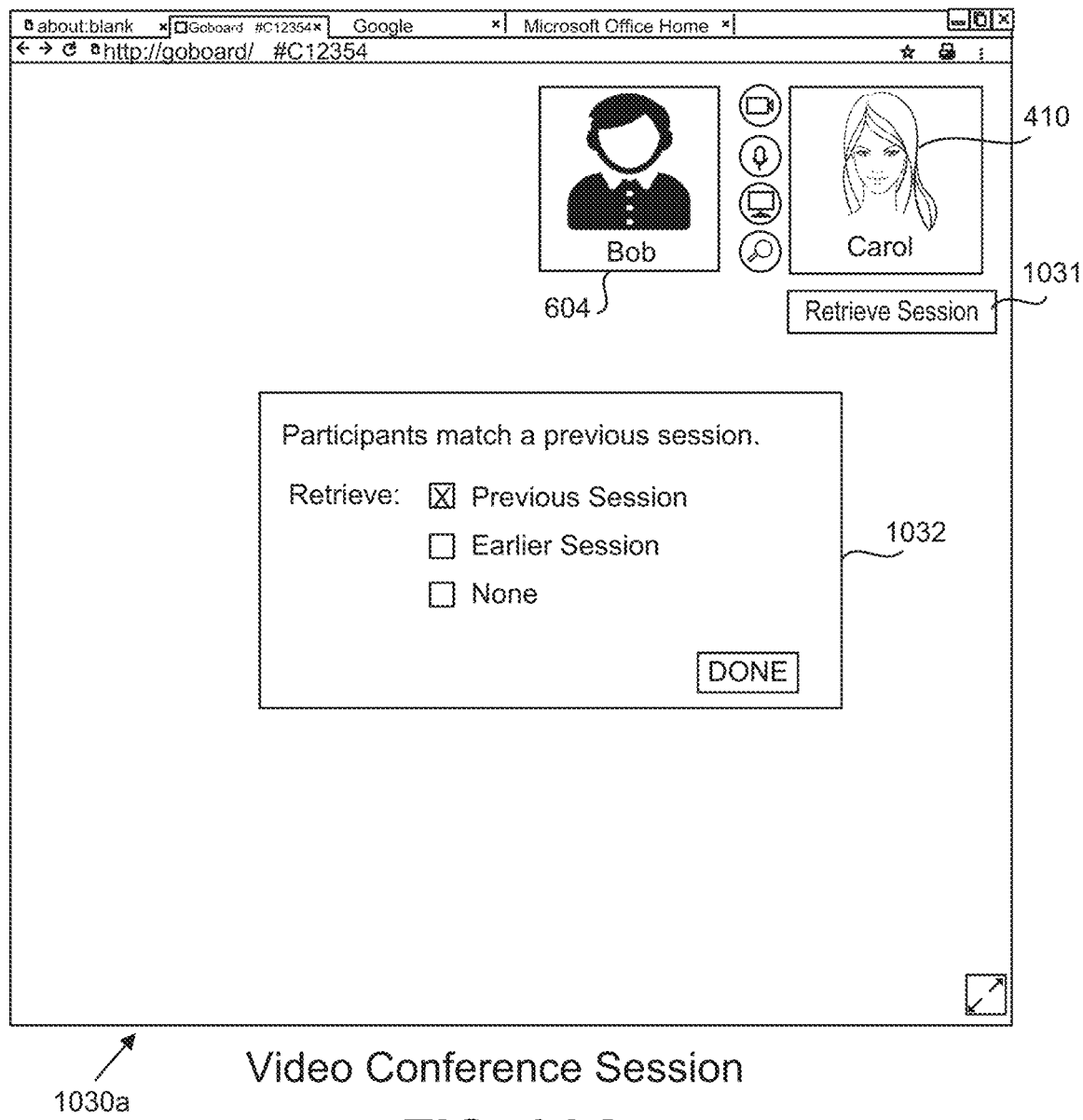
FIG. 26A illustrates a new video conference session for the participants Bob and Carol.
Figure 26B:
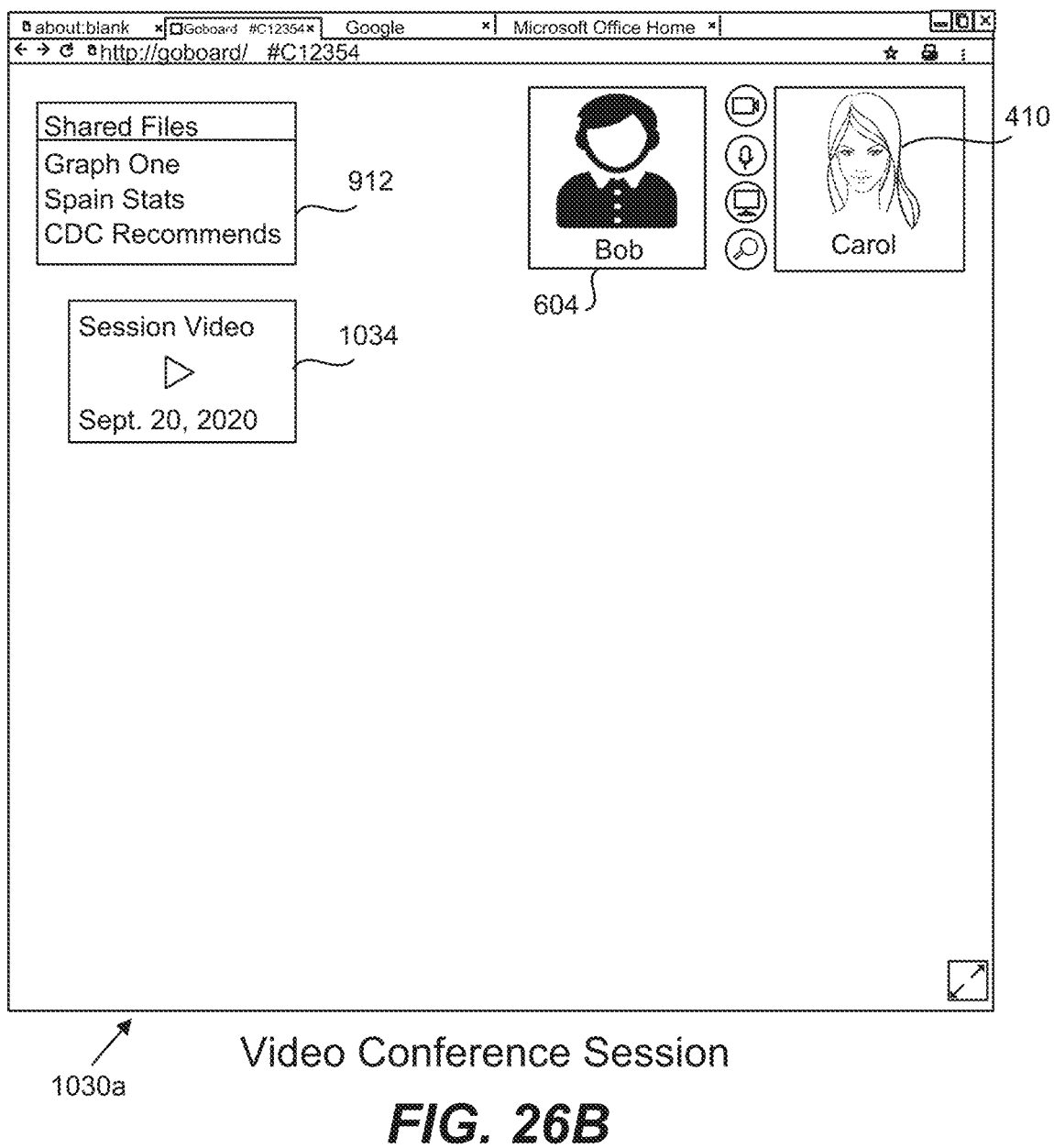
FIG. 26B illustrate the video conference session in which the previous session was selected.
Figure 27A:
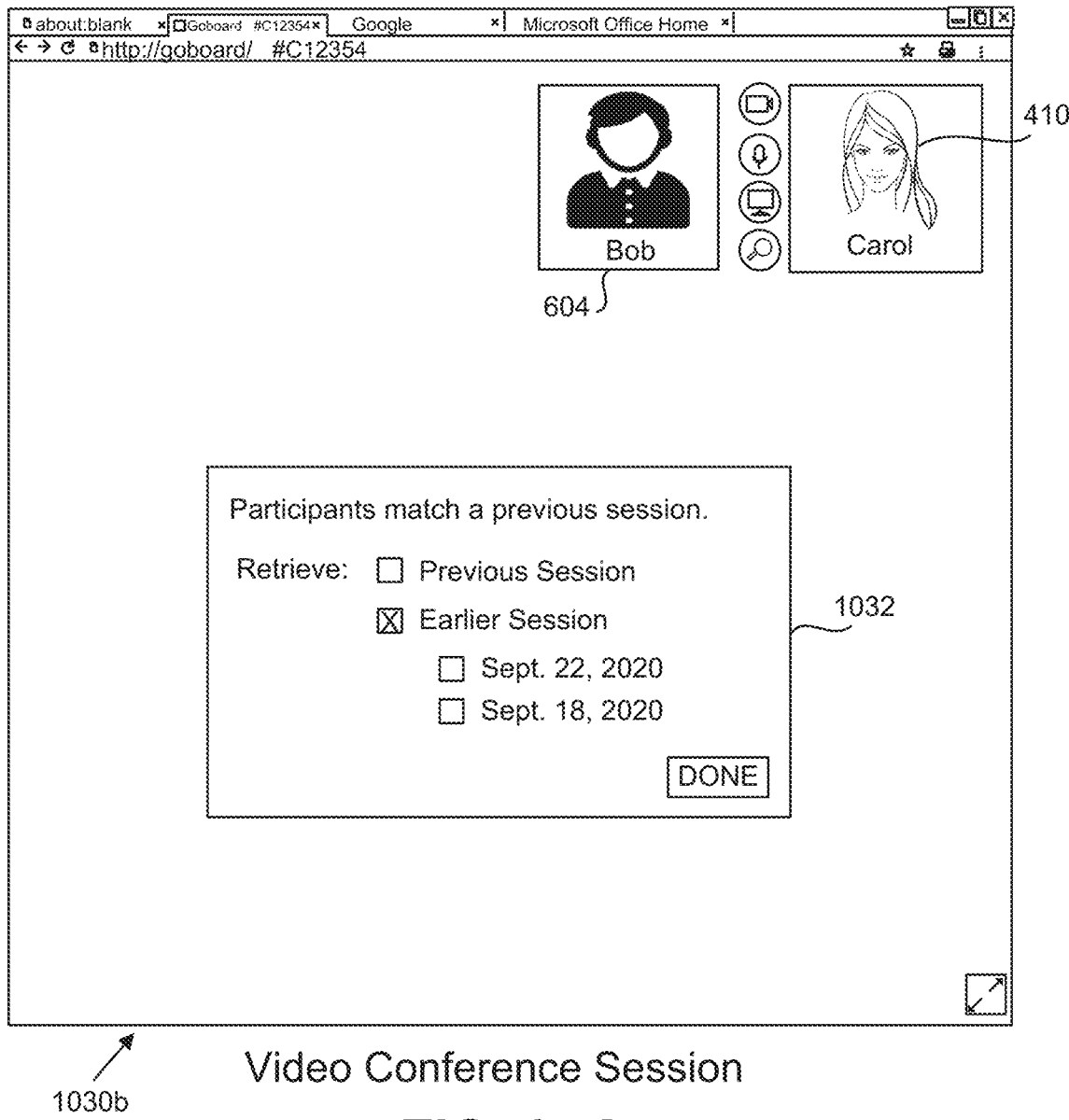
FIG. 27A illustrates a new video conference session for the participants Bob and Carol.

FIG. 16 is a flow diagram describing one embodiment by which a participant retrieves a previous session manually. Advantageously, a participant may manually retrieve a previous session in which the participants match, such as shown in FIGS. 26A and 26B and 27A and 27B. In a first step 750 a video conference is initiated with any number of participants as has been described, for example, in step 704. In this example, a video conference session 1030a or 1030b as shown in FIG. 26A or 27A is initiated with the two participants Bob and Carol. In step 754 application 101 determines there is a participant match and displays window 1032.

Figure 27B:
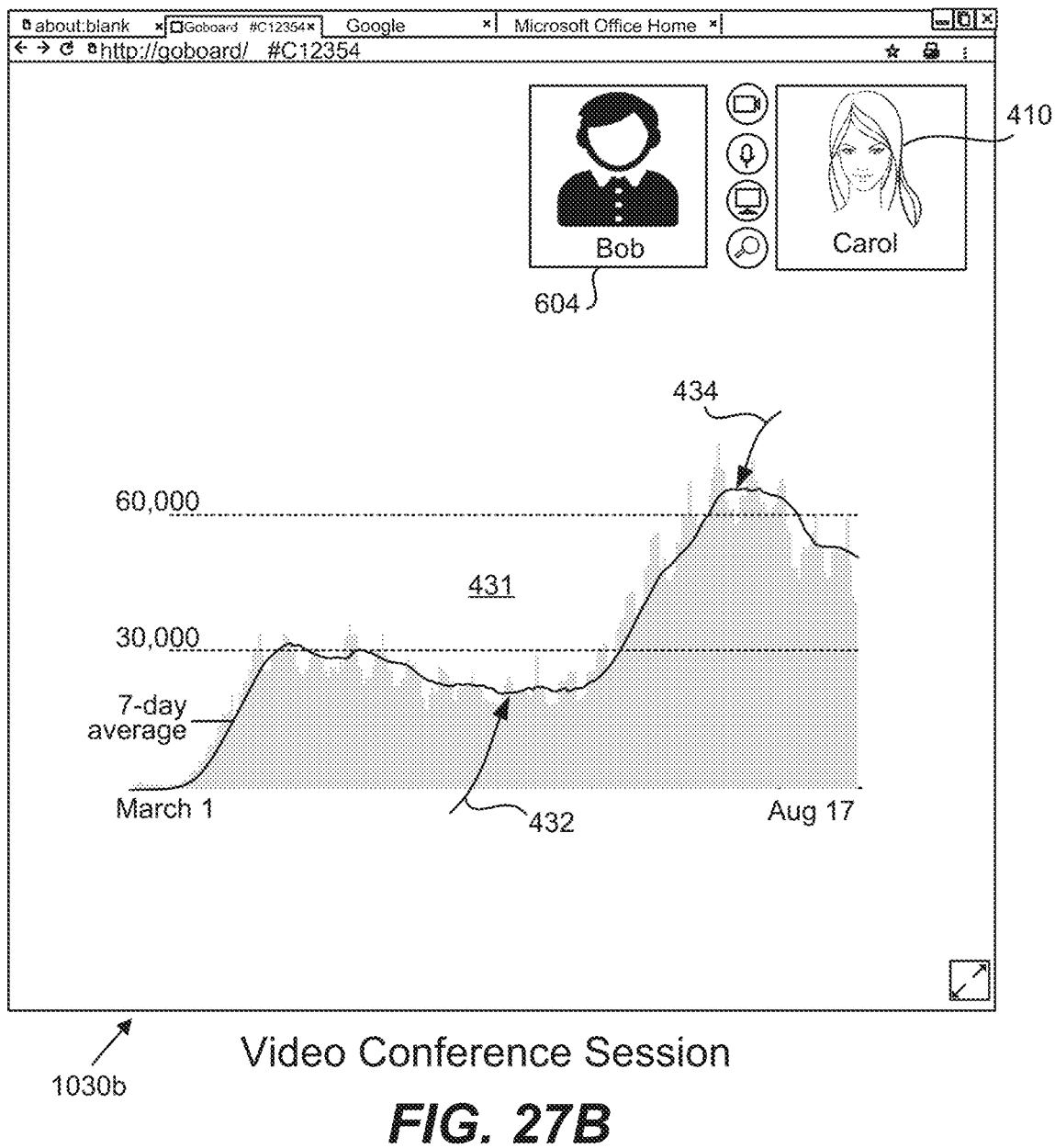
FIG. 27B illustrates the video conference session in which an earlier session was selected.

Next, in step 758 Carol may select Previous Session and this session selection is received by application 101. If Carol selects Earlier Session, then sessions 1036 are displayed and Carol selects an earlier session. In step 762 application 101 then retrieves this previous session selected using information in the first row of table 804. Accordingly, as described in step 742 the whiteboard and chat window are retrieved using the links in column 818 and 820, and optionally settings from column 822. Next, in step 766 this retrieved information (depending on the session selected) is displayed on all of the participant computers, namely those computers belonging to Carol and Bob. Accordingly, as shown in FIG. 12, Carol's computer now appears as shown in FIG. 27B, having the whiteboard from the original session 600, and this whiteboard will also appear on the display screen of Bob's computer. Or, if Previous had been selected, their computers appear as shown in FIG. 26B.

Video Conference Session Permission Databases

FIGS. 17A-17D illustrate various embodiments by which video conference application 101 keeps track of not only which participants have permission to access and view particular content (and which device settings are used) when in a particular group, but also where that content and settings are stored. FIGS. 17A and 17B illustrate one embodiment which is session centric; distinct groups of participants are listed in the table of FIG. 17B, while the sessions corresponding to those distinct groups are listed in the table of FIG. 17A along with the particular content permitted to be displayed for each session. FIG. 17C illustrates a second embodiment which uses a content-centric permission database; each item of content is listed followed by those distinct groups that have permission to access that content along with the location of the content. FIG. 17D illustrate the third embodiment which uses a group-centric permission database; each distinct group of participants is listed followed by the particular content that may be accessed along with its location.

FIG. 17A illustrates an example of a session database 800 that saves data of all sessions of a particular video conference service. In a first column 812 is saved a human-readable name of the session, such as a concatenation of all user names who participated in the session. Typically, each user will be required to type in their user name or initials or e-mail address before joining a video conference session. Alternatively, the user account (if existing) of a participant may be used. Or, each session name may simply be the host name, e.g., "Carol Smith," followed by an increasing integer such as "Carol Smith 1", "Carol Smith 2", etc. In this fashion, the host Carol can keep track of her sessions chronologically or the name may be input by the host. In any of the techniques, a session name may be saved and later displayed for easy reference by the host.

In a second column 814 application 101 saves a unique identifier for each session saved. Use of a unique identifier allows specific previous sessions to be identified and retrieved. In one example, the identifier is a meeting identifier, room identifier, or other unique code associated with a particular session. Some conferences use a unique identifier for every session initiated, while others may use a recurring meeting identifier that an individual or business may use periodically, such as a weekly meeting every Wednesday at the same time. In order to make such an identifier unique, as shown, a date may be added to the meeting identifier. In those situations where the same identifier may be used frequently throughout the day, a time-stamp may be added to this identifier to ensure that it is unique.

In a third column 816 the name of the host is added. This name may be the name that the host types in when joining the conference, his or her e-mail address, an account name of the video conference service used by the host, or other similar identifier.

Column 818 stores a pointer or link to a location in persistent storage where the whiteboard content of the session is currently saved. As mentioned earlier, the shared whiteboard state is stored in persistent storage of the computer server and column 818 provides a link to this location. Column 820 stores a pointer or link to a location in persistent storage where the chat window content of the session is currently saved. This whiteboard or chat information exists when the session ends, and application 101 will not delete this information when the session ends, but rather will ensure it remains and will store the links as shown.

Column 822 stores identifying information for the camera, microphone, video or audio mute, and speakers used on the host computer so that the host does not have to specifically select these devices when the previous session is retrieved. For example, if the host had set up a separate document camera to the side of his or her computer to be used as the primary camera, identifying information for this camera will be remembered, rather than a camera showing an image of the host. Although not shown, similar identifying information for the camera, microphone, etc., of the settings for the other participants in this session are also saved within column 822 each group of the device settings being associated with are of the participants.

Column 824 lists the shared files that each participant in a particular session had access to during that session (i.e., either because the participant was in the session when someone else shared a file, or because a participant joined a session and was granted permission to view a file that was currently being shared). In this simple example, session 808 shows that the three users have access to file "ABC" and a link is stored in the column indicating the storage location of that file. It is not strictly necessary that the name of each shared file be present in column 824. Only the link may be present, and when the link is traversed the file is located and at that point the file name and the file itself may be displayed on the participant's computers, such as shown in FIG. 18B.

Figure 22:
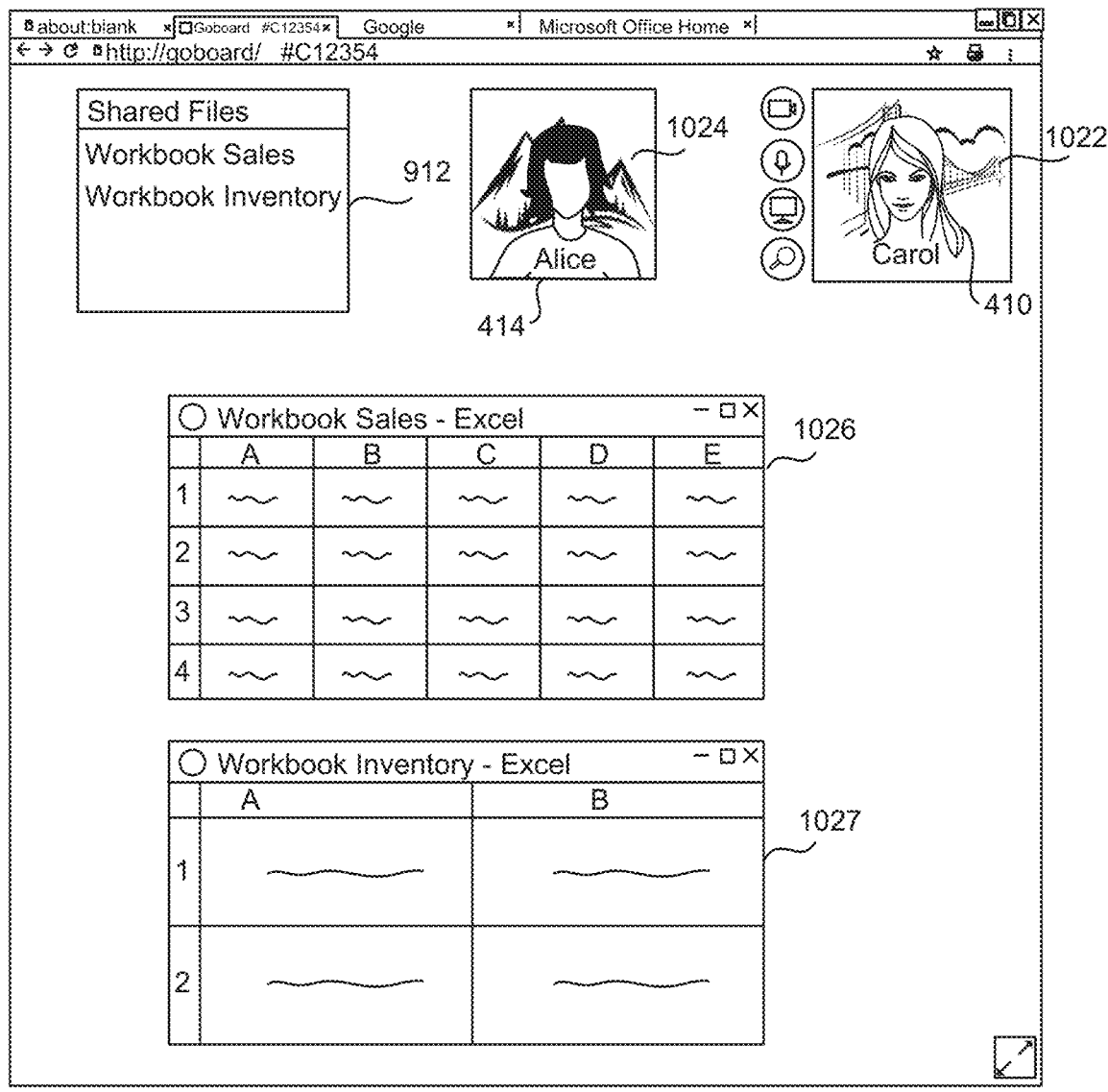
FIG. 22 illustrates a video conference session in which two files are open and each participant has a virtual background.

Column 826 provides, for each session, a link to the location of any virtual background used by any of the participants. As shown, for session 808 both Carol and Thelma have used a virtual background and a link to each background is present in column. FIG. 22 shows an example of two participants, each having a virtual background.

Column 828 provides, for each session, a link to any video or audio file that had been recorded for that session. As shown, there is a single video link in session 808 indicating the location of a stored video file (including video and audio). Although not shown, it is possible that any of the sessions may also include a recorded audio file that had been recorded during that session, and a link to such an audio file would appear in column 828. An example of a recorded video file is shown in FIG. 26B.

Column 829 provides, for each session, a link to any tools palette that had been used for a particular session. As shown in session 808 there is a tools link indicating a tools palette that had been used with the whiteboard during that session. FIG. 21 shows an example of a chemistry tools palette 1008.

Participant table 830 is also created at the time when database 800 is populated. In order to efficiently identify participants in previous sessions, column 842 lists the names of the participants in a previous session, and column 844 lists the session identifiers of all sessions where those participants participated together. Column 842 holds the names of all participants entered by each participant when they enter a session. Accordingly, the host or enterprise may require that all participants enter their name, initials, user name, etc. in a consistent fashion in order to facilitate retrieval of previous sessions. In another embodiment, the video conference service may require that each participant enter a unique e-mail address or other unique identifier when entering a session in order to facilitate retrieving previous sessions. It is not strictly required that each participant enter a unique name when entering a session. For example, it may be that Carol holds separate video conferences with two people each named "Bob." All this means is that there may be two more sessions each having the name "Carol-Bob", but, when the sessions are retrieved, Carol will be able to differentiate between sessions based upon the date or time stamp. Application 101 may also populate column 842 with a unique identifier for each participant.

FIG. 17C illustrates a content-centric permission database 850. Stored in a column 852 is the name of particular content may be accessed, viewed or used during a session by particular and distinct group or groups of participants. This content includes any shared files (e.g., 858, 859, 860, 861), any shared whiteboards (e.g., 862), any shared chats (e.g., 863), any shared tool palettes (e.g., 864), any recorded video or audio of a particular session (e.g., 865, 866), any open windows when the session ended (e.g., 867), the device settings for each particular participant when in a specific particular group (e.g., 868, 869). He groups with access to that content are listed in 854. An exception is made for the device settings. Because the device settings for a particular group of participants may be quite varied, only a single group of participants is listed in each row of 854. By way of example, rows 868 and 869 each include only the settings for the participants in a single group. Other types of content that may be present during a session may be stored in this table.

Column 854 includes, for each item of content, and identification of the group or groups that have permission to view or use that content. For example, the file "Graph One" in row 858 may be viewed during a session by a group consisting of Bob and Carol, or, by group consisting of Ethan, Mike and Jon. Column 854 may include no groups for each item of content or any number of groups. Thus, if only Bob and Carol are in a session together they may view the content shown in rows 858, 859, 860, 862, 863, 865, and 867. Further, if Bob and Carol are in a session with Frank, they may each see the open windows content 867, and, if Frank leaves, Bob and Carol may continue to view that content because they are listed as a distinct group in row 867. Continuing with this example, when Alice and Carol are in a session together they may view Workbook Sales as well as have access to the device settings shown in row 868. These device settings include the settings for each participant while in that particular group, including settings for a desired camera, microphone, virtual background image, speakers etc. Further, when Frank, Margaret and Henry are in a session together they have access to an audio file that was recorded for that session as shown in row 866. Should there be more than one audio file these may be listed separately with a distinguishing identifier such a date, timestamp, name, etc.

It should be noted that the use of first names in column 854 is for ease of explanation of this figure; practically speaking, an implementation of this embodiment may use individual unique identifiers instead of first names for each participant. Finally, column 856 includes a pointer or a link to the actual storage location where the particular content is stored.

FIG. 17D illustrates a group-centric permission database 870. Stored in a column 871 is, in each row, a particular group and the names or unique identifiers of participants of that group. Each row may be written to this database as groups are formed within a session or as each session is saved as is further described below. As shown, each distinct group occupies a row and the content that is permitted to be shared in this group is listed in the succeeding columns. For example, the group of Carol, Ted and Alice only shares whiteboard and chat contents. The group of Frank, Bob and Carol has permission to access to files, a link to the open windows of their last session, a virtual background for Bob, and a USB camera used on one of their computers. As in the content-centric database, the names of participants in column 871 may be recent placed by unique identifiers. And, even though the content shown in the database has descriptive, human-readable names, in an implementation it is likely that each content item would be represented by a unique identifier which is an actual link or pointer to the storage location of the content. In column 878, most all distinct groups will have a pointer to a file in this location for the settings used for each participant of that group, such as desired camera, microphone, speakers, video or audio mute settings, etc.

Content and File Sharing Amongst a Group of Participants

FIGS. 18A-20C illustrates how file sharing is handled in the context of the present invention. Generally, when a participant of a video conference session chooses to share a file (or other content) with the other participants of that session it is assumed that everyone in that session now has permission to view that file when part of that group. By contrast, if two members of a group are viewing a file and a third person desires to join that session, it is not automatically assumed that that third person will have permission to view that file; the two current participants must first grant permission. These and other examples of permission will be described below. If both Bob and Carol are viewing a file X together, that means that they each have permission to view that file separately whenever they want (except when they are in a group with other people that do not have permission to view that file). In other words, Bob and Carol need not be together in a group in order to view that file X.

Figure 18A:
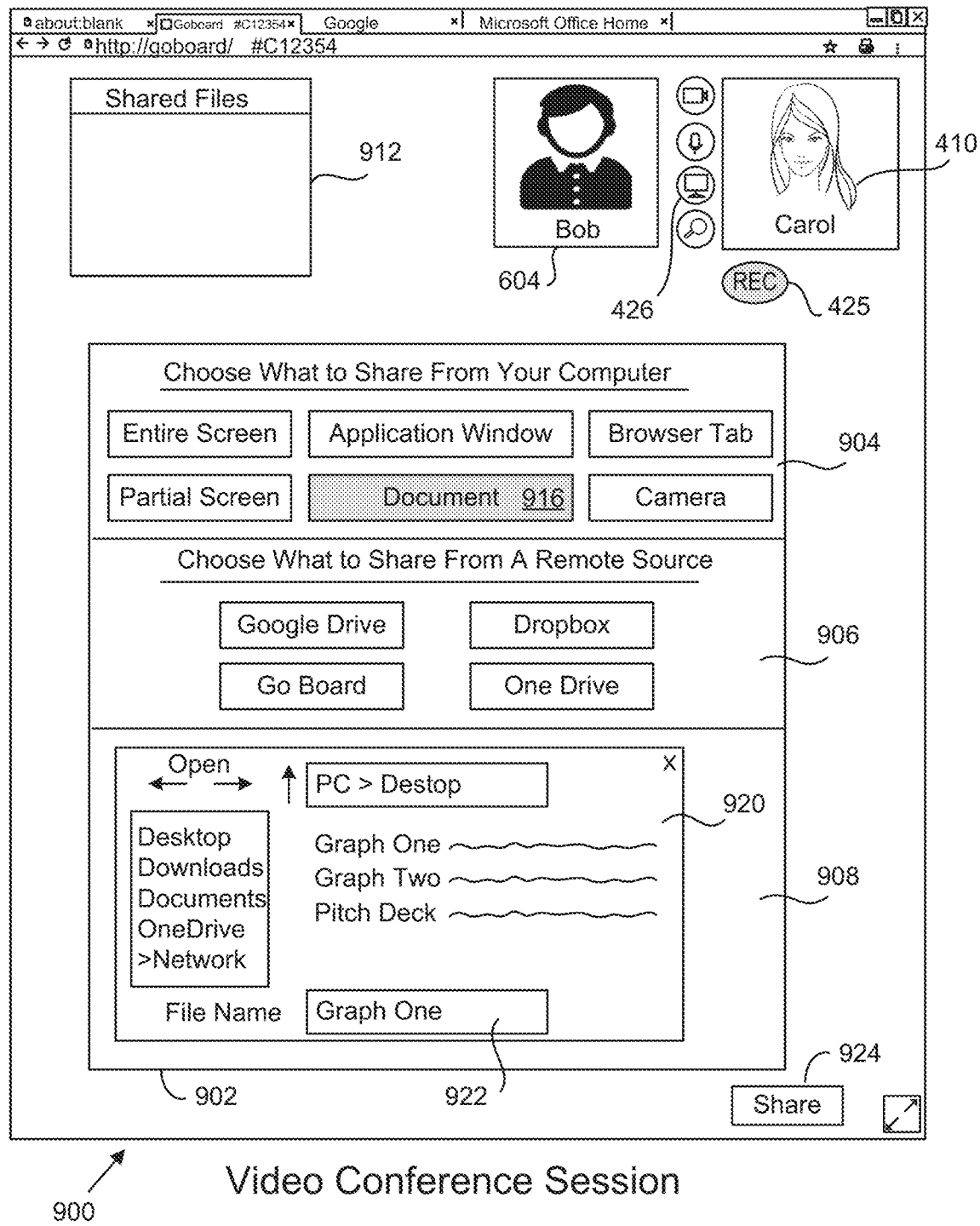
FIG. 18A is a block diagram of a user computer within which a set of instructions, for causing the machine to perform any one or more of the methodologies discussed herein, may be executed
Figure 18B:
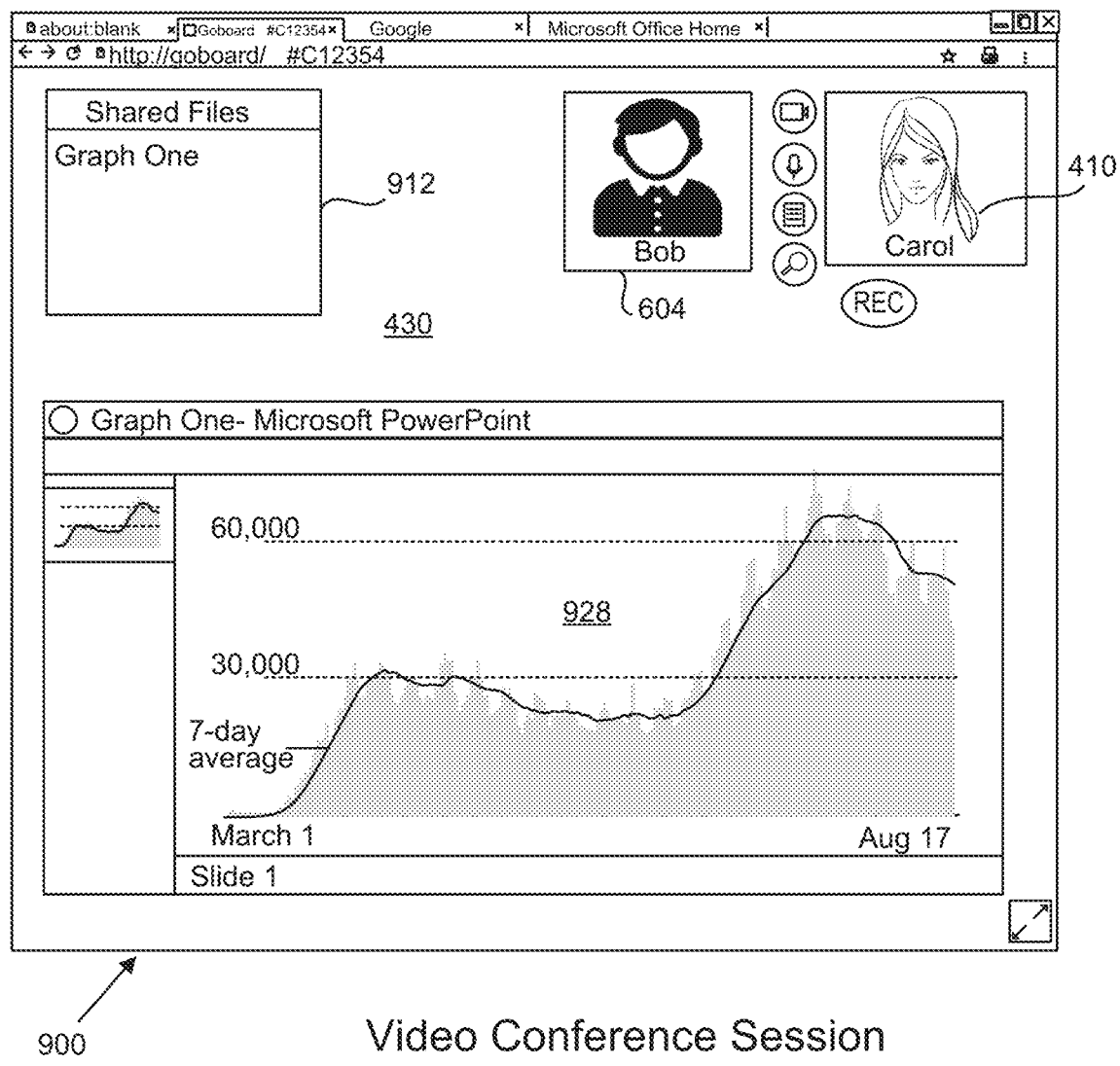
FIG. 18B illustrates video conference session in which a document has been shared by Carol.

FIG. 18A illustrates another video conference session 900 with participants Bob and Carol. In this example, the video conference functionality is accessed via a tab of a browser on a participant computer. As explained above, any participant (or all participants) may choose to access the video conference via a downloaded application (or "app") instead of via a browser. Shown is the video conference on Carol's computer, if shown on Bob's computer, the screen will look the same except that the column of icons to the left of Carol's image would be to the left of Bob's image.

Shown is a gallery view of the participants in the conference including a still image or live video of Carol 410 and of Bob 604. To the left of Carol's image is a column of icons including content sharing icon 426 and a record button 425 (not shown is a button for recording only audio). A shared files box 912 may appear anywhere on the screen and includes any number of files that are currently shared by all participants and to which each participant has access and may view. Carol has selected icon 426 in order to share content and thus window 902 appears on her screen. Carol may share content from her own computer shown in region 904 or content from a remote source shown in region 906. On her own computer Carol may share her entire screen, a partial screen, a currently open application window, a browser tab, an external camera (such as an attached USB document camera), or any document available on her computer or network. Carol has selected Document 916 and thus window 920 opens within region 908. Using her mouse or other input device, Carol is able to select any particular file or document available on her computer, available via One Drive, or available via her network connection (such as files on a file server within her organization). Carol has selected the file Graph One from her desktop which appears in region 922 and she then clicks the share button 924 in order to share this document (or any of the content she had selected) with the other participants of this session. Of course, Carol may choose other content from region 904 and techniques for sharing content are known in the art.

FIG. 18B illustrates video conference session 900 in which a document has been shared by Carol. Now shown is the name of the file Graph One in the shared files box 912, and the file window itself 926 on Carol's screen which includes a graph 928; Bob's screen would also show the same shared files box and the same file window on the screen. Shown also is whiteboard region 430 which is not being used as a whiteboard at this time. Now that this file has been shared between the two of them, this file will always appear in this shared files box whenever the distinct group of Bob and Carol are in a session. If this file (or any other file in the box) is not currently displayed on the screen when Bob and Carol are in a session, either of them may open and share that file by double-clicking upon the name of the file in the shared files box 912. Double-clicking upon the file accesses the storage location and open opens the file on their screen.

Figure 19A:
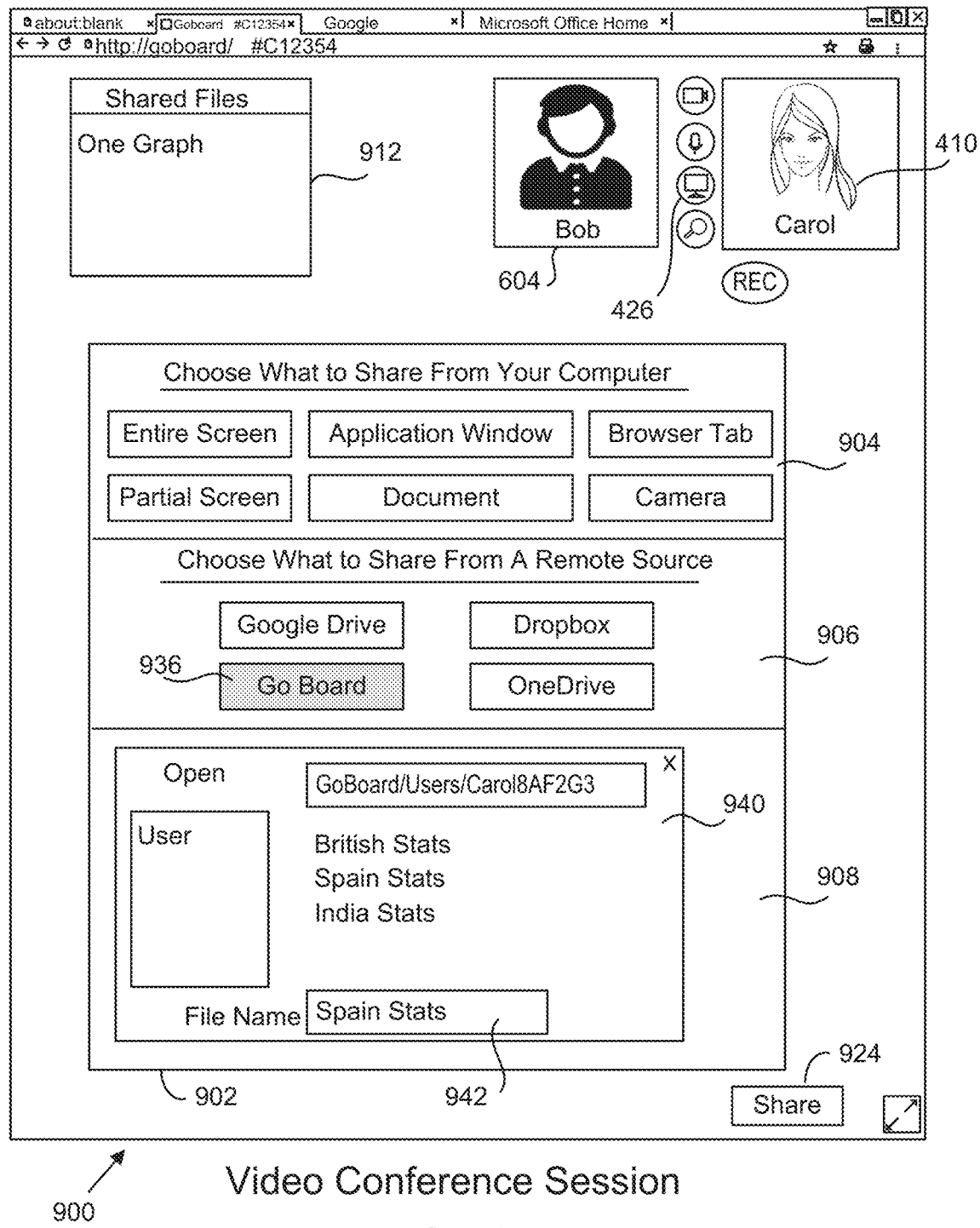
FIG. 19A illustrates the video conference session in which Carol shares content from a remote source which is the video conference service.

FIG. 19A illustrates the video conference session 900 in which Carol shares content from a remote source which is the video conference service. Similar to FIG. 18A, Carol has again selected the shared files icon 426 and now chooses to share content from a remote source. Shared files box 912 shows the file that had previously been shared. Carol now chooses the option GoBoard 936 from region 906 in order to access a file stored on the video conference service GoBoard which is the service which the participants are using in this example to speak via a video conference.

Thus, window 940 opens within region 908, and the using her mouse or other input device, Carol is able to select any particular file or document available on a remote file server of the GoBoard service. In this example, as part of its video conference service, GoBoard offers each user persistent storage for storage of their files, and Carol's available files are shown in window 940. Carol has selected the file Spain Stats from this remote storage which appears in region 942 and she then clicks the share button 924 in order to share this document (or any other file she had selected) with the other participants of this session. As mentioned earlier, the GoBoard video conference service is implemented upon server computer or computers 20 using application 101 and user files may be stored within persistent storage 122 or even upon other remote databases 80. Since Carol is using the GoBoard service to store and retrieve files, and because she has already logged into the GoBoard service in order to access its video conference functionality, there is no need for her to log in again to access the persistent storage of the GoBoard service. Typically, server computer 20 is remote and will be accessed over an Internet connection from Carol's computer, that is, server computer 20 is typically not accessible via a network connection within Carol's enterprise.

Figure 19B:
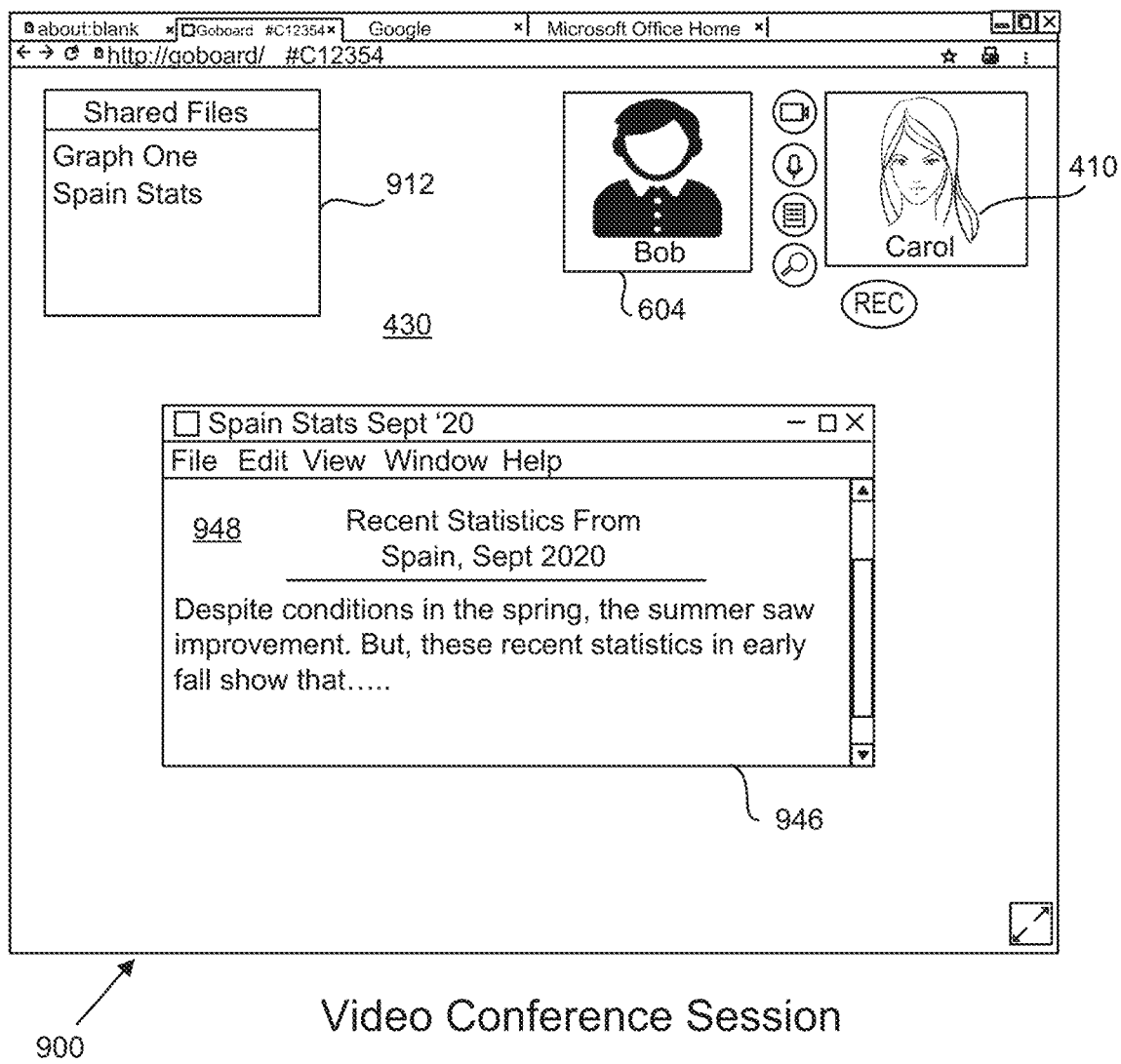
FIG. 19B illustrates video conference session in which the file Spain Stats has been shared by Carol.

FIG. 19B illustrates video conference session 900 in which the file Spain Stats has been shared by Carol. Now shown is the name of the file Spain Stats in the shared files box 912, and the file window 946 on Carol's screen which includes content 948; Bob's screen would also show the same shared files box and the same file window on the screen. Now that this file has been shared between the two of them, this file will always appear in this shared files box whenever the distinct group of Bob and Carol are in a session. If this file (or any other file in the box) is not currently displayed on the screen when Bob and Carol are in a session, either of them may open and share that file by double-clicking upon the name of the file in the shared files box 912.

Figure 20A:
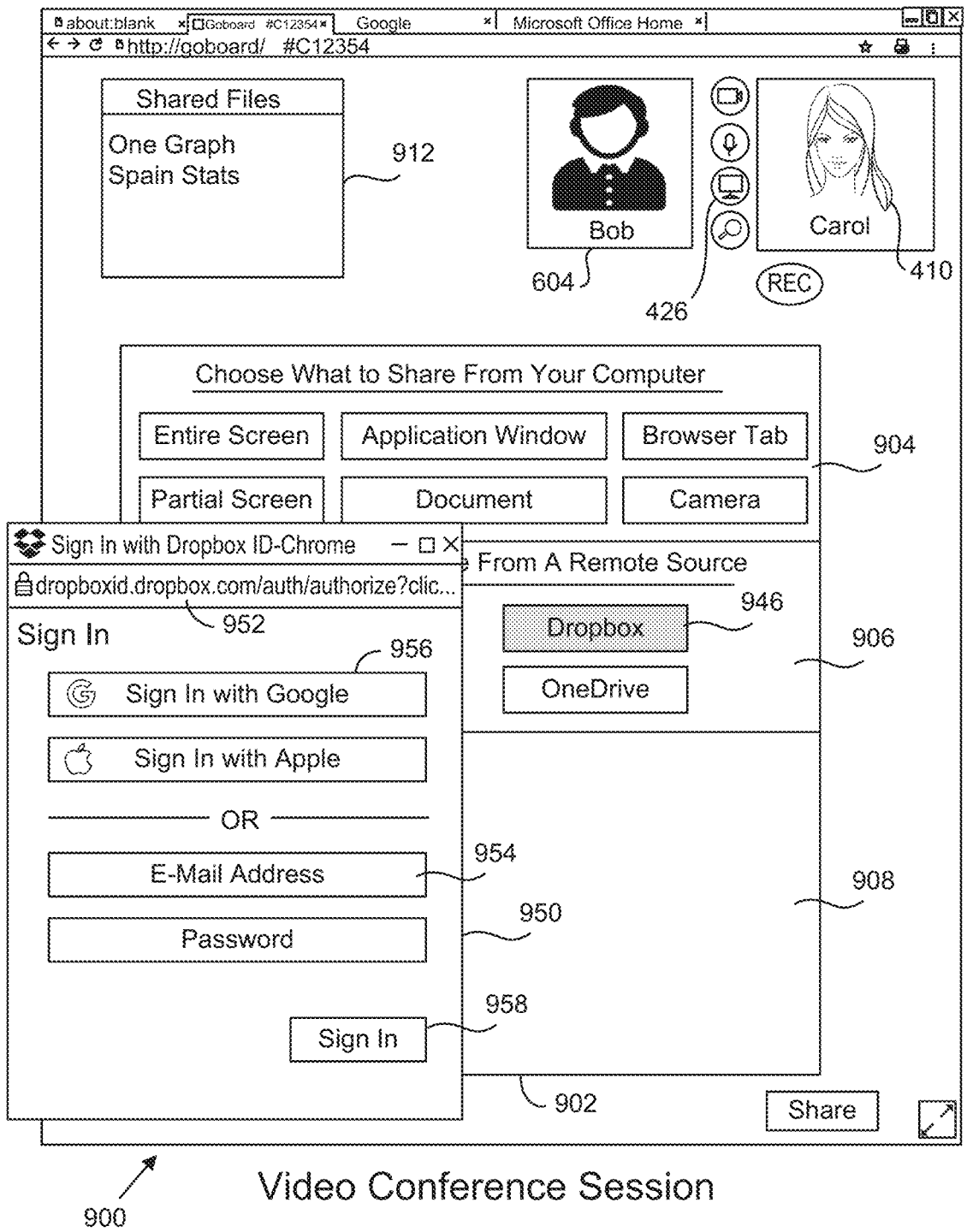
FIG. 20A illustrates the video conference session in which Carol shares content from a remote third-party source.

FIG. 20A illustrates the video conference session 900 in which Carol shares content from a remote third-party source. Similar to FIG. 19A, Carol has again selected the shared files icon 426 and now chooses to share content from a remote source. Shared files box 912 shows the files that had previously been shared. Carol now chooses the option Dropbox 946 from region 906 in order to access a file stored on the third-party Dropbox service. Unlike her own computer or the GoBoard service (to which she is already signed in), she must first sign in to this third-party service before she is able to access her files stored within that service.

Accordingly, pop-up window 950 opens and is superimposed over her browser window allowing her to sign in to her Dropbox account. Window 915 includes a URL 952 of a sign-in Web page for Dropbox, an option 954 to sign into Dropbox with her e-mail address (or other user name) and password, an option 956 to sign in using her Google or Apple credentials (or other such service), and a button 958 to complete the sign in process. Once button 958 is pressed (assuming the credentials are correct) then Carol will be signed into her Dropbox account.

Figure 20B:
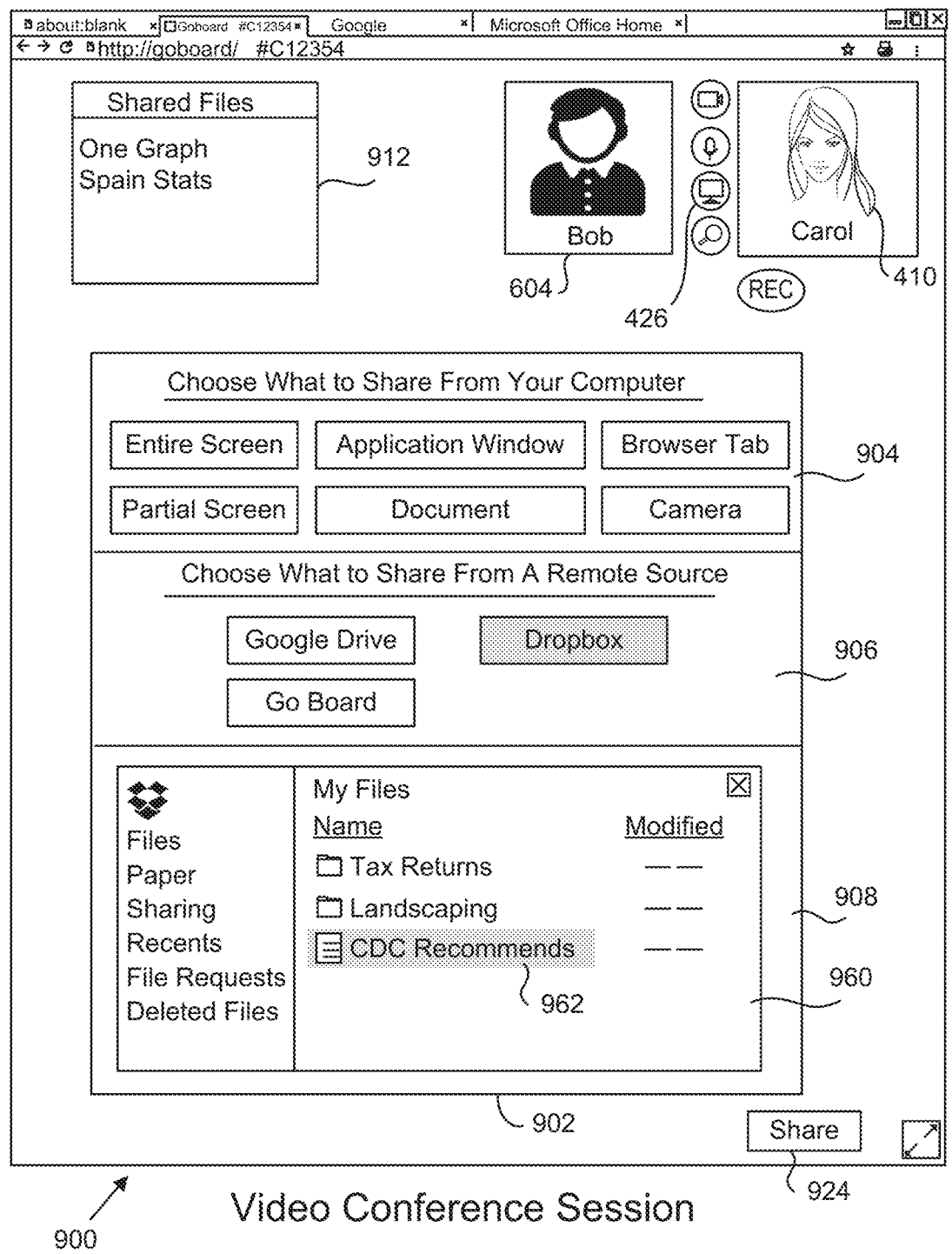
FIG. 20B illustrates the video conference session in which Carol selects a file from her Dropbox account.

FIG. 20B illustrates the video conference session 900 in which Carol selects a file from her Dropbox account. Window 960 now appears in region 908 showing the available files that Carol has in her personal Dropbox account. Shown is a column on the left with file management options, and a list of files on the right in which Carol has selected the file CDC Recommends. Carol selects Share 924 in order to share this document (or any other file she had selected) with the other participants of this session. A similar technique to the one described above may be used should Carol wish to sign into another remote third-party storage service such as Google Drive, One Drive, etc.

Figure 20C:
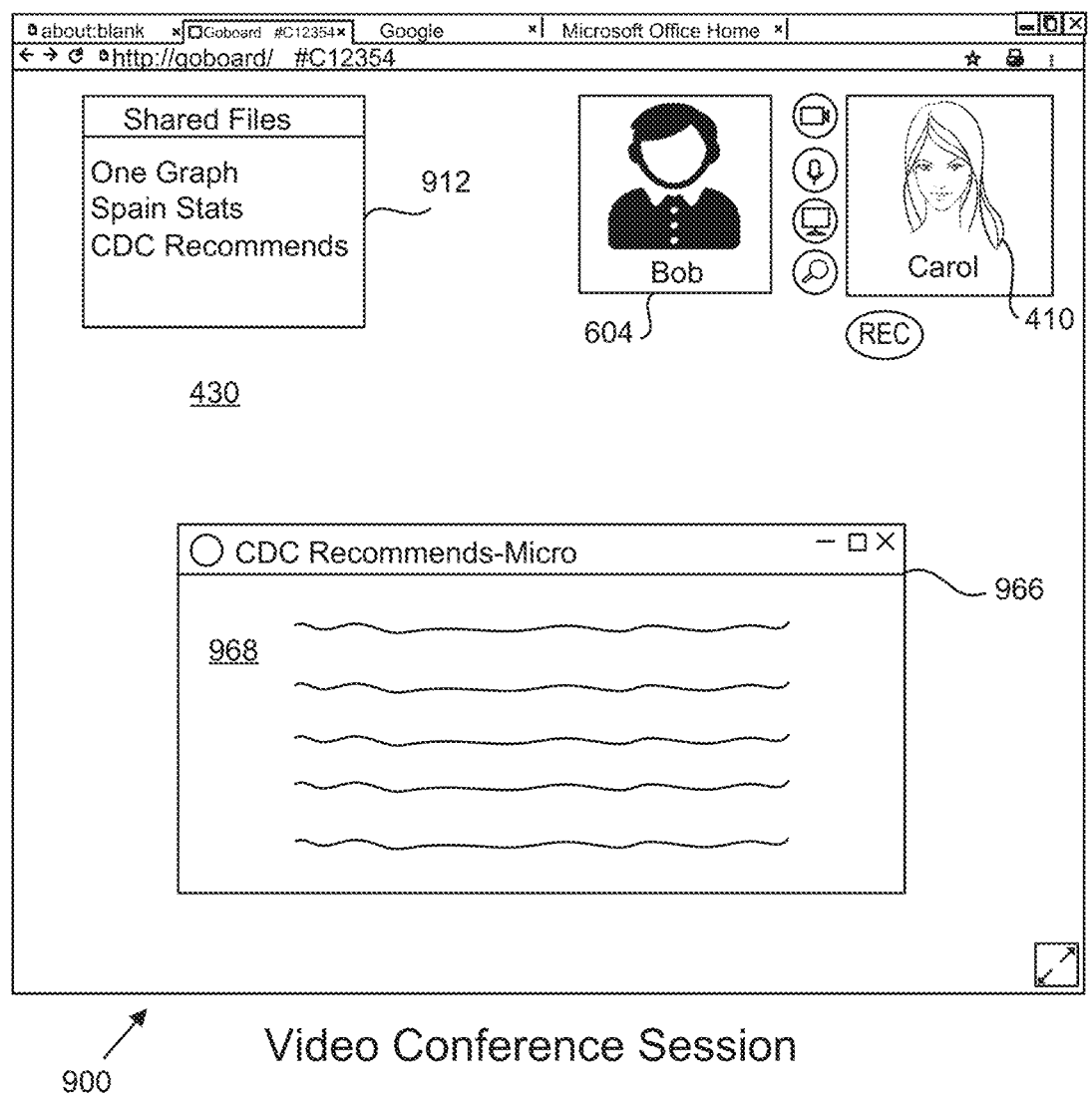
FIG. 20C illustrates video conference session in which the file CDC Recommends has been shared by Carol.

FIG. 20C illustrates video conference session 900 in which the file CDC Recommends has been shared by Carol. Now shown is the name of the file in the shared files box 912, and the file window 966 on Carol's screen which includes content 968; Bob's screen would also show the same shared files box and the same file window on the screen. Now that this file has been shared between the two of them, this file will always appear in this shared files box whenever the distinct group of Bob and Carol are in a session. If this file (or any other file in the box) is not currently displayed on the screen when Bob and Carol are in a session, either of them may open and share that file by double-clicking upon the name of the file in the shared files box 912.

Use of Whiteboard and Tool Palette, Setting Up a Session

Figure 21A:
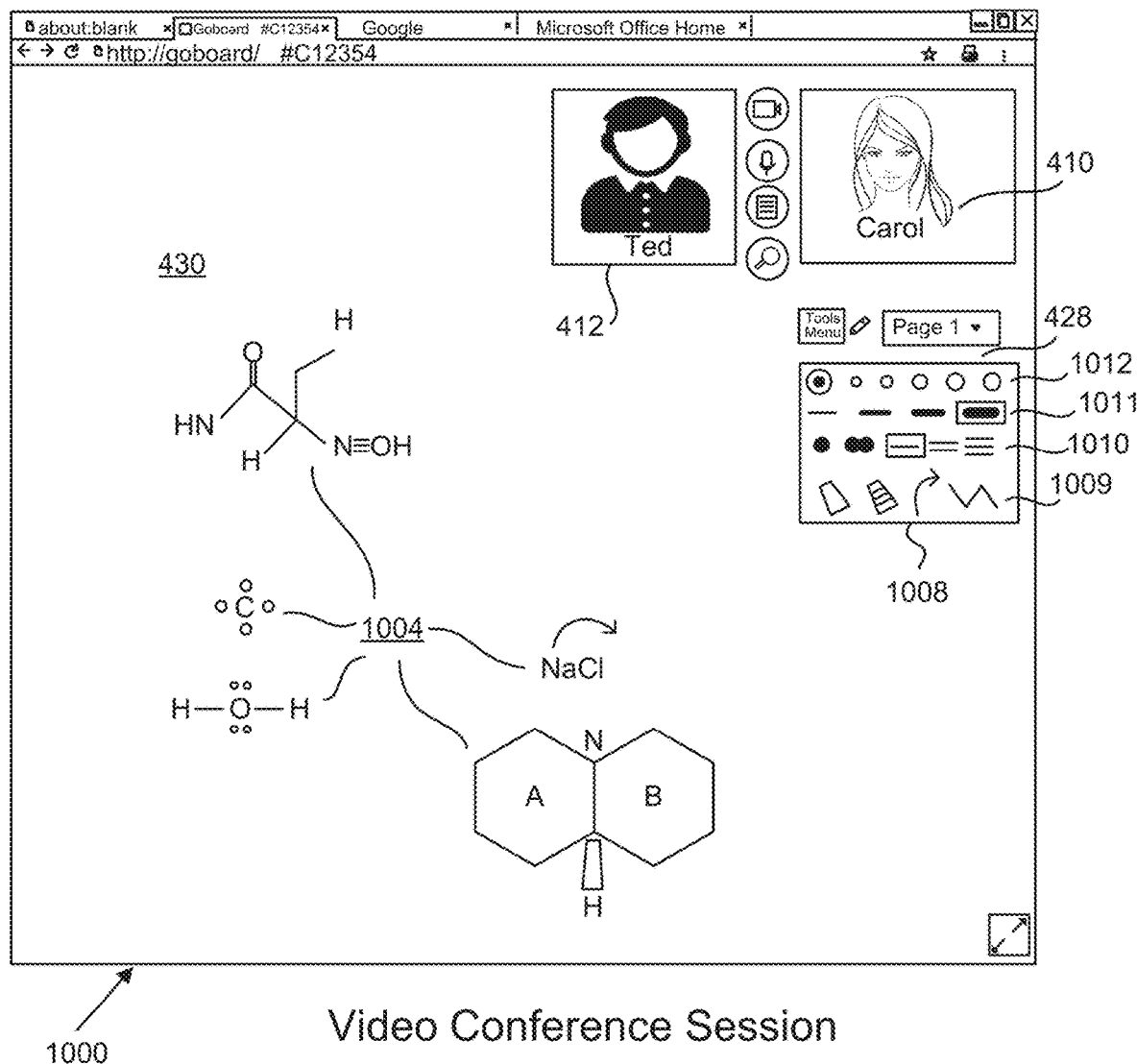
FIG. 21A illustrates a video conference session in which a whiteboard and a tool palette are used.

FIG. 21A illustrates a video conference session 1000 in which a whiteboard and a tool palette are used. In this example two participants, Carol 410 and Ted 412, are using the whiteboard region 430 to draw upon the whiteboard using a particular tool palette 1008. In this example the subject is chemistry and the tool palette has special symbols and tools used to draw chemical formulas, structures etc. Carol has selected the Tools Menu within region 428 in order to select this particular tool palette; of course, many other tool palettes are available such as those for electronics, physics, engineering, etc. Carol or Ted have used tool palette 1008 in order to draw content 1004 on the whiteboard region 430 using symbols such as 1009, connectors 1010, bonding widths 1011, or pen widths and colors 1012. Both content 1004 and palette 1008 appear on the screen of both Carol and Ted's computer although only Carol's screen is shown. Techniques for saving the information shown on the whiteboard will be discussed below.

Figure 21B:
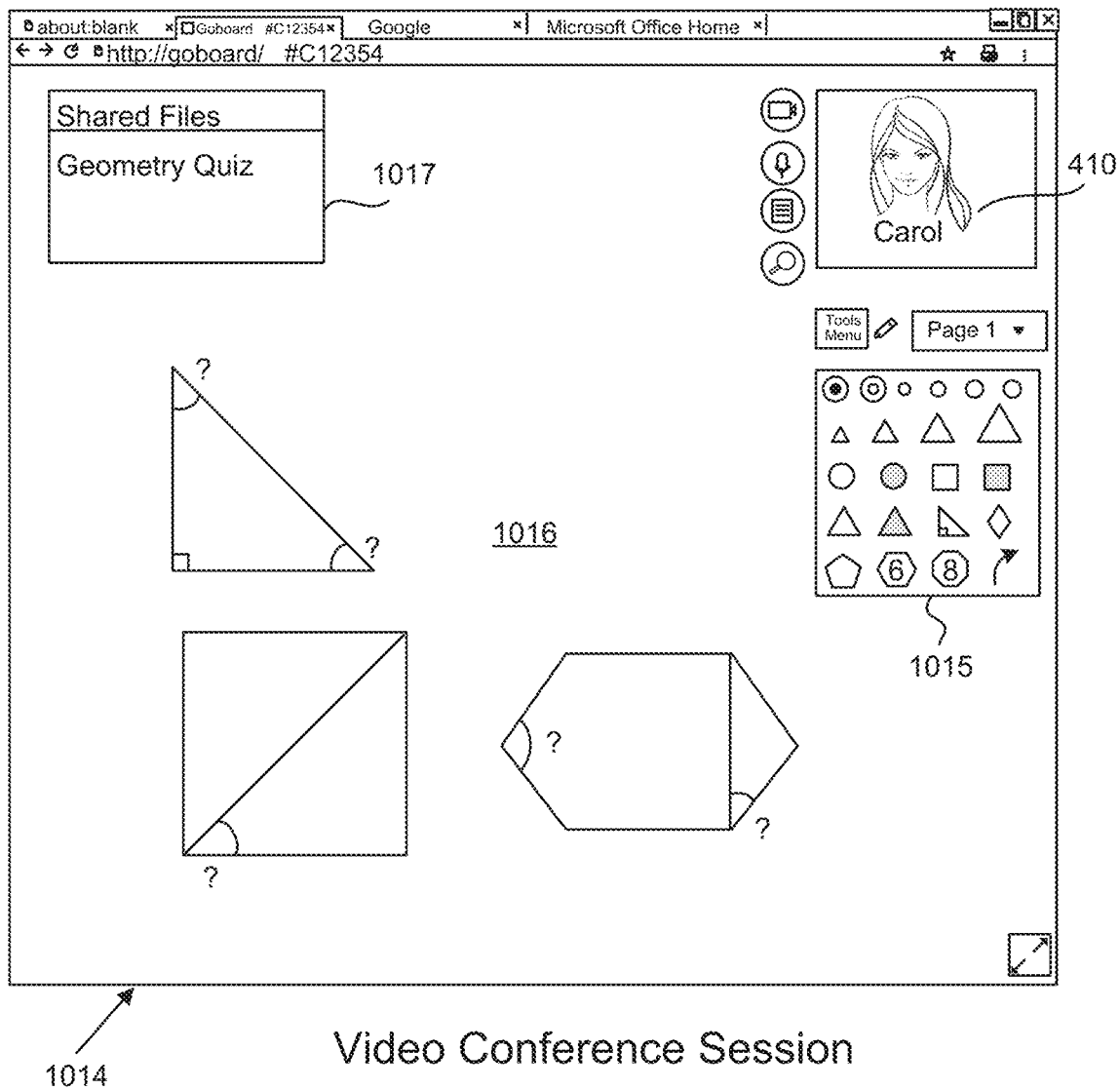
FIG. 21B illustrates a video conference session in which a host sets up a session.

FIG. 21B illustrates a video conference session 1014 in which a host sets up a session. As shown, session 1014 has been initiated by Carol 410 in which she is setting up a session for use with another participant or participants. Carol is the only person who has joined the session and she may set it up and save it for later retrieval or may invite another participant to join. She has opened the Tools Menu and has selected a palette 1015 of geometry shapes that include, similar to palette 1008, a row of pen colors and sizes, a row of shapes and sizes (in this case a triangle), a selection of circles or squares (filled or not), a selection of triangles a diamond, and in the bottom row other shapes and an arrow. Using these tools, a line drawing tool and others, Carol has produced whiteboard content 1016 with a triangle, square, hexagon and written "?"s for an exercise in angles. She has also opened and shared a file "Geometry Quiz" which now appears in file box 1017, using any of the techniques described above for opening and sharing a file. Although not shown, Carol may customize the session in other ways such as by adding a virtual background, open a chat window, opening a window, changing any device settings, recording the session, etc.

At this point, Carol may invite another participant to join, may wait for a participant to join who already has a link to the session, or may save the session for future use. Advantageously, Carol may save the session for future use when teaching geometry to a student, and thus when the session is retrieved all of her settings, whiteboard, shared files, tools palette, etc., are immediately ready for use in the session. In fact, Carol may use the session to teach Ted geometry, even though they had a previous chemistry session 1000. Further, Carol may save both sessions 1000 and 1014 after setting them up for use in teaching Ted or another student. Session 1014 may be saved as shown and described in FIG. 24. The first technique shown in FIGS. 17A and 17B may be used to store a session that Carol herself has set up (before any participant joins); table 830 shows Carol as a single participant having multiple sessions saved. And, database 800 shows that Carol has saved session 1014 under the name "Carol-Math" for later retrieval. Although not shown, Carol may also set up session 1000 for use with Ted and may ask him to join once it has been set up, or may save it and retrieve it for later use when he is available (not shown in database 800). Databases 17C or 17D may be also used to save a session by a single host and then retrieve it.

As shown in FIG. 8, a session is saved under a particular name that the application 101 chooses. As described with reference to FIG. 8, the application may prompt the participant to enter a unique name for a session when it is saved; in this example, Carol takes advantage of that option and names the session "Carol-Math" as shown in column 812. Such a prompt may also occur when other sessions are saved, such as in FIGS. 23-25 and the application will save the session content under the name input by the host. The session they may be saved in any suitable location in FIGS. 17C or 17D.

Accordingly, when joining a session by herself in the future, Carol is presented with options as shown and described in FIG. 27A, except that her earlier sessions may be listed using the names she has chosen such as "Carol-Math" or "Carol-Chemistry." Carol then selects such an earlier session in order to teach a student or have a session already prepared with whatever content she needs for the other participants.

Virtual Backgrounds

FIG. 22 illustrates a video conference session 1020 in which two files are open and each participant has a virtual background. In this example two participants, Carol 410 and Alice 414, are sharing two files 1026 and 1027. Although only the screen of Carol's computer is shown, both files, along with shared files box 912 appear on Alice's computer screen as well. In this example, Carol has chosen as a virtual background the Golden Gate Bridge, rather than having her background simply be the office behind. Alice has chosen a photograph of mountains as her virtual background. Techniques for creating a virtual background behind a speaker during a video conference are known in the art. Techniques for saving the information shown in session 1020 will be discussed below.

Saving of Video Conference Session State

Figure 23:
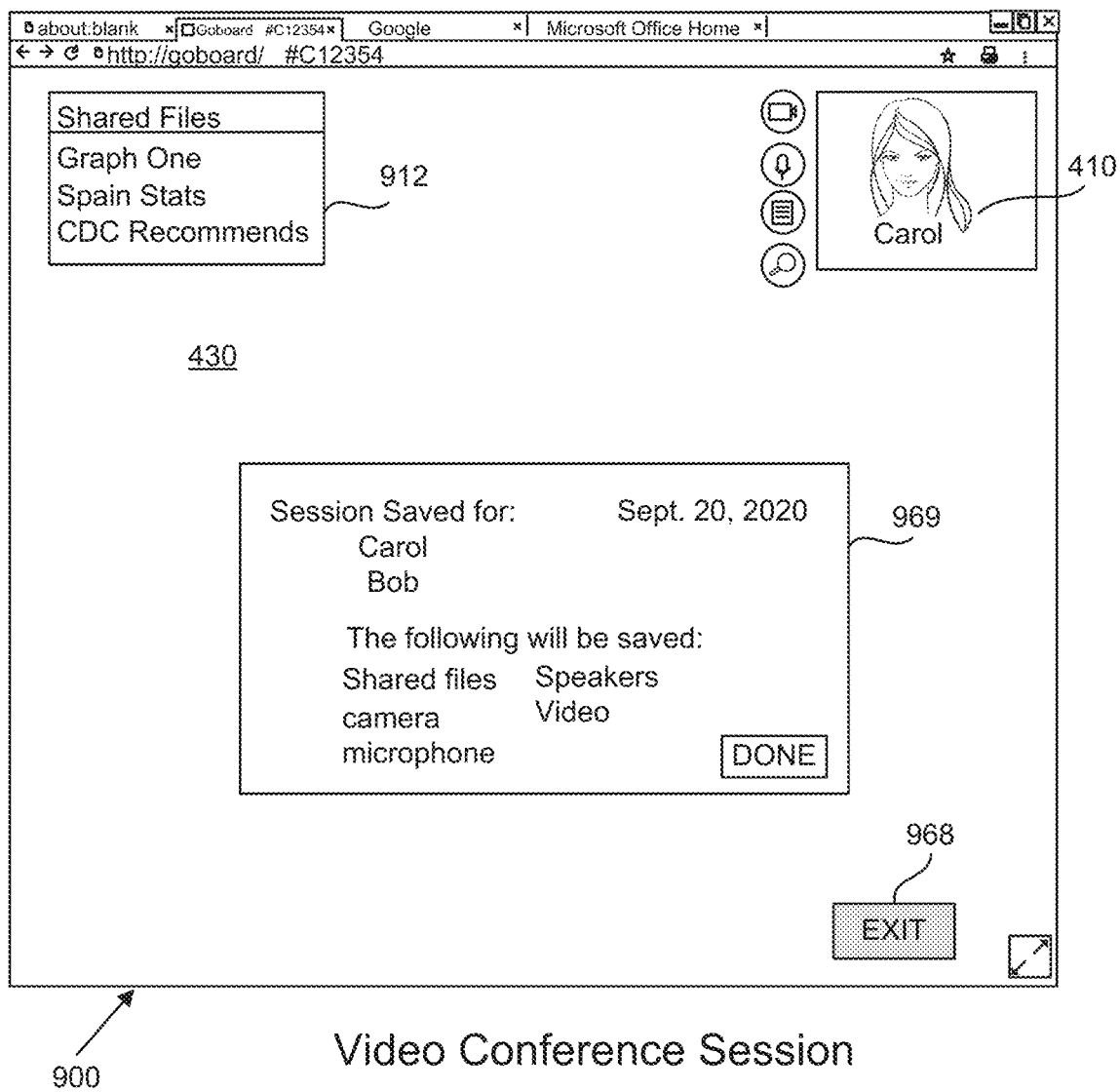
FIG. 23 illustrates the video conference session as it is being saved.

FIG. 23 illustrates the video conference session 900 as it is being saved. As previously described in FIG. 20C, Bob and Carol were in session 900 and were sharing files shown in box 912. Bob has left the session, and Carol has selected the Exit button 968, thus triggering the session to be saved (in one embodiment), and window 969 now appears on Carol's screen. The window informs the host of the group (Bob and Carol) to which the session will be saved, and indicates below the content that will be saved. In this example, the shared files will continue to be saved and associated with that group, as well as the video of the session that was recorded, and the device settings for Carol and Bob (speakers, camera and microphone). Once the host clicks Done in window 969 the session is over, all participants are logged out, and the indicated content will be saved in persistent storage. Further details on how the content may be saved is provided below. Preferably, the device settings are saved for each participant and may be indicated in window 969.

Figure 24:
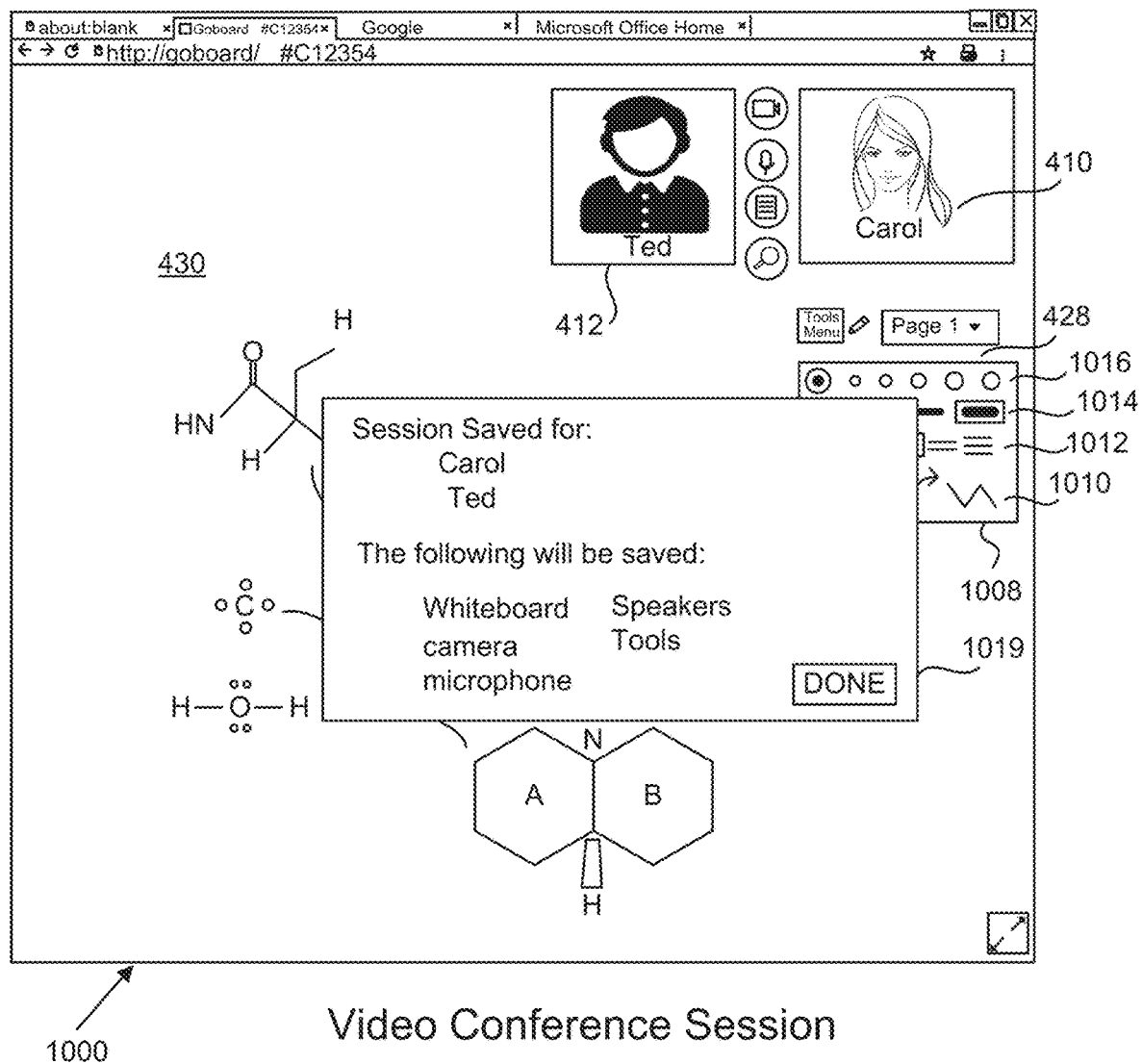
FIG. 24 illustrates the video conference session as it is being saved.

FIG. 24 illustrates the video conference session 1000 as it is being saved. As previously described in FIG. 21, Ted and Carol were in session 1000 and were sharing a whiteboard and a tools palette. The host Carol has selected the End Conference button 1018 (even though all participants are still in the conference), thus triggering the session to be saved (in one embodiment), and window 1019 now appears on the screen of each participant (Ted's screen does not have a Done button). The window informs the host of the group (Ted and Carol) to which the session will be saved, and indicates below the content that will be saved. In this example, the whiteboard and the tools palette will be saved and associated with that group, as well as the device settings for Carol and Ted (speakers, camera and microphone). Once the host clicks Done in window 1019 the session is over, all participants are logged out, and the indicated content will be saved in persistent storage. Further details on how the content may be saved is provided below.

Figure 25:
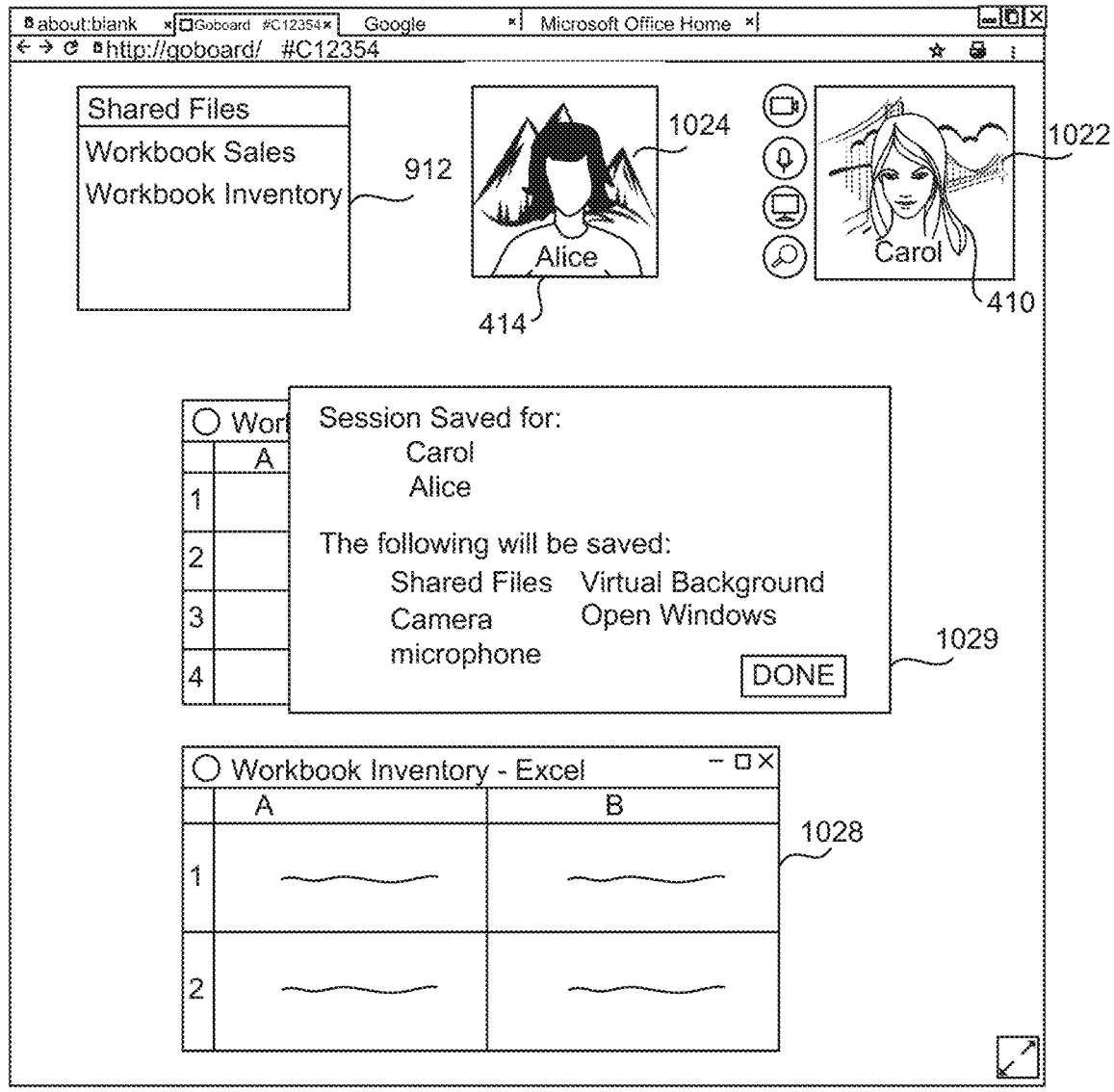
FIG. 25 illustrates the video conference session as it is being saved.

FIG. 25 illustrates the video conference session 1020 as it is being saved. As previously described in FIG. 22, Alice and Carol were in session 1020 and were sharing files shown in box 912. Carol has selected the End Conference button 1028, thus triggering the session to be saved (in one embodiment), and window 1029 now appears on Carol's screen. The window informs the host of the group (Alice and Carol) to which the session will be saved, and indicates below the content that will be saved. In this example, the shared files will continue to be saved and associated with that group, as well as the virtual background of the two participants, the open windows 1026 and 1027, and the device settings for Carol and Alice (speakers, camera and microphone). Once the host clicks Done in window 1029 the session is over, all participants are logged out, and the indicated content will be saved in persistent storage. Further details on how the content may be saved is provided below.

Retrieval of Video Conference Session State

Once a session has been saved for a group or groups of participants, any one of these groups may retrieve the state of such session either automatically or manually when the group is again present during a video conference session. The advantage is that if a particular group of participants had been working on a whiteboard, sharing files, had recorded a session, or if a participant wants certain device settings used with that group, then the state of that information can then be retrieved when the group is again present.

FIG. 26A illustrates a new video conference session 1030a for the participants Bob and Carol. Their session had previously been saved as shown in FIG. 23. Shown is a window 1032 that appears automatically when Bob and Carol are again present in a session; the host, Carol is presented with three options. She chooses Previous Session, clicks Done and then the previous session is restored as shown in the next figure and as will be described in greater detail below. Preferably, in order to avoid confusion, window 1032 is only presented to one of the participants, such as the host. Typically, the host decides which session to restore, if any, although in one implementation a majority of participants or all of the participants may decide whether to restore.

Alternatively, a group of participants will not be defined for a session, and a session will not be retrieved (either automatically or by asking first) until application 101 receives input from the host indicating that all participants are now present in the session and that a previous session state should be retrieved. The host provides this input by pressing button 1031 "Retrieve Session" indicating to application 101 that all necessary participants are now present in the session. This button is enabled and appears on the host computer if the host checks the box "Upon Host Input" in region 492 of the preferred tab. If not checked, this button does not appear and a session will be retrieved automatically or by asking first depending upon a design implementation of when participants are detected in the session as has been described in step 734.

FIG. 26B illustrate the video conference session 1030a in which the previous session was selected. As shown in FIG. 23, the two participants had been sharing three files and had recorded a video the session. Accordingly, new session 1030a between participants Bob and Carol shows file box 912 including the three files that have been sharing, along with a video icon 1034 which is a recording of their previous session and upon which one of them may click in order to watch the session. Although FIG. 26B only shows the session from Carol's perspective, the session from Bob's perspective on Bob's computer would appear the same.

FIG. 27A illustrates a new video conference session 1030b for the participants Bob and Carol. Their session had previously been saved as shown in FIG. 23. Shown is a window 1032 that appears automatically when Bob and Carol are again present in a session; the host, Carol is presented with three options. She chooses Earlier Session, is given two earlier sessions from which to choose, chooses the earlier session, clicks Done and then that previous session is restored as shown in the next figure and as will be described in greater detail below.

FIG. 16 describes an embodiment in which previous sessions are retrieved.

FIG. 27B illustrates the video conference session 1030b in which an earlier session was selected. As shown in FIG. 12, the two participants had been collaborating upon a shared whiteboard. Accordingly, new session 1030b between participants Bob and Carol now shows that same graph 431 on each of their computers in the whiteboard region. Although FIG. 27B only shows the session from Carol's perspective, the session from Bob's perspective on Bob's computer would appear the same.

Figure 28A:
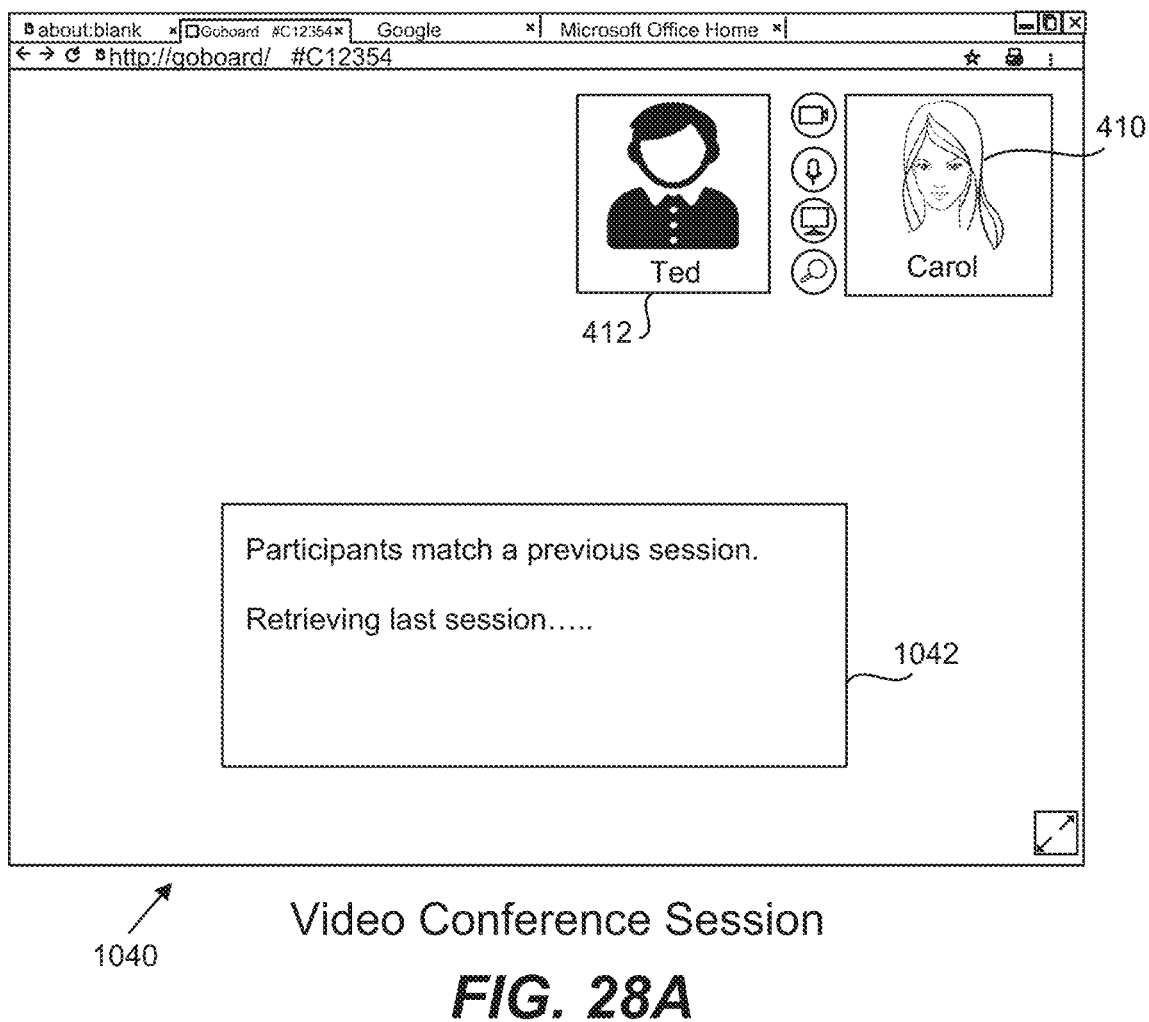
FIG. 28A illustrates a new video conference session for the participants Ted and Carol that is retrieved automatically.

FIG. 28A illustrates a new video conference session 1040 for the participants Ted and Carol that is retrieved automatically. Their session had previously been saved as shown in FIG. 24. Shown is a window 1042 that appears automatically when Ted and Carol are again present in a session; application 101 in this embodiment will automatically retrieve the contents of the previous session they had been in without asking first. Accordingly, that previous session is restored as shown in the next figure and as will be described in greater detail below.

Figure 28B:
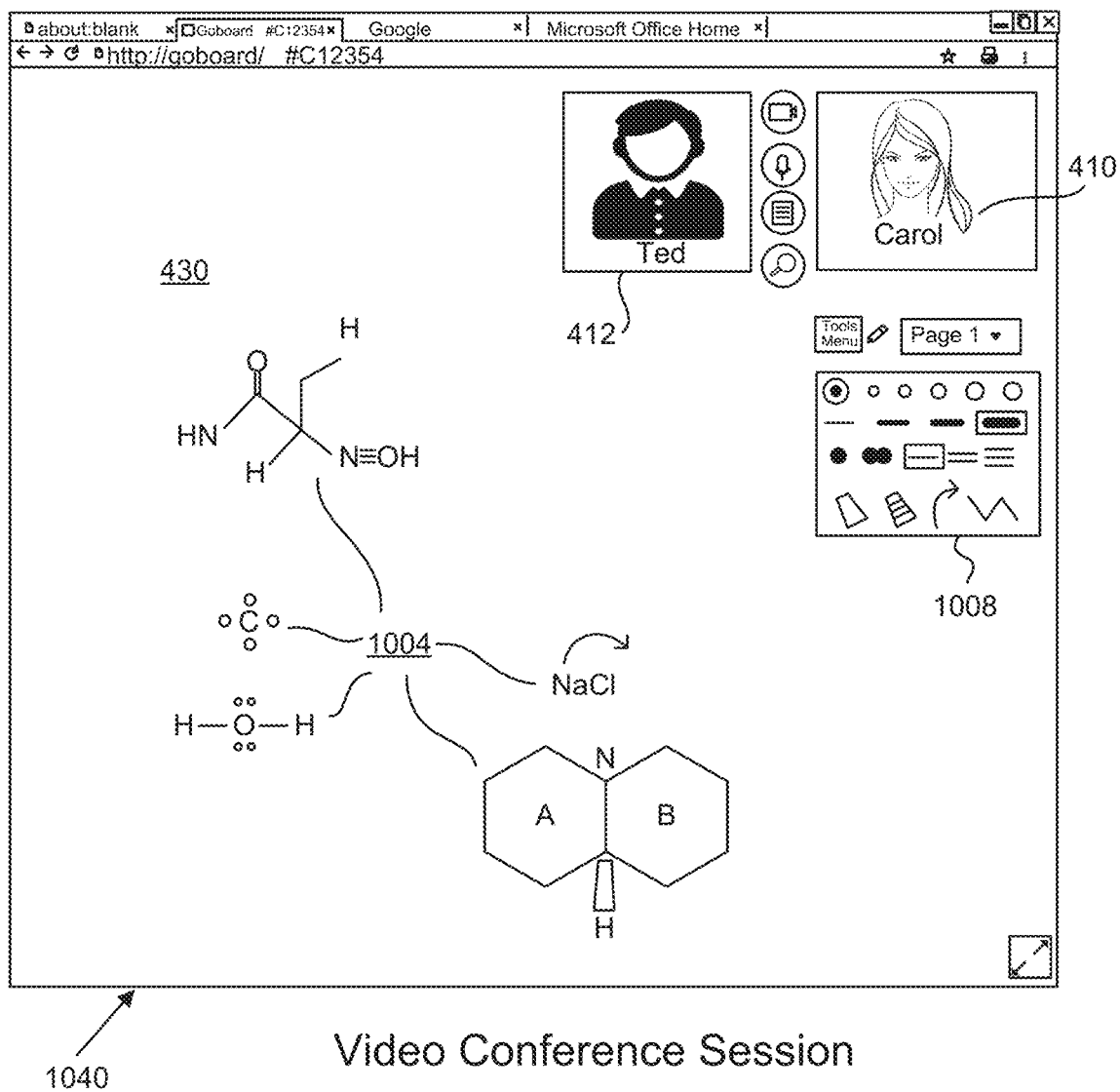
FIG. 28B illustrates the video conference session in which the previous session is automatically retrieved.

FIG. 28B illustrates the video conference session 1040 in which the previous session is automatically retrieved. As shown in FIG. 21, the two participants had been collaborating upon a shared whiteboard. Accordingly, new session 1040 between participants Ted and Carol now shows that same whiteboard with chemistry information on each of their computers in the whiteboard region as well as the chemistry tools palette 1008.

Figure 29A:
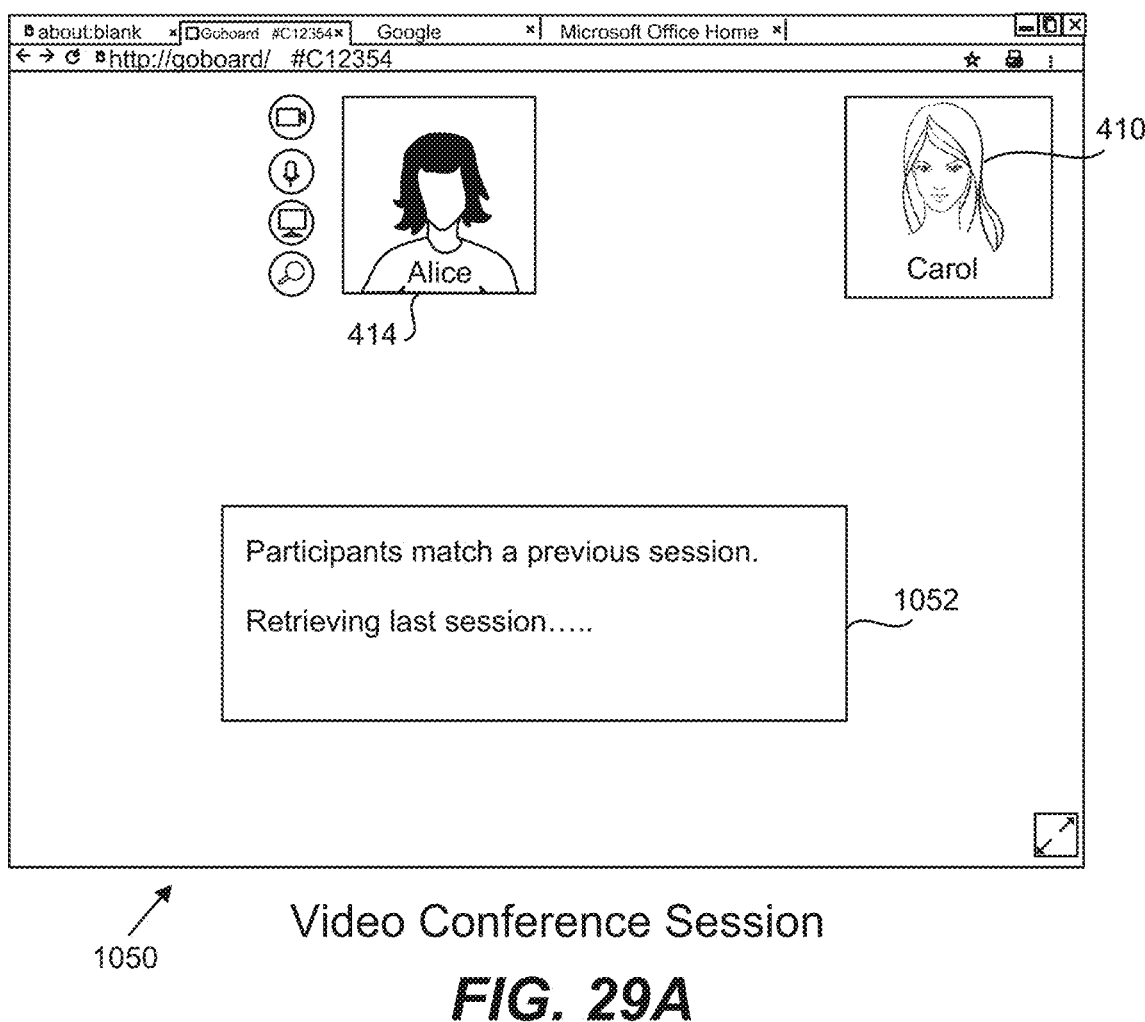
FIG. 29A illustrates a new video conference session for the participants Alice and Carol that is retrieved automatically from the perspective of Alice's computer.

FIG. 29A illustrates a new video conference session 1050 for the participants Alice and Carol that is retrieved automatically from the perspective of Alice's computer. Their session had previously been saved as shown in FIG. 25. Shown is a window 1052 that appears automatically when Alice and Carol are again present in a session; application 101 in this embodiment will automatically retrieve the contents of the previous session they had been in without asking first. Accordingly, that previous session is restored as shown in the next figure and as will be described in greater detail below.

Figure 29B:
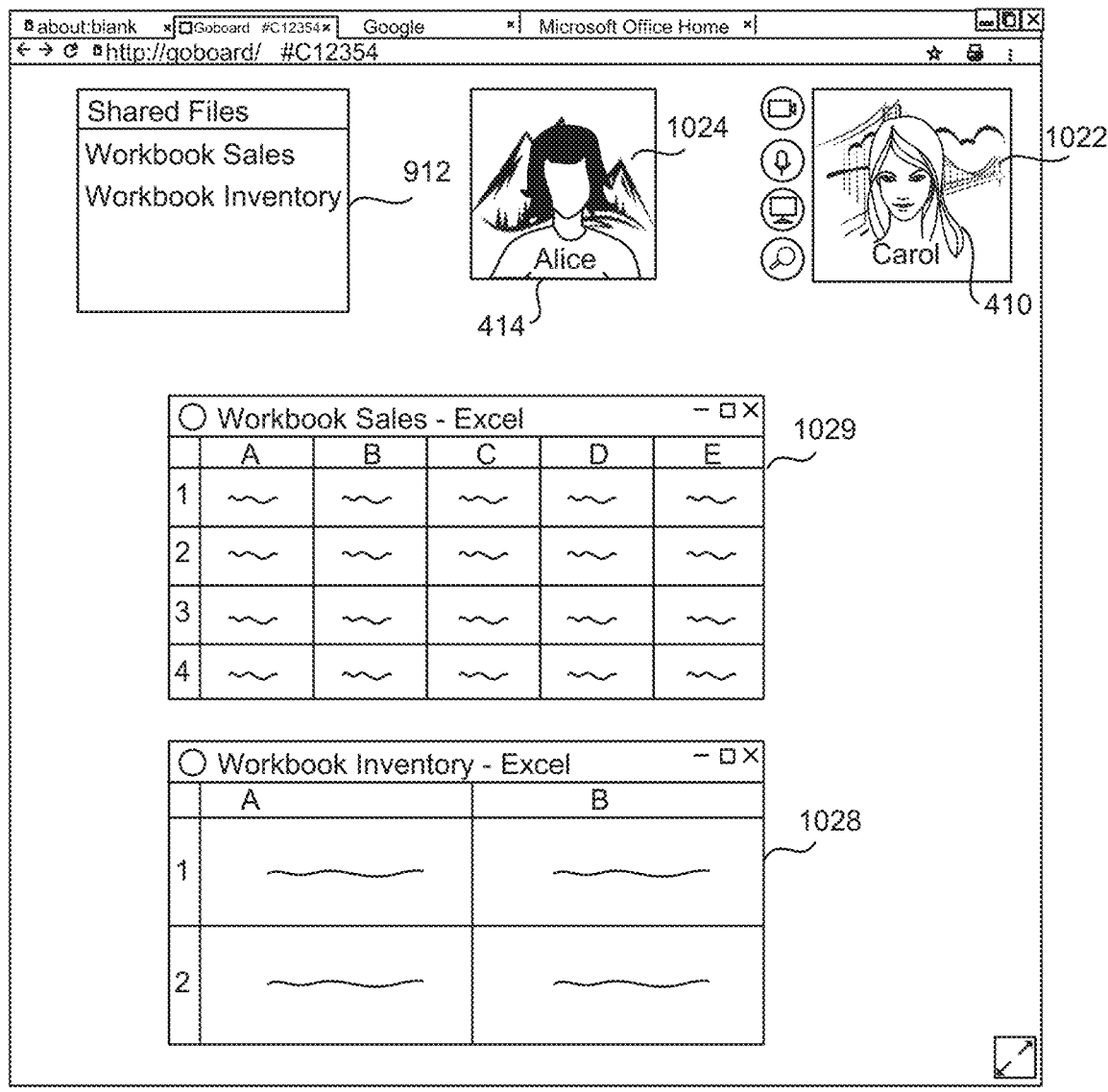
FIG. 29B illustrates the video conference session in which the previous session is automatically retrieved.

FIG. 29B illustrates the video conference session 1050 in which the previous session is automatically retrieved. As shown in FIGS. 22 and 25, the two participants had shared two files and had two open windows. Accordingly, new session 1050 between participants Alice and Carol now shows file box 912 with the same two shared files and the two open windows from before, as well as the virtual background for each of them.

Granting of Permissions when a Participant Joins a Video Conference Session

As mentioned earlier, typically all participants will be on a call together when content is shared, created or otherwise initiated, and thus all will have permission to access that content in the future. Occasionally though, a participant will join a session late, or when a session is already in progress, and after content has already been shared, created, displayed or otherwise initiated. In these situations, it is not automatically the case that the late participant will have permission to this content. Further, in an alternative embodiment, permission must be granted to share a document if the other participants do not yet have permission. Whether all participants gain permission by default when someone shares a file (or other content) during a session, or whether the person sharing the file must explicitly grant permission to others when he or she shares a file is a matter of design choice in the implementation of application 101, or may also be a preference 497 provided to the host as shown in FIG. 13. The following figures describe how permission is granted in these situations.

Figure 30A:
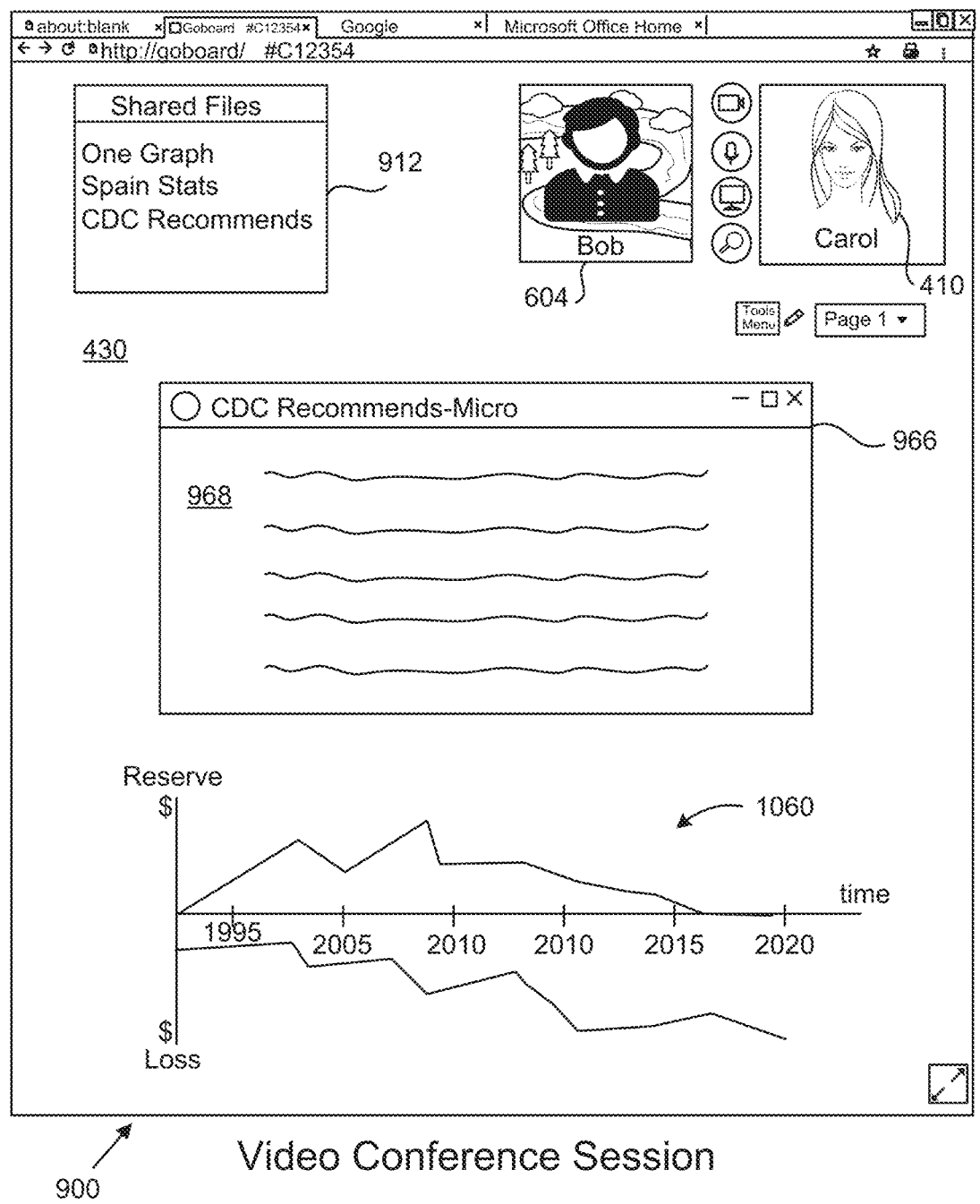
FIG. 30A illustrates the video conference session after which a new graph has been added.

FIG. 30A illustrates the video conference session 900 after which a new graph has been added. As shown, original participants Bob and Carol still have three shared files in common, are viewing an open window 966, and have created a new graph 1060 in the whiteboard at the bottom of the screen. Bob has a virtual background. At this point in time, a new participant, Frank, joins the session.

Figure 30B:
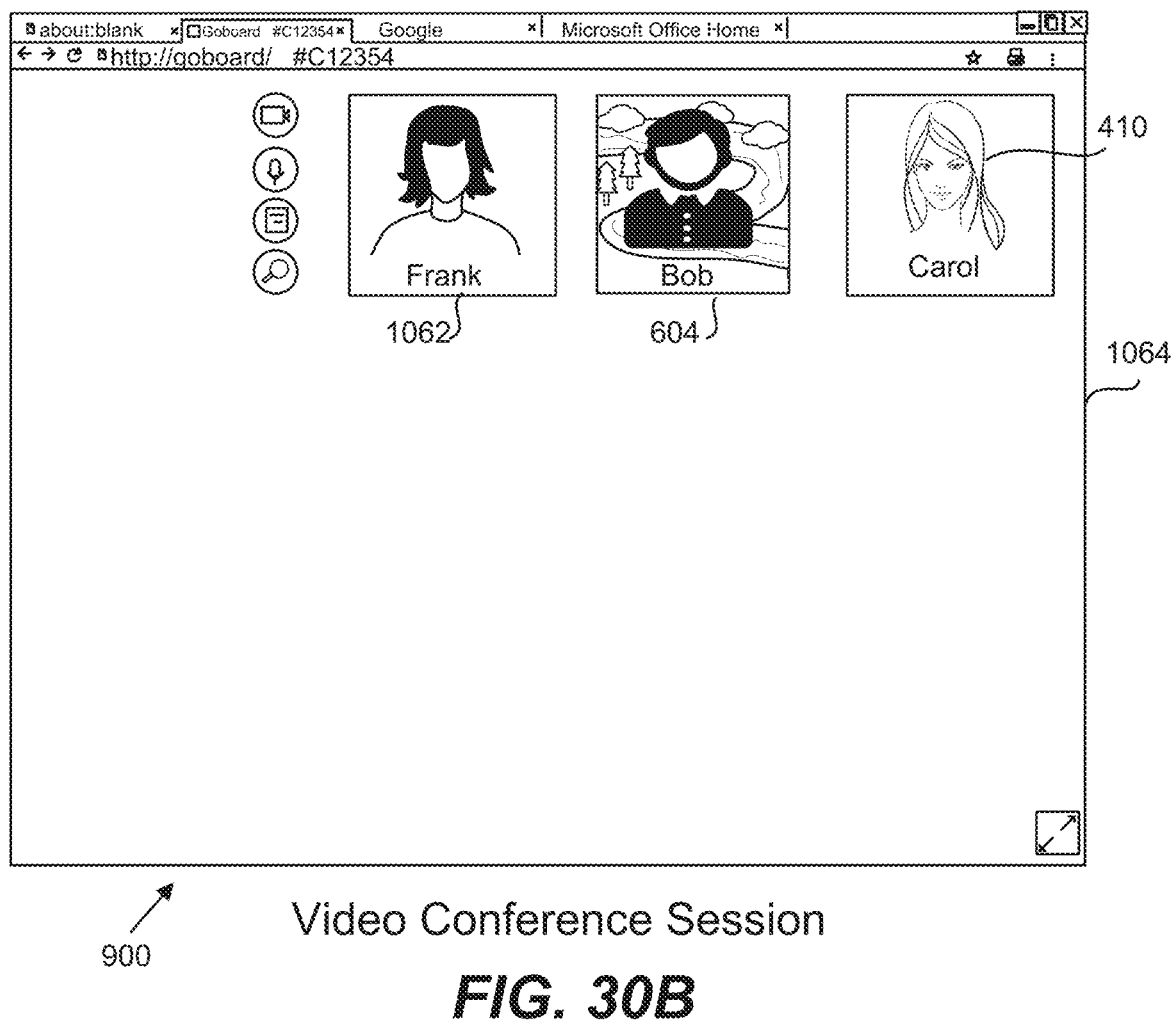
FIG. 30B illustrates the video conference session after Frank has joined, from the perspective from Frank's computer.

FIG. 30B illustrates the video conference session 900 after Frank has joined, from the perspective from Frank's computer. As shown, there is a video or still image 1062 of Frank, and the browser window 1064 on Frank's computer has no contents shown in the whiteboard region nor in a file box. Because Frank has joined the session after content had been shared or created, he does not yet have access or permission to view that content and it is not shown on this computer.

Figure 30C:
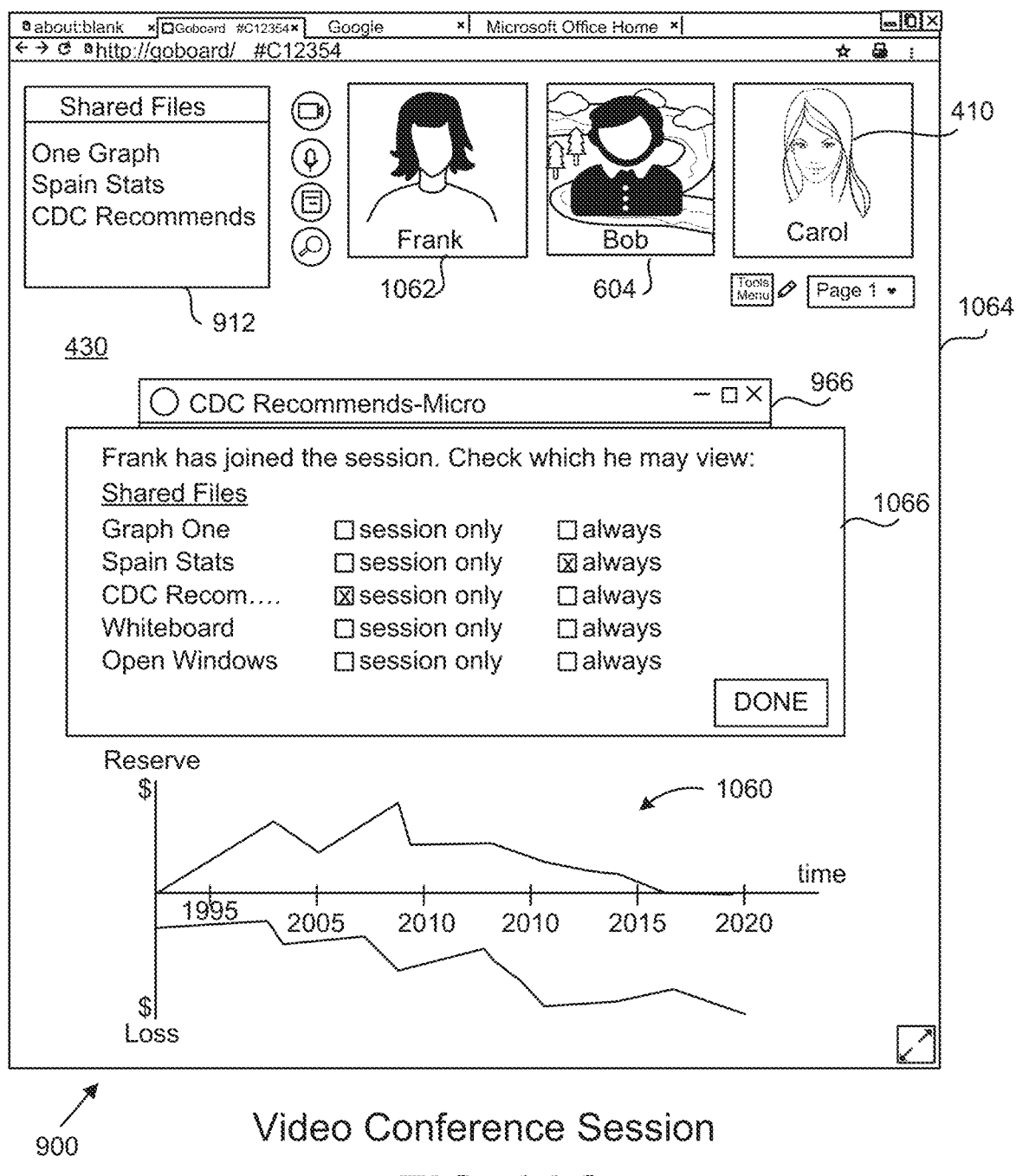
FIG. 30C illustrates the video conference session after Frank has joined, from the perspective of Carol's computer.

FIG. 30C illustrates the video conference session 900 after Frank has joined, from the perspective of Carol's computer. As shown, Carol (and Bob) still have access to the content they had before Frank joined (even though Frank does not), and a new window 1066 has opened on Carol's computer screen, being sent from application 101. The new window informs Carol, the host, that Frank has joined the session and is providing options of which content that Frank should be allowed to view and have access to in the future. If Carol does not check any of the boxes then Frank will not have access to any of the content and his screen will continue to appear as shown in FIG. 30B; Bob and Carol, though, will still have access to the content they had before Frank joined. Frank, though, will still be part of the session 900 with Bob and Carol, and all participants can see and hear one another.

Carol may select which content Frank may access, and may select that he can "Always" access this content (meaning that Franks permissions to this content are stored permanently in persistent storage in the permission databases previously described), or may select that he can access this content for the session only (meaning that when the session ends Frank will not have access to this content). Further, Frank may be given temporary permission to access this content for only this session. For example, he may be given permission in the database but then that permission is deleted from the database when the session ends.

As shown, Frank is only given permission to view two of the shared files, is not given permission to view graphic 1060 on the whiteboard, and is given permission to view any open windows, but for only this session. When Carol has finished choosing her options she clicks Done and Frank then has access to the appropriate content.

Figure 30D:
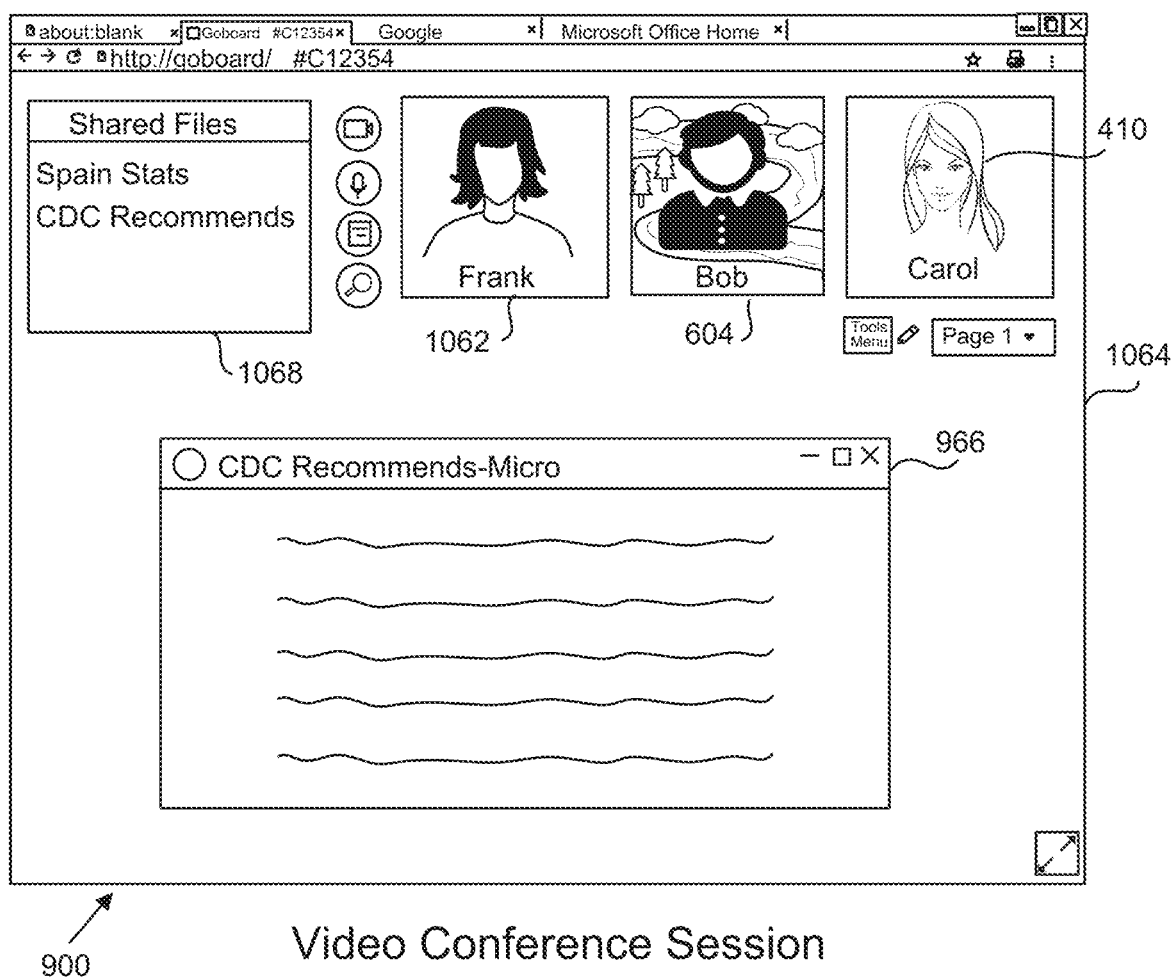
FIG. 30D illustrates the video conference session from the perspective of Franks computer after Frank has been given permission to view certain of the content.

FIG. 30D illustrates the video conference session 900 from the perspective of Franks computer after Frank has been given permission to view certain of the content. As shown, file box 1068 now appears within the browser of Franks computer indicating that he now has permission to access and view each of these files during session; the "Spain Stats" file he may also view at any time in the future. Frank may also view window 966, but he does not have permission to view graph 1060.

Figure 30E:
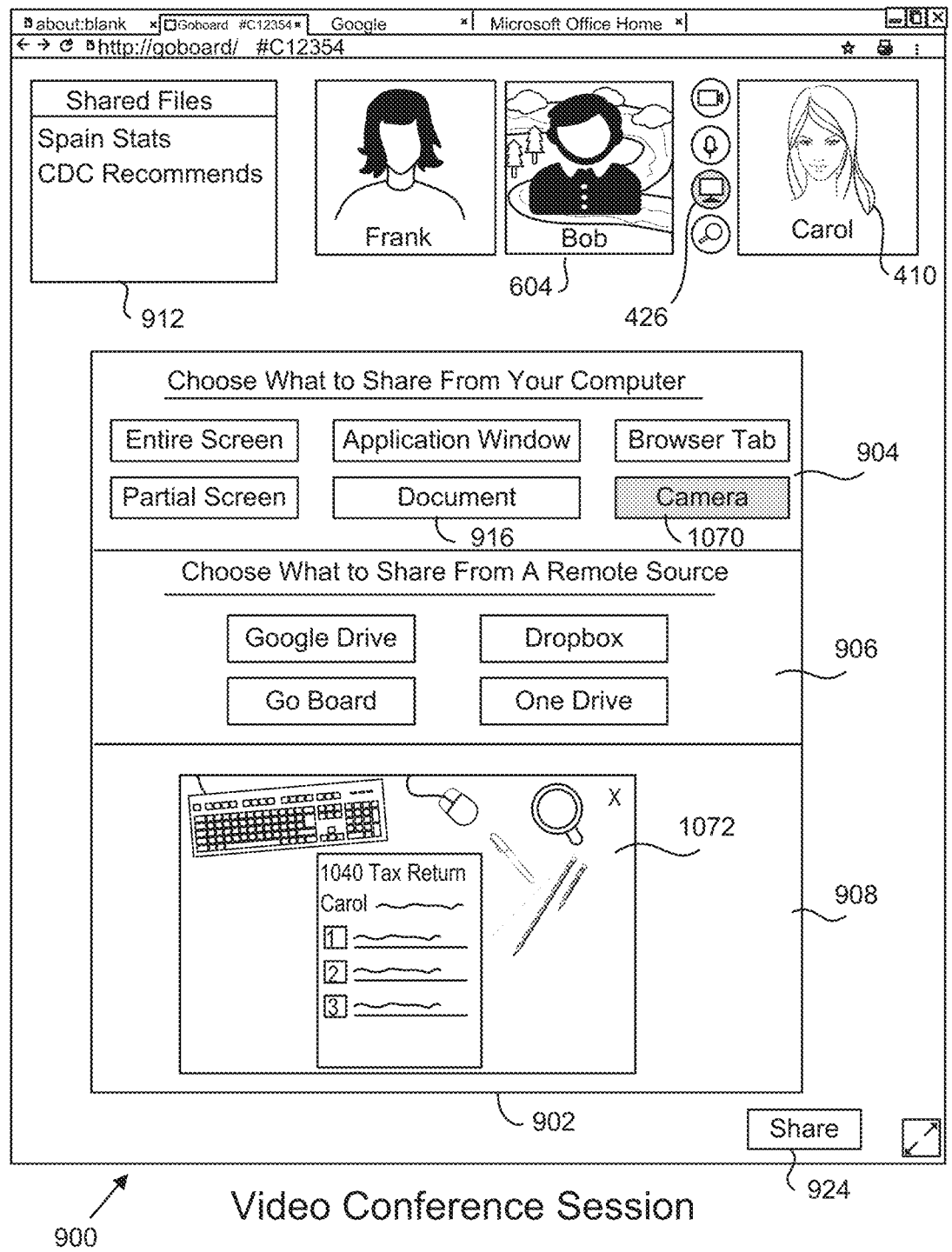
FIG. 30E illustrates the video conference session when new content is shared after Frank has joined.

FIG. 30E illustrates the video conference session 900 when new content is shared after Frank has joined. In this example, Carol has clicked sharing icon 426, window 902 appears as before, Carol clicks Camera 1070, and video image 1072 now appears in region 908. The camera is a remote USB camera attached to her computer that serves as a document camera and is pointing at a document on her desk, "1040 Tax Return." At this point, Bob and Frank do not have permission to view any shared content that Carol introduces during the session either because of a design choice in the implementation of application 101, or because of setting 497 that the host has chosen for this session.

Figure 30F:
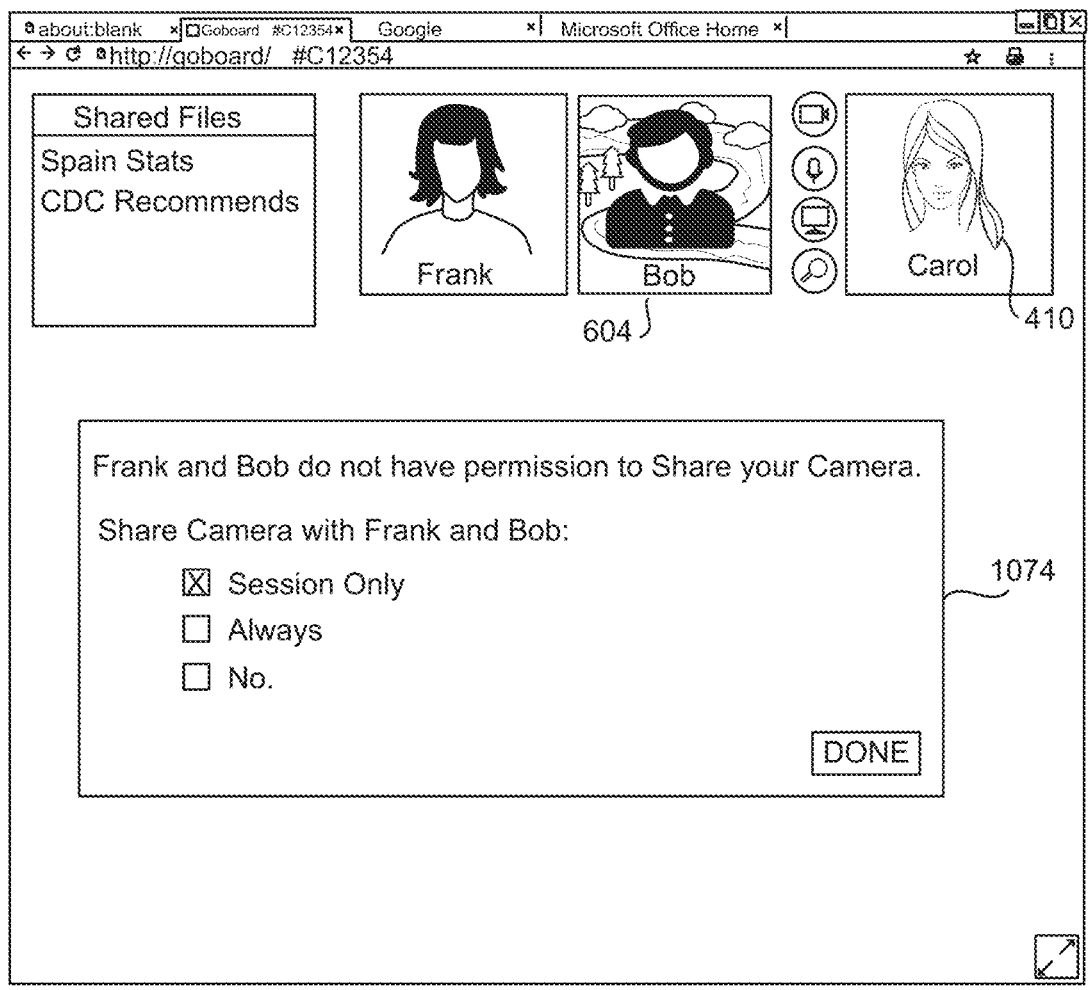
FIG. 30F illustrates the video conference session when new content is shared which requires permission.

FIG. 30F illustrates the video conference session 900 when new content is shared which requires permission. As shown on Carol's computer, window 1074 appears because Frank and Bob do not yet have permission to view the shared content, which in this case is the feed from the document camera. Of course, any other shared content may also require permission such as: screens, application windows, documents, browser tabs, etc. If Carol clicks "No" then Frank and Bob will not have permission to see the feed from her document camera. Carol clicks "Session only" and they will have permission to see this feed for the session; if she clicks "Always" then they will always have permission.

Figure 30G:
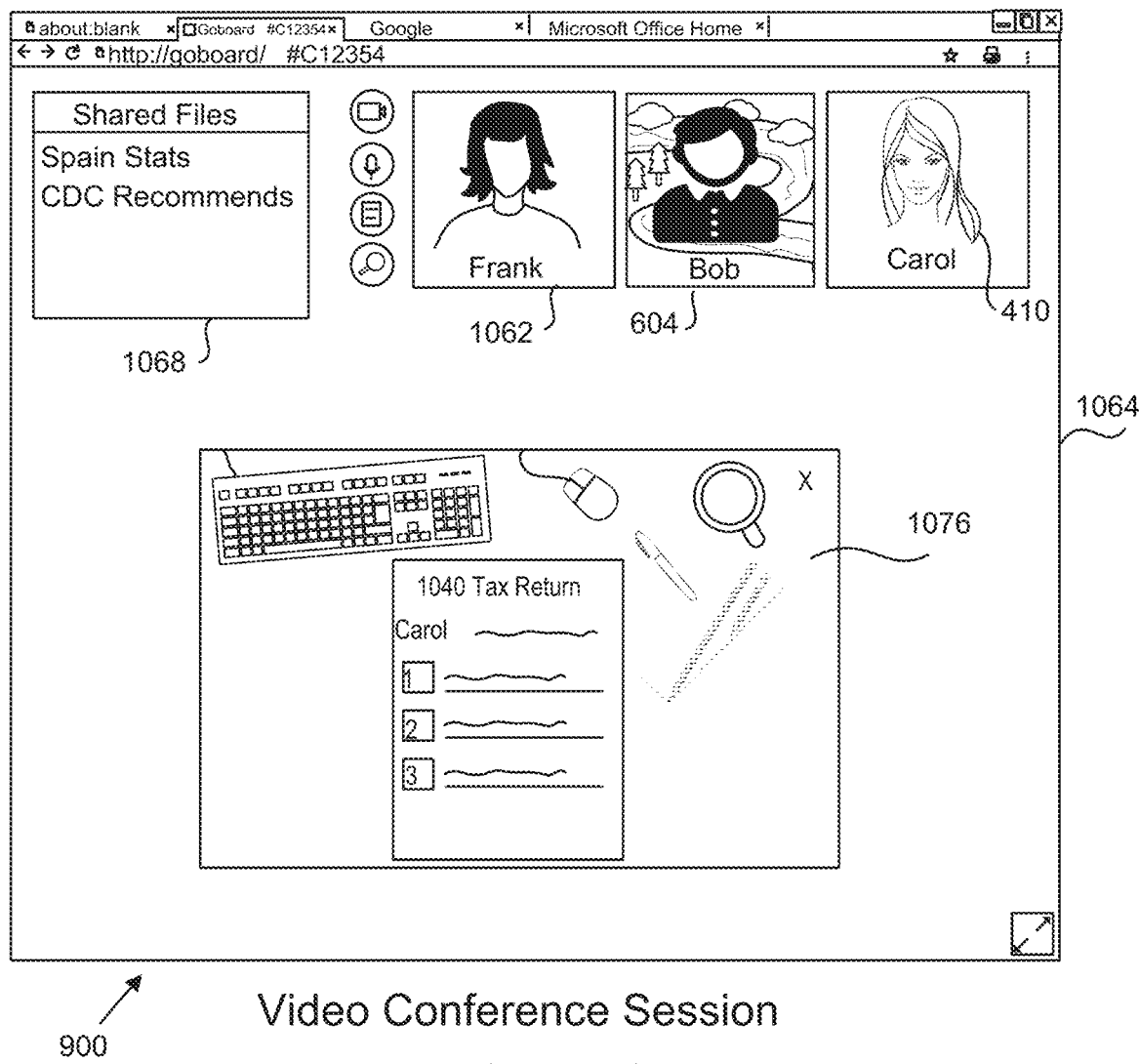
FIG. 30G illustrates the video conference session from the perspective of Frank's computer after he has permission to view content.

FIG. 30G illustrates the video conference session 900 from the perspective of Frank's computer after he has permission to view content. As shown, on Frank's computer (and on Bob's computer) now appears a window showing the feed from Carol's document camera, namely the tax return on the desk.

Figure 30H:
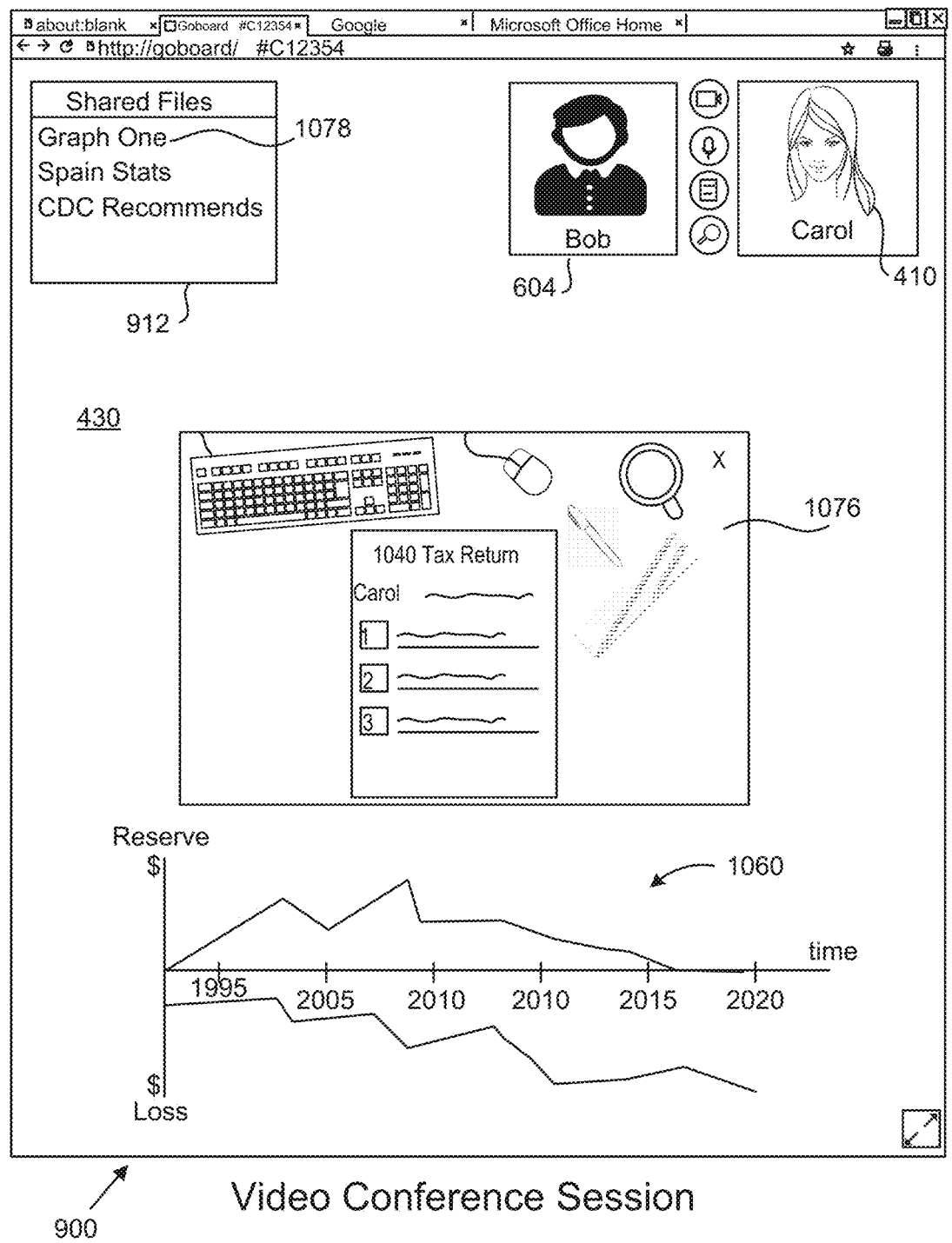
FIG. 30H illustrates the video conference session after Frank has left the session.

FIG. 30H illustrates the video conference session 900 after Frank has left the session. As shown, file box 912 now includes file Graph One 1078 because Bob and Carol as a group have access to this file (whereas Frank did not). Upon Frank leaving, the application 101 updates what can be seen based upon the remaining group members. Also, even though the group of (Bob, Carol, Frank) had access to the document camera, any subset of that group, namely (Bob, Carol) will also have access to that shared content. Accordingly, window 1079 shows the document camera feed to Bob and to Carol.

In one example, Jon, Mike, Ethan view the file "Pat App" last week. This week, Mike and Ethan are in a conference. The file "Pat App" will appear on their screens if just the two of them join a conference because each has permission to view that file. In other words, every piece of content is flagged as to who has access, then, whenever you are in a session (either by yourself or with others who also have access), you will have access to ALL files you had ever seen.

Cross-Platform Access to Saved Content

The above has described various techniques by which a participant or participants may save a previous session or previously used content and then retrieve that session or contents when the same group of participants is again present, all within the context of a particular video conference service, such as the GoBoard service executing upon a central server computer or computers 20, and making use of video conference application 101. In an additional cross-platform embodiment, any particular group of participants may take advantage of the features of the present invention when using a video conference service on a different platform. For instance, if a group of participants utilizes the GoBoard service in which to hold a video conference and save a session or content for later use, this same group of participants may access that session content when using a completely different service on a different platform, such as Google Meet, Zoom, etc.

As previously explained, any group of participants may hold a video conference session and then save that session or content using the above described techniques and databases, such as, for example, Bob and Carol have done in FIG. 23. Of course, they (or another group) may have saved any other content or settings as described above. At a later time, Bob and Carol meet again in the Google Meet video conference service.

Figure 31A:
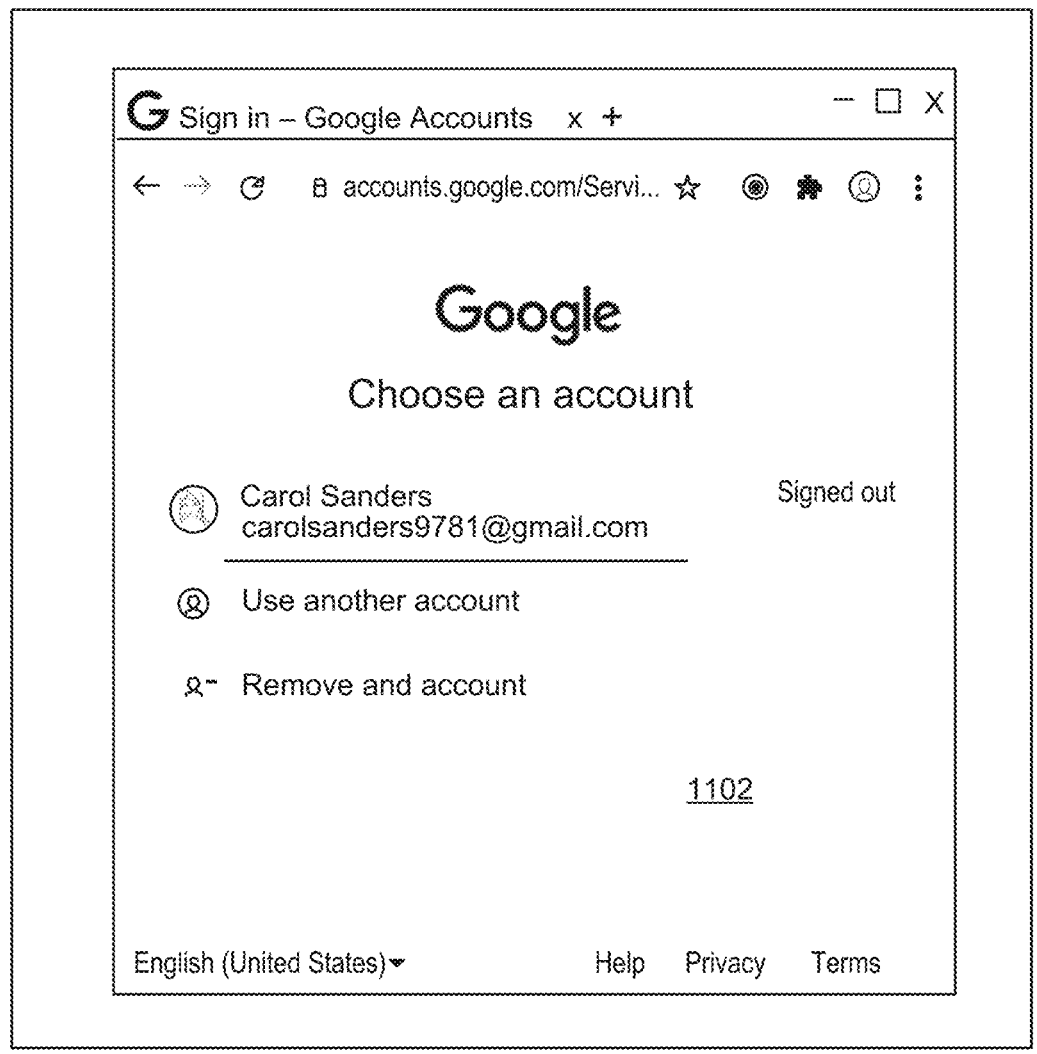
FIG. 31A illustrates logging in to the cross-platform Google Meet video conference service in order to make use of the present invention.

FIG. 31A illustrates logging in to the cross-platform Google Meet video conference service in order to make use of the present invention. As shown, and is known in the art, Carol has accessed the Google Meet service and is now being asked to log into her Google account via page 1102. Carol enters her unique email address and password in order to sign in to that service. As with the GoBoard service, the cross-platform service requires unique sign-in credentials (such as passwords, biometrics, etc.) in order to ensure the integrity of the service. And, a participant may choose to log in to any of the other video conference services, and may do so using a browser, downloaded application on a computer, or an "app" on a mobile telephone.

Figure 31B:
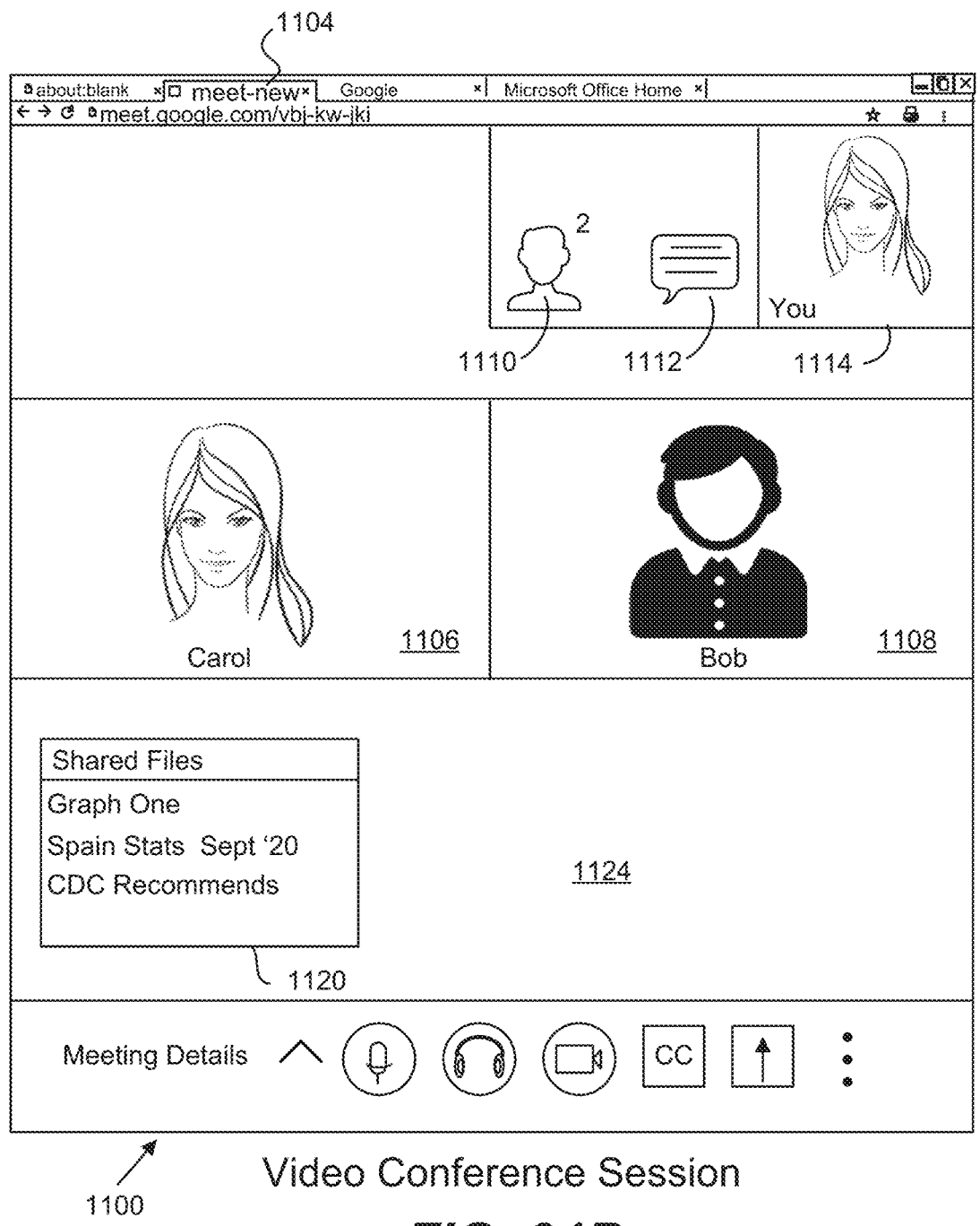
FIG. 31B illustrates the Google Meet service after Bob has signed in and has joined the video conference and after previously-used content has been retrieved.

FIG. 31B illustrates the Google Meet service after Bob has signed in and has joined the video conference and after previously-used content has been retrieved. As shown, the conference on Carol's computer is executing within a browser tab 1104 (although Bob may be using a downloaded application on his computer or an "app") and shows Carol's image (still image or video) 1106 and Bob's image 1108. The upper bar indicates the number of participants 1110, the ability to open a chat window 1112, and Carol's image 1114. A shared files box 1120 lists the files that Carol and Bob had previously shared in the previous conference which had used the GoBoard service. A bottom toolbar 1118 provides options to review or change meeting details 1116, mute audio or video, hang up, turn on captioning, share a document (up arrow), or adjust settings, etc. A technique for retrieving these shared files (and any other content) is described below with reference to FIG. 36.

FIG. 31B illustrates contents of a portable file used in implementation of the invention on a cross-platform service. By way of example, this portable file is stored on Carol's computer in order to keep track of Carol's files.

Saving of Video Conference Session State

Figure 32:
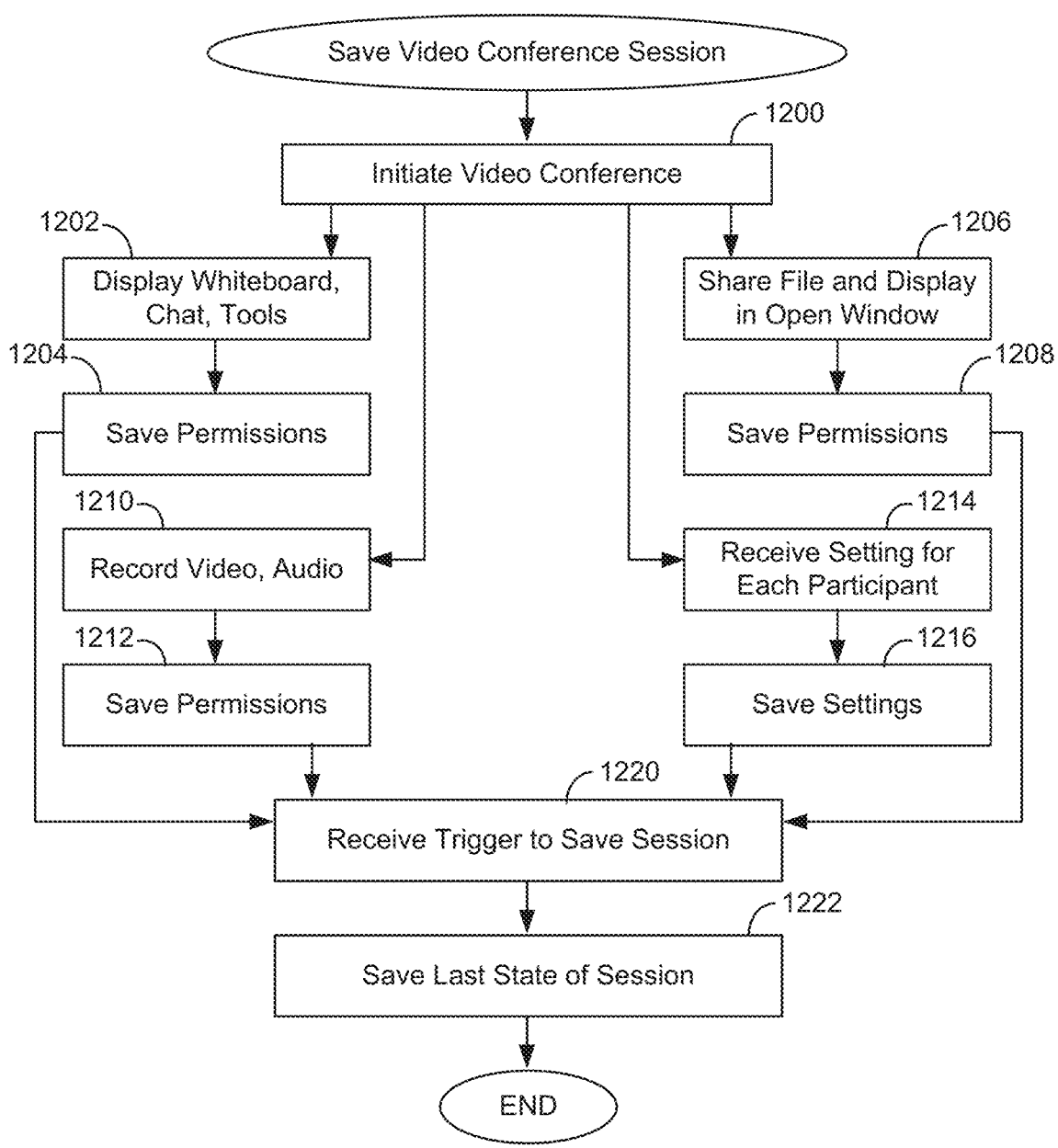
FIG. 32 describes one embodiment by which the state of a video conference session is saved to persistent storage for a particular group of participants.

FIG. 32 describes one embodiment by which the state of a video conference session is saved to persistent storage for a particular group of participants. The video conference is initiated and participants join the conference in step 1200 as has been described in step 704. Participants are able to see and hear one another (unless video or audio mute is selected by a participant), and the participants begin to collaborate as has been described above, in no particular order. At any point in time, any of the participants may draw upon a whiteboard, open a chat, share a file, record the session, change device settings, etc., and these activities will now be described below in numerical order, although there is no requirement that they occur in a particular order.

The below describes that saving the state of a video conference session involves saving the permissions of which participants are able to access which content and also saving the particular content shared or accessed during that session for later retrieval by that group of participants. Saving the permissions of which participants are permitted to access the shared content may occur at any time during the session. The below describes an embodiment in which permissions are saved in a rolling fashion as content is shared, created or initiated, and includes those participants who are present during session at that time. Thus, a participant who joins a session late, but is present when a whiteboard is created or added to, is present while a video is recorded, is present when a file is shared, etc., will be granted permission to access that content, even if that participant leaves a session shortly thereafter and before all of the other participants leave and the session ends. In another embodiment, permissions are granted at the end of the session and only to those participants who are present at the end of the session. Or, in another embodiment, permissions may be granted to participants who are present in the session for a certain percentage of time of the overall session.

In 1202 any or all of the participants may draw upon the shared whiteboard, open a particular tool palette, or participate in a chat window as has been illustrated and described above. In a step 1204, permissions to access the whiteboard, chat window, tool palette are granted to the group that was present when that content was created or opened. For example, if Carol, Thelma and Louise are in a session and they create and share a whiteboard, chat window and tool palette, then a group of (Carol, Thelma, Louise) will be formed and that group will have access to the whiteboard, chat window and tool palette, even if Louise leaves early. If Louise arrives late, after the whiteboard, chat window or tool palette have been created or opened, then Carol and Thelma will decide if Louise should have permission to access and view the current content as will be described below. If yes, then a group of those three is formed and will have access to that content as described, if not, then only a group of (Carol, Thelma) is formed and allowed access to the whiteboard, chat window or tool palette. If the first whiteboard is then cleared or deleted and a second whiteboard is initiated while Louise is in the session, then a group of (Carol, Thelma, Louise) is formed and that group will have access to the second whiteboard even if any of them leave early.

Permissions may be saved in persistent storage in a database of server computer 20 as directed by the video conference application 101 using any of the three techniques discussed above with respect to FIGS. 17A-17D, or using any other suitable or similar technique. For example, the participants and session identifier are stored into table 830 and the session name, whiteboard and chat link are stored into database 800. Or, the whiteboard name or identifier is stored into column 852, the group is stored into column 854, and a pointer to the whiteboard is stored into column 856 of database 850. Or, the group of three is stored into column 871 and a pointer is stored to the whiteboard content in column 873 of table 870, etc. Similar storage techniques may be used to grant permissions to the chat window, any tool palettes, etc.

In 1206 and any or all of the participants may share and display a file (or other shared content such as a screen, application window, browser tab, external camera, etc.) as has been illustrated and described above. In a step 1208, permissions to access the shared file (for example) are granted to the group that was present when that content was first shared. For example, if Carol, Thelma and Louise are in a session and one of them shares a file, then a group of (Carol, Thelma, Louise) will be formed and that group will have access to that shared file, even if Louise leaves early. If Louise arrives late, after the shared file has been shared and displayed, then Carol and Thelma will decide if Louise should have permission to access and view that file as will be described below. If yes, then a group of those three is formed and will have access to that file as described, if not, then only a group of (Carol, Thelma) is formed and allowed access to the shared file. If a second file (or other shared content) is shared while Louise is in the session, then a group of (Carol, Thelma, Louise) is formed and that group will have access to the second file even if any of them leave early.

Permissions may be saved in persistent storage using any of the three techniques discussed above with respect to FIGS. 17A-17D, or using any other suitable or similar technique.

In 1210 any of the participants may initiate an audio or video recording of the session, in fact, multiple audio or video recording may be made during a session, e.g., the first then minutes are recorded, the second ten are not, but the last ten are. Recordings may be made as is illustrated and described herein. In a step 1212, similar to creation of a whiteboard, permissions to access the recorded audio or video are granted to the group that was present when that audio or video recording was initiated. For example, if Carol, Thelma and Louise are in a session and they begin recording a video or audio, then a group of (Carol, Thelma, Louise) will be formed and that group will have access to that recording, even if Louise leaves early. If Louise arrives late, after the recording has begun, then Carol and Thelma will decide if Louise should have permission to access that recording as will be described below. If yes, then a group of those three is formed and will have access to that recording as described, if not, then only a group of (Carol, Thelma) is formed and allowed access to the recording. If a second recording is initiated while Louise is in the session, then the group of (Carol, Thelma, Louise) will have access to that second recording even if any of them leave early.

Permissions may be saved in persistent storage using any of the three techniques discussed above with respect to FIGS. 17A-17D, or using any other suitable or similar technique.

In 1214 each participant may select their own device settings for this particular session. For example, each participant selects a desired video camera for use, selects speakers attached to their computer to output sound from the session, a particular microphone to use, whether or not the camera and microphone are muted, and a desired, particular virtual background. Typically, each participant adjusts these settings before entry into the session proper, such as shown and described with respect to FIG. 4, although these settings may be changed during the session or may not be selected until later during the session. For instance, a virtual background may be added after a participant has joined the session.

In a step 1216, permission to access and retrieve the settings for participant in a particular group are determined and saved. For example, if Carol, Thelma and Louise are in a session each of the three will have particular settings in use and a group of (Carol, Thelma, Louise) will be formed (if it had not been formed previously) and each participant in that group will have access to their own particular settings when they are in that group. If Carol and Thelma are in a group and are in a session, each may have particular settings that are possibly different from settings they would like to have when Louise joins that session a later time. For example, Carol may have no virtual background when in a group with Thelma, but as soon as Louise (a potential client) joins the group the conference becomes a business sales conference and Carol would like to have a particular virtual background showing. Thus, the virtual background saved for the group of Carol and Thelma, is different for Carol's virtual background saved when the group is Carol, Thelma and Louise. Similarly, any of the other settings may change depending upon which participants are currently in the session; for example, Thelma may desire to use her document camera rather than her facial camera when Louise is on the call, Louise may desire to use different speakers when discussing with Carol and Thelma because she always calls them from a conference room and not from her mobile telephone, etc.

Thus, device settings for each participant of a particular group are typically saved after a significant amount of time has passed after the session has begun or after a new participant has joined. By way of example, application 101 may wait one minute or a few minutes after a session has begun in order to give the participants time to change their settings if desired. Similarly, if a new participant or participants join the session, the application may wait a minute or two before saving the settings for each participant of the group in order to give any of the participant's time to change their settings desired. Or, if five people join the session from the beginning, and then two leave the session, the application may give the remaining participants a few minutes to change their settings before saving the settings. Such a delay allows each participant to tailor his or her settings to the current group and it is assumed that once the settings are set, that each participant typically would not change his or her settings as long as the group stays the same. As an example, the settings for each participant when in the group of (Carol, Thelma, Louise) will be saved in association with that distinct group, while the settings for Carol and Thelma when in the group of (Carol, Thelma) may be different from the settings each uses when Louise is present.

Permissions may be saved in persistent storage using any of the three techniques discussed above with respect to FIGS. 17A-17D, or using any other suitable or similar technique. Using FIG. 17A is an example of the first technique, column 822 will store the settings for each of Carol, Thelma and Louise (the settings for each participant grouped and identified separately) for group 808, and a virtual background link for each of them (if any) will be stored in column 826. Using FIG. 17C to illustrate the second technique, column 850 stores a link for the settings for the group of (Frank, Bob, Carol), the settings for each person also being grouped and identified separately. For the group consisting of (Alice, Carol), their settings are stored in column 850 at 868. As mentioned above, for each row of settings in this database, there will be only one distinct group listed. Using FIG. 17D to illustrate the third technique, the settings for each particular group of column 871 are listed in column 878, while links to the virtual backgrounds are stored in column 877.

In step 1220 a trigger is received to save the current session and may include any of the triggers described above in step 716. Accordingly, control moves to step 1222 in order to save the last state of the session. If the permissions have not been saved on a rolling basis as has been described above, then permissions are saved at this point for any participants remaining in the session and for any content that is currently displayed, shared, recorded, etc. The individual computer settings for each participant may also be saved at this time if not already saved. Regarding any content that has been shared, displayed, recorded, etc. during the session, preferably this content is saved periodically during the session rather than only at the end of the session. For instance, any whiteboard or chat window is saved periodically (i.e., every 5 seconds, 10 seconds every minute, etc.) during the session and its final state will also be saved. If not saved periodically, any whiteboard or chat is saved at this time. Any video or audio that is being recorded is by definition being saved as it is being recorded. Shared content is not typically changed during a session so it is not saved periodically. Any open windows that are open at the end of the session will also be saved at this time, although any window that had been opened but was then closed is not saved. Regarding the settings for each participant, as mentioned above, the settings are typically saved soon after the session begins (or after a change in participants), but they may also be saved for all participants at the end of the session.

Now that session state information has been saved for a particular session (which may include content and settings information for any number of distinct groups of participants), this state information may be retrieved by any of these groups when in a session at a later time as is described herein.

Figure 33:
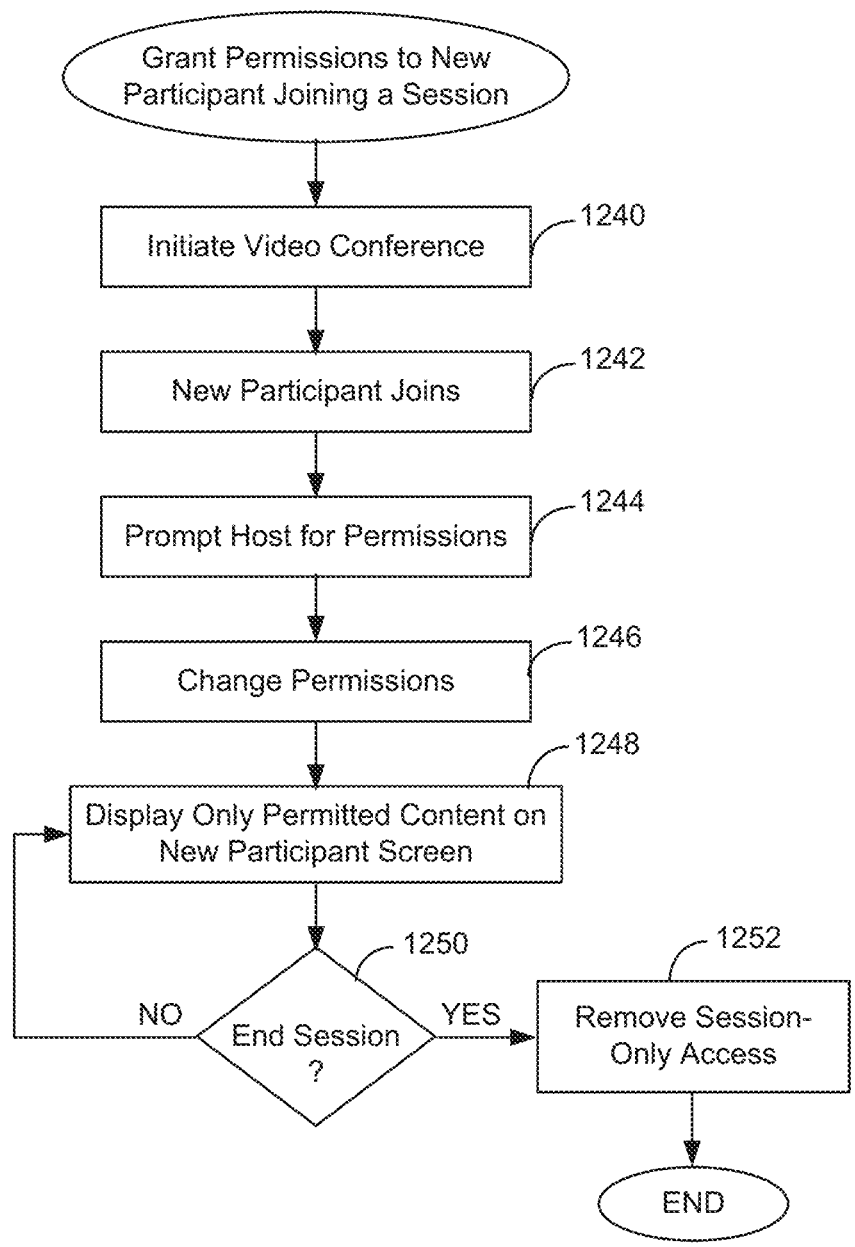
FIG. 33 is a flow diagram describing one embodiment by which permissions are granted to a new participant who joins the session.

Granting of Permissions to a New Participant Who Joins a Session in Progress FIG. 33 is a flow diagram describing one embodiment by which permissions are granted to a new participant who joins the session. Previously, FIG. 15 has described how previous session content may be retrieved for a particular group of participants who are present in a session at more or less the same time. In certain situations, previously shown and described in FIGS. 30A-30D, a participant may join a session late when others have already begun speaking, collaborating, sharing documents etc. In this embodiment, it is assumed that the new participant may not automatically have permission to view any of that existing content of the session.

In a first step 1240 a video conference is initiated and any number of participants begin speaking, recording, sharing files, collaborating on a whiteboard, etc., as has been previously described. An example is shown in FIG. 30A in which Bob and Carol are sharing files, viewing an open window, and collaborating upon a whiteboard. Next, in step 1242 a new participant, Frank, joins this existing session and a view of the session on his computer is shown in FIG. 30B. As shown, although he can, speak and be seen, he is not able to view or access any of the content that Bob and Carol can. Next, in step 1244 application 101 detects that the new participant Frank has joined and prompts the host to grant permissions (if any) to this new participant.

Application 101 then displays window 1066 upon the host's screen as shown in FIG. 30C and lists the content that is currently shared, the existing whiteboard, and the open window, as well as checkboxes for granting particular permissions. Of course, not all possible content that might exist is shown in this example, other content may include a chat window, a tool palette, a virtual background for any of the participants, and a video or audio recording. The host (or other participant if enabled) may then check boxes as shown in order to grant particular permissions for content that Frank may view or have access to. Once finished, Carol clicks Done and this information is transmitted back to application 101.

Next, in step 1246 application 101 changes the permissions in any of the databases it is using (e.g., database 800, 850 or 870) according to the input from the host. By way of example, if using the first technique, a new row is added in table 830 including Bob, Carol and Frank as participants, a new row is added in database 800 having a session name of Bob-Carol-Frank and using the same session identifier, links to the two checked shared files are added in column 824, and a link to the open window is added in another column (not shown). If using the second technique, the grouping of (Bob, Carol, Frank) is added to rows 859, 860 and 867 of database 850, thus providing Frank with access to the two shared files and to the open window. If using the third technique, a new row is added to database 870 with the grouping (Bob, Carol, Frank) in the first column, and pointers are provided in column 872 to the two shared files, and a pointer is provided in column 875 to the open window content. Once the permissions have been changed in the databases using any of these techniques or similar, Frank has permission to access the content that Carol has permitted.

In step 1248 only the content that has been permitted by the host is now displayed on the computer of the new participant. As shown in FIG. 30D, Frank's computer now has a shared file box 1068 including the two shared files and he may view and the open window 966. Note that Frank does not have access to, and his computer does not display, graphic 1060. Application 101 is able to determine which content should or should not be displayed on Frank's computer by using information found in any of the databases of FIGS. 17A-D, depending upon which technique is used. Both Carol and Bob's computers continue to display content as shown in FIG. 30A.

In step 1250 it is detected whether the session has ended. Because some of the permissions granted by Carol are temporary, i.e., for the session only, these temporary permissions will be removed in step 1252. Accordingly, application 101 changes any of databases 800, 850, or 870 to remove any permissions granted that are "Session only" by undoing the changes that had been made in step 1246. If the session has not ended, then the video conference continues as normal.

Granting of Permission when New Information is Shared

Figure 34:
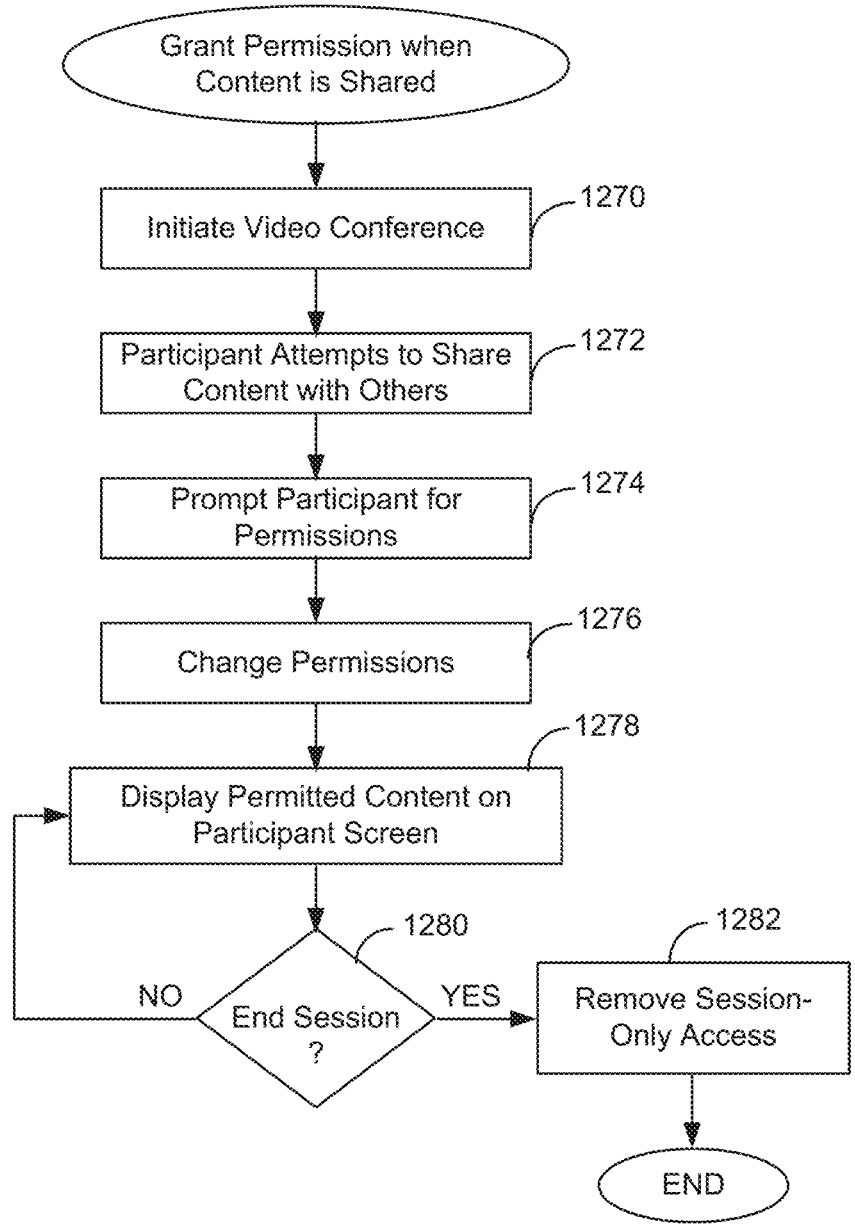
FIG. 34 is a flow diagram describing one embodiment by which permission may be granted to the current participants of the session when one participant decides to share information that the other participants do not have permission yet to view.

FIG. 34 is a flow diagram describing one embodiment by which permission may be granted to the current participants of the session when one participant decides to share information that the other participants do not have permission yet to view. Reference will be made to FIGS. 30E-30G. In general, it is contemplated that when any participant desires to share content or other information already existing (such as an entire screen, a partial screen, an application window, a document or file, a browser tab, an attached document camera, etc.) with other participants in the session, that the sharing participant must first grant permission to the other participants to access and view that content. By contrast, for other types of content that is generated during the session, such as whiteboards, tool palettes, chat windows, open windows, recorded video and audio, etc., it is generally assumed that any participant in the session when that content is generated does automatically have permission to access and view that content. Note that a participant who joins a session in which content is already being viewed must be explicitly granted permission to view that content, irrespective of when the content was generated; see, for example, FIG. 33. FIG. 34 is an example of a participant sharing a document camera, but the below description applies to any content that is shared.

In a first step 1270 a video conference is initiated and any number of participants begin speaking, recording, sharing files, collaborating on a whiteboard, etc., as has been previously described. An example is shown in FIG. 30E in which Frank, Bob and Carol are sharing files. Next, in step 1272 one of the participants attempts to share content with the others by selecting sharing icon 426. As shown in FIG. 30E, window 902 appears and in this example Carol has selected camera 1070 in order to share her document camera with the others. Of course, Carol may have selected any of the other content to share shown in region 904 or in region 906 and permission would be granted in the same way as described below. As shown, region 908 now shows the video feed 1072 from her document camera which shows her tax return lying on her desk. Carol then clicks Share 924.

Next, in step 1274 application 101 detects the sharing request and prompts the participant (in this case, Carol) to grant permissions (if any) to the other participants on the call. Application 101 then displays window 1074 upon the participant's screen as shown in FIG. 30F, describing the content to be shared (in this case, her document camera), the names of the other participants, as well as checkboxes for granting particular permissions. Carol (or other participant if he or she had initiated the sharing) may then check boxes as shown in order to grant particular permissions for viewing the feed from the document camera. Once finished, Carol clicks Done and this information is transmitted back to application 101.

Next, in step 1276 application 101 changes the permissions in any of the databases it is using (e.g., database 800, 850 or 870) according to the input from the host. By way of example, if using the first technique, the row in database 800 with the combination of Frank, Bob and Carol is identified (or created if not present) and in a "Carol's document camera" column (not shown) an entry of "Yes" is entered indicating that these participants are permitted to access and view Carol's document camera. If using the second technique, a row is added in database 850 for "Carol's Document Camera" (or a suitable unique identifier for that camera), and the grouping of (Bob, Carol, Frank) is added to that row in column 854, thus providing Frank and Bob with access to the video feed from Carol's document camera. If using the third technique, the row in database 870 with the grouping (Bob, Carol, Frank) in the first column is identified, and in a "Carol's document camera" column (not shown) of that row an entry of "Yes" is entered indicating that these participants are permitted to access and view Carol's document camera. Once the permissions have been changed in the databases using any of these techniques or similar, Frank and Bob now have permission to access the content that Carol has permitted.

In step 1278 the content that has been permitted by the sharing participant is now displayed on the computers of the other participants. As shown in FIG. 30G, Franks computer now shows window 1076 which is the content of the video feed from Carol's document camera; Bob's computer would show the same. Application 101 is able to determine which content should or should not be displayed on Frank and Bob's computers by using information found in any of the databases of FIGS. 17A-D, depending upon which technique is used.

In step 1280 it is detected whether the session has ended. Because some of the permissions granted by the participant are temporary, i.e., for the session only, these temporary permissions will be removed in step 1282. Accordingly, application 101 changes any of databases 800, 850, or 870 to remove any permission granted that are "Session only" by undoing the changes that had been made in step 1276. If the session has not ended, then the video conference continues as normal.

Restore Content when a Participant Leaves a Session

Figure 35:
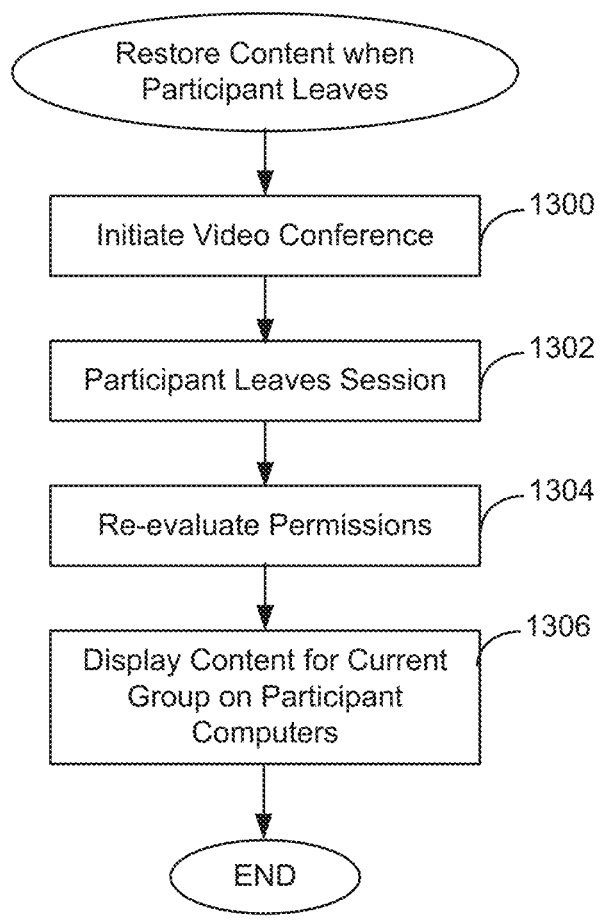
FIG. 35 is a flow diagram describing one embodiment by which permission is reevaluated when a participant or participants leave a session.

FIG. 35 is a flow diagram describing one embodiment by which permission is reevaluated when a participant or participants leave a session. When that happens, the current group of participants left in the session has changed and the application will evaluate what content is accessible by that current group and that content will then be displayed. Reference will be made to FIGS. 30A, 30G and 30H.

In a first step 1300 a video conference is initiated and any number of participants begin speaking, recording, sharing files, collaborating on a whiteboard, etc., as has been previously described. An example is shown in FIG. 30A in which Bob and Carol are sharing files, viewing an open window, and collaborating upon a whiteboard 1060. Frank joins the session later and the files are shared with him (but not the whiteboard); the state of this session with Frank is shown in FIG. 30G (file shared, document camera shared, but no whiteboard shared).

At some point in time Frank leaves the session in the application will now will reevaluate what content should be shared amongst the participants. Accordingly, in step 1304 application 101 detects that Frank has left the session ended then reevaluates what permissions and access are appropriate for the current group, namely Bob and Carol. Of course, any number of participants may leave and the remaining current group may be a single participant, two participants or more.

In order to reevaluate what permissions are appropriate for the current group, any of databases 800, 850 or 870 may be used, depending upon the technique used. If the first technique is used, the application searches for a match of the current participants in table 830, finds the appropriate role for those participants in database 800, and then determines what content is appropriate for those participants to view. If using the second technique, the application searches for rows with the current participants (Bob, Carol) in column 854 and identifies appropriate content in those rows in column 852. If using the third technique, the application searches for the current participants (Bob, Carol) in a particular row and then determines the appropriate content using any content or links found in columns 872-880 for that particular row. In this example, the application determines that Bob and Carol previously had access to (and currently have access to) the file Graph One, and to a whiteboard showing graph 1060.

Accordingly, in a next step 1306 the application then proceeds to display that content on the computers of Bob and Carol. As shown in FIG. 30H, each of their computers now includes a file box 912 with the file Graph One 1078 and the whiteboard which includes graph 1060. The document camera feed 1079 still appears on their computers as both previously had access to it. Thus, once Frank leaves, a shared file and a whiteboard graph are restored to the computers of Bob and Carol because Bob and Carol previously had access while Frank did not.

Cross-Platform Access to Saved Content

Figure 36:
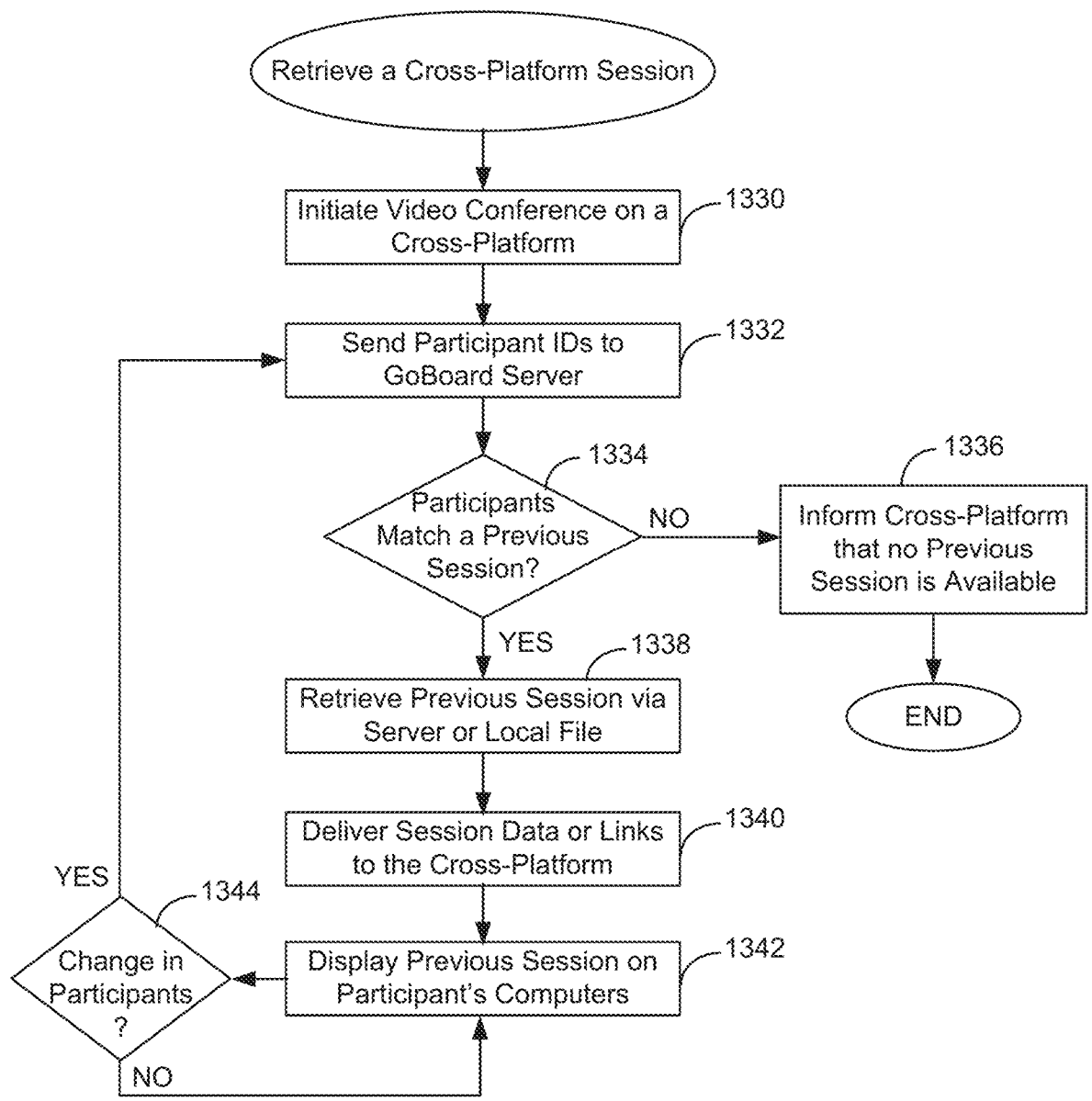
FIG. 36 is a flow diagram describing embodiment by which participants in a video conference use a cross-platform service to retrieve content from a previous video conference on a different platform.
Figure 37:
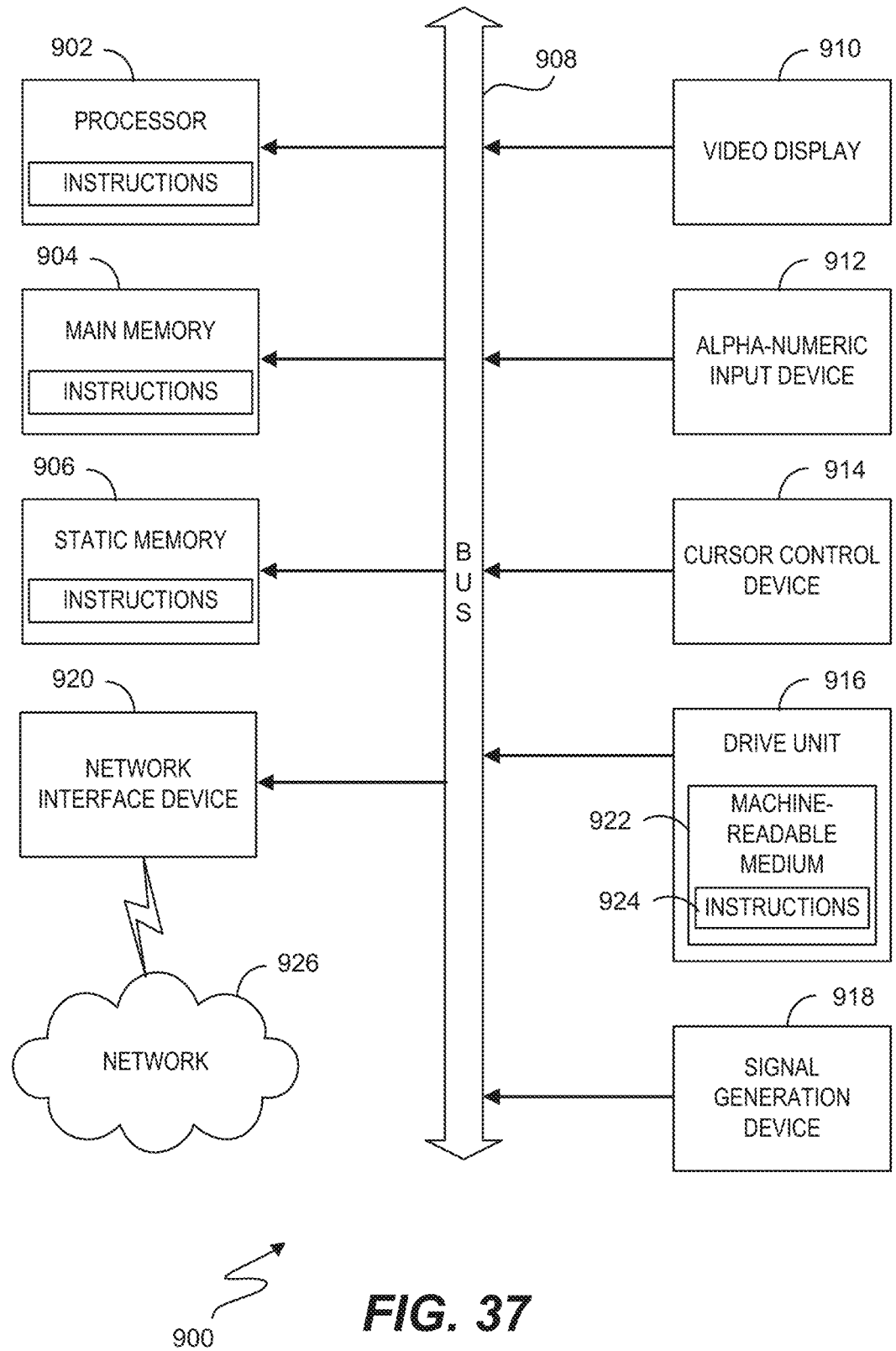
FIG. 37 is a block diagram of a computer system suitable for implementing embodiments of the present invention.
Figure 38:
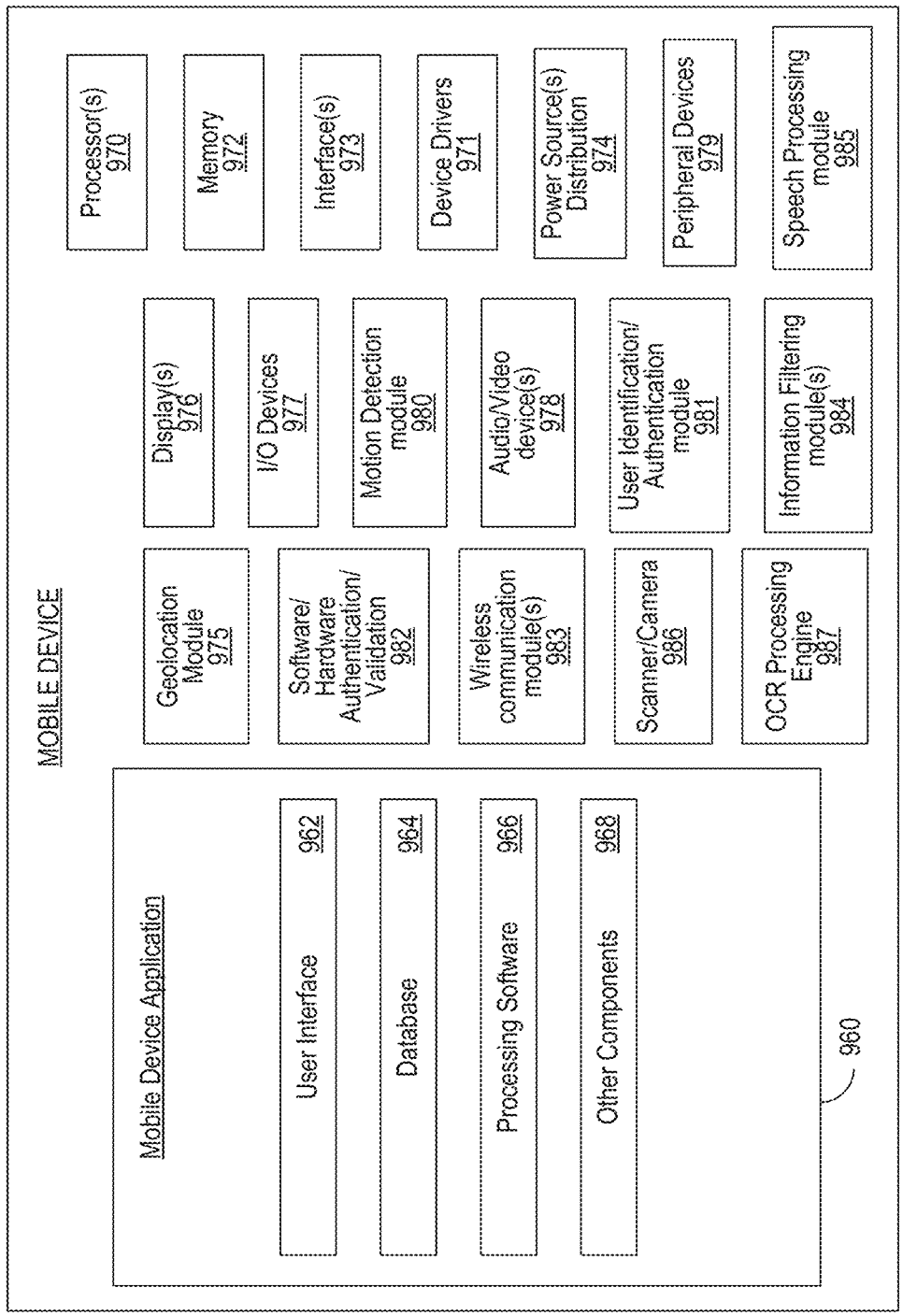
FIG. 38 is a block diagram of a mobile device suitable for implementing embodiments of the present invention.

FIG. 36 is a flow diagram describing embodiment by which participants in a video conference use a cross-platform service to retrieve content from a previous video conference on a different platform. In the first step 1330 any number of participants initiate a video conference on a platform different from a platform that they had all previously used together in which they had saved content and settings (such as shared files, whiteboard, chat window, any open windows, whiteboard tools, virtual backgrounds, individual device settings, recorded video or audio, etc.). Such a step may be implemented using any of a variety of now known or future video conference services, for example, two participants are shown signing in and using the Google Meet service in FIGS. 31A and 31B.

In a next step 1332 the cross-platform service detects that any number of participants have joined the conference and sends a unique identifier for each participant to the original service used by the participants to hold the previous conference, e.g., sends the identifiers to the GoBoard service and to video conference application 101. Detection that participants have joined and the decision that the group is present and to send participant identifiers may be made using any of the techniques described above.

In step 1334 application 101 determines if the participants in the cross-platform session 1100 matches any group of participants that had participated in a previous session using the GoBoard service. This step may be performed as previously described in step 738 using any of the techniques shown in FIGS. 17A-17D. If no participants match then application 101 informs the cross-platform service that no previous sessions or content are available for the current group and session 1100 will continue with the current participants without importing any settings or making available any previously saved files or content, e.g., file box 1120 would not appear.

If application 101 does determine that the participants of session 1100 do match a previous session then at step 1338 application 101 proceeds to retrieve that previous session and any content to which that group of participants had access. This step may be performed by application 101 as previously described in step 742. In another embodiment, each participant carries around with them on their computer a special file that indicates to which content they have access. Application 101 still determines if the participants match, but it does not need to retrieve the session and contents in step 1338 because the special file already tells the participant's computer to which content he has access.

Next, in step 1340 application 101 delivers this retrieved session and content to which that group of participants had access to the cross-platform service, in this example, Google Meet. The application 101 may deliver the actual content or only pointers to where the content exists.

In step 1342 this delivered data is then displayed on the participants computers in the cross-platform service, for example, FIG. 31B shows Carol's computer in which the shared files box 1120 now includes the three files that Carol and Bob had been viewing earlier in the session on a different platform. If they had been viewing a whiteboard and it had been saved, the whiteboard would appear in whiteboard region 1124 (which region may be adjusted or expanded using the known techniques of a particular platform). If they had been viewing a chat window that chat window would also reappear on their screens (in the same position that a chat window appears when button 1112 is pressed). Any virtual background for Carol or for Bob that had been used and saved in the previous session would now appear as a background in the respective images (1106, 1108), and any video or audio that had been recorded would also appear as an icon on their screens and able to be played. Any device settings saved for a participant are imported into Google Meet and overwrite any current settings in Google Meet. These imported settings then take effect within session 1100. By way of example, if Bob had been using a particular camera as his facial camera in the previous session, this camera will now replace whichever default camera Google Meet was using as Bob's facial camera. In a similar vein, imported settings for speakers, microphone, etc., replace those settings that were the default option for Google Meet.

At this point, Bob and Carol continue with their session 1100 using the content and settings from their previous session. At some point, in step 1344 if the participants change (i.e., one of them leaves or another participant joins), then control returns to step 1332 in which a new set of participant identifiers are sent to application 101 in order to determine if the content to which the group has access should be changed, such as by adding shared files, a different whiteboard, or by removing content to which the new group does not have access. If there is no change in participants then the current participants continue with their session.

Virtual Reality Embodiment

The present invention applies also to an embodiment in which participants are meeting in a three-dimensional (3-D) virtual reality (VR) space (or "room") as opposed to a traditional two-dimensional space described above. Participants may wear VR headsets, use tracking cameras, use a 3-D pen, etc., appear as avatars in a room, and see one another as if they all were in a 3-D space, manipulating 3-D objects, whiteboards, etc.

Typically, when first donning a VR headset, each student will log in to application 101 (via the headset or using handheld devices) and each will then be authenticated using an integration between the headset and the application, or a communication with a Student Information System. Each participant may also have displayed in front of them, in virtual reality and in three dimensions, a tablet computer (such as an iPad, etc.) that is arranged to display any or all of the drawings and figures discussed above. In addition, of course, each participant views in virtual reality the avatars of the other participants in the room.

Participants can create multiple rooms or whiteboards during a session, and the information created or used in such a session will persist, not only the content described above, but also information relating to a selected background, brightness, spatial audio, the avatars of each participant, their selected tools, files, three-dimensional objects, other resources in use—all information that will persist and can be retrieved depending on who is in the room. For example, all information that the participants have drawn on the whiteboard or have created in three dimensions will also persist, such as three-dimensional molecules created by one of the participants regarding a discussion about chemistry. In other words, any three-dimensional object created during the session will also persist in addition to two-dimensional drawings on a whiteboard.

This information does not need to be saved by the participant after each session, but instead it will automatically persist in the room in which the participant made the changes. Ethan may spend time setting up "Ethan's Physics Room" with specific 3-D objects, 3-D whiteboards, a physics tool palette in mid air, particular room settings, etc., and that content and those settings will remain and can be retrieved when he goes back into that room later to teach a physics student. Similarly, he may create a different room, for example "Ethan's History Room," and have different content and settings than the Physics Room, e.g., Ethan may want a beach background in the History Room, but may feel more focused with a library background in the Physics Room. Ethan's room settings can be changed in a 3-D user palette, and there will also be various 3-D tool palettes similar to the tool palettes shown and described above.

Specifically, room settings for a particular room are created and saved for that room based on the people in the room. For example, if Ethan and Jane have met previously in a 3-D room, and have changed their room settings and added 3-D content, then when those same two people, Ethan and Jane, meet again in a 3-D space, the changed settings and added content persist and can be retrieved. This applies to the tools used, each avatar appearance, whiteboard content, room settings, and other features. And, as described above, all of their previously shared files are available, their chat history, and other content that has previously been shared between those two users.

In another example consider the same tutor-student combination across two different subjects, for example Ethan is Jane's math tutor, but also her chemistry tutor in a different session. There will be different settings and content for the same people combinations depending upon the session, and when those two participants join, they can retrieve any of their old sessions, automatically or manually. Automatic retrieval of an old session occurs when the same two (or more) people are in the room, and will typically retrieve the last session. Participants may also retrieve sessions manually. If Ethan and Jane begin a new session in a 3-D room application 101 identifies the participants, it searches through all the sessions they had been in, and presents a selection of sessions by name or date, such as shown in FIG. 27A. The participants may pick a session to talk about today and bring up that old session, whether it be math or chemistry.

In another example, when an additional participant joins a room at a later time; i.e., Jane adds her friend Jenny to the math room for one session with Ethan, the host (or others) has the option to allow the other participant to see all previous content in the room and on the whiteboard, or not, and this access to content may be made permanent for all future sessions. The host also has the option to erase this content for the new participant once she leaves, that is, Jenny may only see the content for that one meeting only.

Participants may access the content for previously-stored 3-D rooms in several ways, as has been described above with respect to 2-D sessions. A participant may create a new room or join a friends' room that is in session (by entering a 6-digit code provided by their friend, by clicking upon a link to join a session, etc.) All rooms previously created are saved until deleted. Thus, the participant or host can select their room from a list provided by the application when participants are detected. Rooms may have a unique identifier (a 6-digit code, for example) assigned to them upon creation, but users are also able to assign a vanity name to the rooms (see FIG. 8), which they can do at the point of creation of a room, or when they leave the room at the end of the session (e.g., a pop up window asks "What do you want to name this room?"), or at any point in time through the room settings in the user palette. FIG. 17A shows a column 812 in which a vanity name may be stored for a session.

Another way that a participant may navigate to different rooms (when alone in a session or room) is to access their room or session list in the user palette. From here, the participant can see all of their previously-created sessions or rooms (listed by their 6-digit codes, by their vanity names, etc.) and the participant is able to navigate directly there from their app.

Other Embodiments

Included are these other embodiments.

C1. A method of manually retrieving a saved state of a video conference session, said method comprising:

initiating a video conference session between a plurality of participants, each participant using a computing device;

receiving a selection from a computing device of one of said participants indicating a desire to retrieve a state of a previous video conference session;

displaying names of previous video conference sessions in which said one participant had participated;

receiving a selection from said computing device of said one participant indicating a selection of one of said previous video conference sessions; and retrieving content of a shared whiteboard of said selected previous video conference session from a database associated with said server computer and displaying said content on said computing devices of said participants.

C2. A method as recited in claim 1 wherein said participants of said video conference session is different from a set of participants who had participated in said selected previous video conference session.

D1. In a server computer, a method of automatically retrieving a state of a previous video conference session, said method comprising:

displaying content within a shared whiteboard on a first plurality of computing devices during said previous video conference session between a plurality of participants, each participant using one of said first plurality of computing devices;

receiving a triggering condition from at least one of said computing devices indicating to save a state of said previous video conference session and ending said previous video conference session;

saving said content of said shared whiteboard in persistent storage of said server computer in association with a list of identifiers of said participants in a database of said server computer;

initiating a new video conference session between said plurality of participants after said ending of said previous video conference session, each participant using one of said second plurality of computing devices;

detecting a participant identifier input to said each second plurality of computing devices;

identifying said previous video conference session in a database of said server computer based upon said set of said input participant identifiers; and retrieving said content of said shared whiteboard of said previous video conference session from said server computer and displaying said content on said second plurality of computing devices of said participants.

D2. A method as recited in claim D1 further comprising:

comparing said set of said input participant identifiers to a database including potential sets of participant identifiers in order to determine that one of said potential sets of participant identifiers matches said set of said input participant identifiers.

D3. A method as recited in claim D1 wherein said previous video conference session is a previous virtual reality session, each participant also wearing a VR headset, said method further comprising:

displaying said content of said shared whiteboard on a display of each of said VR headsets during said previous virtual reality session;

initiating a new virtual reality session after ending said previous virtual reality session;

identifying said previous virtual reality session; and displaying said content of said shared whiteboard on said display of each of said VR headsets during said new virtual reality session.

Computer and Mobile Device

FIG. 18 is a block diagram of a user computer 900 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer 900 includes a processor 902 (e.g., a central processing unit (CPU), a graphics processing unit (GPU) or both), a main memory 904 and a static memory 906, which communicate with each other via a bus 908. The computer 900 may further include a video display unit 910 (e.g., a liquid crystal display (LCD) or a cathode ray tube (CRT)). The computer 900 also includes an alphanumeric input device 912 (e.g., a keyboard), a user interface (UI) navigation device 914 (e.g., a mouse), a disk drive unit 916, a signal generation device 918 (e.g., a speaker) and a network interface device 920.

The disk drive unit 916 includes a machine-readable medium 922 on which is stored one or more sets of instructions and data structures (e.g., software 924) embodying or utilized by any one or more of the methodologies or functions described herein. The software 924 may also reside, completely or at least partially, within the main memory 904 and/or within the processor 902 during execution thereof by the computer 900, the main memory 904 and the processor 902 also constituting machine-readable media. The software 924 may further be transmitted or received over a network 926 via the network interface device 920 utilizing any one of a number of well-known transfer protocols (e. g., HTTP).

Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

While the machine-readable medium 922 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals. Although an embodiment of the present invention has been described with reference to specific exemplary embodiments, it may be evident that various modifications and changes may be made to these embodiments without departing from the broader spirit and scope of the invention. Accordingly, the specification and annotations/drawings are to be regarded in an illustrative rather than a restrictive sense.

According to various embodiments, computer 900 may include a variety of components, modules and/or systems for providing various types of functionality. For example, in at least one embodiment, computer 900 may include a Web browser application which is operable to process, execute, and/or support the use of scripts (e.g., JavaScript, AJAX, etc.), Plug-ins, executable code, virtual machines, HTML5 vector-based web animation (e.g., Adobe Flash), etc. The Web browser application may be configured to instantiate components and/or objects at the computer in response to processing scripts, instructions, and/or other information received from a remote server such as a Web server.

FIG. 19 is a simplified block diagram of an example mobile device 950. Mobile device 950 may include mobile device application 960 which includes a user interface 962, a database 964, processing software 966, and other components 968 for enabling the mobile device to perform various types of functions such as those described herein.

Various functionalities of the mobile device may be performed by one or more of the following components: processor(s) 970; device drivers 971; memory 972; interface(s) 973; power source(s)/distribution 974; geolocation module 975; display(s) 976; I/O devices 977; audio/video devices(s) 978; peripheral devices 979; motion detection module 980; user identification/authentication module 981; software/hardware authentication/validation 982; wireless communication module(s) 983; information filtering module(s) 984; speech processing module 985; scanner/camera 986; and OCR processing engine 987.

Memory 972 may include volatile memory (e.g., RAM) as well as non-volatile memory (e.g., persistent storage, disk memory, FLASH memory, EPROMs, unalterable memory etc.) implemented on a machine-readable medium. Interface(s) 973 may include wired interfaces or wireless interfaces. The wireless communication interfaces may be configured or designed to communicate with computers, remote servers, other wireless devices. Such wireless communication may be implemented using one or more wireless interfaces/protocols such as, for example, 802.11 (WiFi), 802.15 (including Bluetooth™) 802.16 (WiMax), 802.22, Cellular standards such as CDMA, CDMA2000, WCDMA, Radio Frequency (e.g., RFID), Infrared, Near Field Magnetics, etc. Geolocation module 975 acquires geolocation information from remote sources and uses the acquired geolocation information to determine information relating to a relative or absolute position of the mobile device.

Motion detection component 980 detects motion or movement of the mobile device and detects motion, movement, gestures or other input data from user. The motion detection component 980 may include one or more motion detection sensors such as MEMS (Micro Electro Mechanical System) accelerometers that can detect the acceleration or other movements of the mobile device as it is moved by a user. I/O Device(s) 977 include keys, buttons, scroll wheels, cursors, touchscreen sensors, audio command interfaces, a magnetic strip reader, an optical scanner, etc. Audio/video device(s) 978 include cameras, speakers, microphones, wireless transmitter/receiver devices for enabling wireless audio and/or visual communication between the mobile device and remote devices (e.g., radios, telephones, computer systems, etc.). Peripheral devices 979 include memory card readers, fingerprint readers, image projection devices, etc. Wireless communication module 983 may be configured to communicate with external devices using one or more wireless interfaces/protocols such as, for example, 802.11 (WiFi), 802.15 (including Bluetooth™) 802.16 (WiMax), 802.22, Cellular standards such as CDMA, CDMA2000, WCDMA, Radio Frequency (e.g., RFID), Infrared, Near Field Magnetics, etc. Scanner/Camera 986 may be use in scanning identifiers or other content from other devices or objects such as mobile device displays, computer displays, static displays (e.g., printed on tangible mediums), etc. OCR Processing Engine 987 is operable to perform image processing and optical character recognition of images such as those captured by a mobile device camera, for example. Speech processing module 985 performs speech recognition, speech-to-text conversion, etc.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

I claim:

1. In a server computer, a method of saving a state of a video conference session, said method comprising:
    initiating a video conference session between a plurality of participants, each participant using a computing device and said each participant signing in to said video conference session with a unique identifier;
    displaying content within a shared whiteboard on each of said computing devices;
    receiving a triggering condition from at least one of said computing devices indicating to save a state of said video conference session;
    in response to receiving said triggering condition, saving said content of said shared whiteboard in a file of persistent storage of said server computer as said content appears on said computing devices when said triggering condition is received; and
    in response to receiving said triggering condition, saving a list of said unique identifiers of said participants in a database of said server computer in association with a link to a storage location of said saved content of said shared whiteboard, whereby said saved content may be retrieved from said file in persistent storage using said saved list of unique identifiers.

2. A method as recited in claim 1 wherein said triggering condition is one of said participants leaving said session, all of said participants other than a participant who is a host of said session leaving said session, all of said participants leaving said session, or receiving an end meeting request from one of said participants.

3. A method as recited in claim 1 wherein said triggering condition is one of said computing devices dropping a live socket connection to said server computer for said video conference session.

4. A method as recited in claim 1 further comprising:
    clearing said content of said shared whiteboard from working storage of said server computer such that said content is no longer displayed on each of said computing devices.

5. A method as recited in claim 1 further comprising:
    saving a unique identifier of said video conference session in association with said list of identifiers of said participants in said database.

6. A method as recited in claim 1 further comprising:
    displaying messages in a chat window on each of said computing devices; and saving said messages of said chat window in persistent storage of said server computer, said link also accessing a storage location of said messages.

7. A method as recited in claim 1 wherein each of said computing devices is a desktop computer, laptop computer, tablet computer or mobile device.

8. A method as recited in claim 1 wherein said unique identifier is of said each participant.

9. In a server computer, a method of automatically retrieving a saved state of a video conference session, said method comprising:
    initiating a video conference session between a plurality of participants, each participant using a computing device;
    detecting that each computing device is participating in said video conference session and detecting a participant identifier input to said each computing device;
    comparing a set of said input participant identifiers to a first database including potential sets of participant identifiers in order to determine that one of said potential sets of participant identifiers matches said set of said input participant identifiers;
    identifying a previous video conference session based upon said matching set of participant identifiers in which said participants had participated; and
    retrieving content of a shared whiteboard of said previous video conference session from a second database associated with said server computer and displaying said content on said computing devices of said participants, wherein said retrieved content of said shared whiteboard is as said retrieved content appeared on said computing devices when a triggering condition was received at said server computer indicating to save a state of said previous video conference session.

10. A method as recited in claim 9 further comprising:
    identifying a unique identifier of said previous video conference session in said first database; and
    using said unique identifier of said previous video conference session to locate said content in said second database.

11. A method as recited in claim 9 further comprising:
    detecting that said each computing device is participating in said video conference session by receiving a live socket connection request for said video conference session from said each computing device.

12. A method as recited in claim 9 further comprising:
    retrieving messages in a chat window of said previous video conference session from said server computer and displaying said messages on said computing devices of said participants.

13. A method as recited in claim 9 further comprising:
    determining that said set of input participant identifiers match a plurality of previous video conference sessions;
    displaying an identifier of each of said previous video conference sessions on said computing device of one of said participants;
    receiving a selection of one of said previous video conference sessions; and displaying said content of said shared whiteboard from said one of said previous video conference sessions on said computing devices of said participants.

14. A method as recited in claim 9 further comprising:
identifying said previous video conference session based upon said matching set of participant identifiers in which only said participants had participated; and
retrieving content of a shared whiteboard of said previous video conference session as said content appeared on said computing devices when said previous video conference session ended from a second database associated with said server computer and displaying said content on said computing devices of said participants.

15. A method as recited in claim 9 wherein said participant identifier is a unique identifier of one of said participants using said each computing device.

16. In a server computer, a method of retrieving a saved state of a video conference session, said method comprising:
initiating a video conference session between a plurality of participants, each participant using a computing device and signing in to said video conference session with a unique identifier;
detecting that each computing device is participating in said video conference session and detecting said each unique identifier input to said each computing device;
comparing a set of said input unique identifiers to a first database including groups of unique identifiers in order to determine that said set of input unique identifiers matches one of said groups of unique identifiers;
identifying content based upon said matching, said content having been present and viewed by said participants in a previous video conference session in which only said participants had participated; and
retrieving said content as said content appeared on said computing devices when said previous video conference session ended from a second database and displaying said content on said computing devices of said participants during said video conference session.

17. A method as recited in claim 16 wherein said content is content on a whiteboard, a whiteboard tool palette, messages in a chat window, an open window of shared content, a virtual background of an image of one of said participants, an icon representing a file to which all of said participants have access, a video recording of a portion of said previous video conference session, or an audio recording of said previous video conference session.

18. A method as recited in claim 16 wherein said content is an icon representing a file to which all of said participants have access, said method further comprising:
one of said participants sharing said file with said participants in said video conference session by selecting said file from a display screen of said computing device of said one participant.

19. A method as recited in claim 16 wherein said content is retrieved automatically based upon said matching without input from any of said participants.

20. A method as recited in claim 16 further comprising:
receiving a request from one of said participants to retrieve said content;
performing said comparing in response to said receiving.

21. A method as recited in claim 16 further comprising:
determining that said set of input unique identifiers match a plurality of previous video conference sessions;
displaying an identifier of each of said previous video conference sessions on said computing device of one of said participants;
receiving a selection of one of said previous video conference sessions; and
displaying said content from said one of said previous video conference sessions on said computing devices of said participants.

22. A method as recited in claim 16 wherein said retrieved content is as said retrieved content appeared on said computing devices when a triggering condition was received at said server computer indicating to save a state of said previous virtual reality session.

23. A method as recited in claim 16 wherein said unique identifier is of said each participant.

24. In a server computer, a method of retrieving a saved state of a video conference session, said method comprising:
initiating a video conference session between a plurality of participants, each participant using a computing device and signing in to said video conference session with a unique identifier;
detecting that each computing device is participating in said video conference session and detecting said each unique identifier input to said each computing device;
comparing a set of said input unique identifiers to a first database including groups of unique identifiers in order to determine that said set of input unique identifiers matches one of said groups of unique identifiers;
identifying content based upon said matching, said content having been present and viewed by said participants in a previous video conference session in which said participants had participated; and
retrieving said content from a second database and displaying said content on said computing devices of said participants during said video conference session, wherein said retrieved content is as said retrieved content appeared on said computing devices when a triggering condition was received at said server computer indicating to save a state of said previous virtual reality session.

* * * * *